US010898812B2

(12) United States Patent
Zimring et al.

(10) Patent No.: US 10,898,812 B2
(45) Date of Patent: Jan. 26, 2021

(54) METHODS, DEVICES, AND SYSTEMS FOR INTERACTIVE CLOUD GAMING

(71) Applicant: Google LLC, Mountain View, CA (US)

(72) Inventors: Dov Zimring, Belmont, CA (US); Thomas Enders, Mountain View, CA (US); Matthew Rodgers, San Jose, CA (US); Gurudas Somadder, Saratoga, CA (US); Jason Pi, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/373,558

(22) Filed: Apr. 2, 2019

(65) Prior Publication Data

US 2019/0321732 A1 Oct. 24, 2019

Related U.S. Application Data

(63) Continuation of application No. PCT/US2019/022472, filed on Mar. 15, 2019.
(Continued)

(51) Int. Cl.
*A63F 13/77* (2014.01)
*A63F 13/235* (2014.01)
(Continued)

(52) U.S. Cl.
CPC ............ *A63F 13/77* (2014.09); *A63F 13/235* (2014.09); *A63F 13/335* (2014.09);
(Continued)

(58) Field of Classification Search
USPC ........................................................ 463/42
See application file for complete search history.

(56) References Cited

U.S. PATENT DOCUMENTS

| 6,855,058 B2 | 2/2005 | Kubota et al. |
| 7,401,150 B2 | 7/2008 | Shea et al. |

(Continued)

FOREIGN PATENT DOCUMENTS

| CN | 106328855 A | 1/2017 |
| EP | 1374959 A2 | 1/2004 |

(Continued)

OTHER PUBLICATIONS

Google LLC, PCT/US2019/022472, International Search Report and Written Opinion, dated Jun. 18, 2019, 9 pgs.
(Continued)

*Primary Examiner* — Pierre E Elisca

(57) ABSTRACT

The various implementations described herein include methods, devices, and systems for interactive cloud gaming. In one aspect, an interface device with processors and memory storing an application program is used for cloud gaming. The interface device includes a communication module for receiving and/or transmitting messages and media streams between the interface device, a game controller, and a remote gaming server. The interface device further includes an output module configured to provide output of the application to an input of a display device coupled to or integrated with the interface device. The application is configured to implement a first mode in which the interface device processes and displays outputs associated with substantially all messages transmitted by the game controller, and a second mode in which the interface device processes and displays a predefined subset of messages from the game controller and displays gaming media streams from the gaming server.

19 Claims, 35 Drawing Sheets

Related U.S. Application Data

(60) Provisional application No. 62/651,542, filed on Apr. 2, 2018.

(51) Int. Cl.
*A63F 13/335* (2014.01)
*A63F 13/355* (2014.01)
*G06F 9/445* (2018.01)
*H04L 29/08* (2006.01)

(52) U.S. Cl.
CPC ........ *A63F 13/355* (2014.09); *G06F 9/44568* (2013.01); *H04L 67/306* (2013.01); *A63F 2300/407* (2013.01); *A63F 2300/538* (2013.01); *A63F 2300/55* (2013.01)

(56) References Cited

U.S. PATENT DOCUMENTS

| | | | |
|---|---|---|---|
| 8,621,585 | B2 | 12/2013 | Danieli et al. |
| 8,641,531 | B2 | 2/2014 | Patil |
| 9,339,733 | B2 | 5/2016 | Boudville |
| 9,393,486 | B2 | 7/2016 | George |
| 9,396,702 | B2 | 7/2016 | Colenbrander |
| 9,498,711 | B2 | 11/2016 | Assa |
| 9,526,989 | B2 | 12/2016 | Oh |
| 9,592,446 | B2 | 3/2017 | Bono et al. |
| 9,675,874 | B1 | 6/2017 | Park |
| 9,912,562 | B2 | 3/2018 | Callahan et al. |
| 10,255,765 | B2 * | 4/2019 | Washington .......... A63F 13/822 |
| 10,456,672 | B2 | 10/2019 | Champy |
| 2004/0198403 | A1 | 10/2004 | Pedersen et al. |
| 2005/0074063 | A1 | 4/2005 | Nair et al. |
| 2006/0154710 | A1 | 7/2006 | Serafat |
| 2006/0287096 | A1 | 12/2006 | O'Kelley et al. |
| 2006/0287099 | A1 | 12/2006 | Shaw et al. |
| 2007/0018980 | A1 | 1/2007 | Berteig et al. |
| 2008/0220878 | A1 | 9/2008 | Michaelis |
| 2009/0008404 | A1 | 1/2009 | Kim et al. |
| 2009/0125961 | A1 | 5/2009 | Perlman et al. |
| 2009/0271656 | A1 | 10/2009 | Yokota et al. |
| 2010/0167809 | A1 | 7/2010 | Perlman et al. |
| 2010/0203952 | A1 | 8/2010 | Zalewski |
| 2010/0306813 | A1 | 12/2010 | Perry et al. |
| 2011/0124417 | A1 | 5/2011 | Baynes et al. |
| 2011/0145635 | A1 | 6/2011 | Buckler et al. |
| 2012/0004042 | A1 | 1/2012 | Perry et al. |
| 2012/0079080 | A1 | 3/2012 | Pishevar |
| 2012/0209571 | A1 | 8/2012 | Peterson et al. |
| 2012/0270644 | A1 | 10/2012 | Buhr |
| 2012/0306877 | A1 | 12/2012 | Rosasco |
| 2013/0034160 | A1 | 2/2013 | Schmit |
| 2013/0198642 | A1 | 8/2013 | Carney et al. |
| 2013/0221923 | A1 | 8/2013 | Robertson |
| 2013/0274000 | A1 | 10/2013 | Novotny et al. |
| 2014/0006517 | A1 | 1/2014 | Hsiao et al. |
| 2014/0019582 | A1 | 1/2014 | Kim |
| 2014/0032670 | A1 | 1/2014 | Ellingson et al. |
| 2014/0043333 | A1 | 2/2014 | Narayanan et al. |
| 2014/0179434 | A1 | 6/2014 | Xu |
| 2014/0221087 | A1 | 8/2014 | Huang et al. |
| 2014/0274384 | A1 | 9/2014 | Boswell et al. |
| 2014/0342819 | A1 | 11/2014 | Bruno, Jr. et al. |
| 2015/0009222 | A1 | 1/2015 | Diard et al. |
| 2015/0087414 | A1 | 3/2015 | Chen et al. |
| 2015/0297998 | A1 | 10/2015 | Karamfilov et al. |
| 2016/0001184 | A1 | 1/2016 | Sepulveda et al. |
| 2016/0028854 | A1 | 1/2016 | Leeb et al. |
| 2016/0171757 | A1 | 6/2016 | Panneer et al. |
| 2016/0279523 | A1 | 9/2016 | Altagar et al. |
| 2016/0293134 | A1 | 10/2016 | Fortin |
| 2016/0317921 | A1 | 11/2016 | Schmitz et al. |
| 2017/0034234 | A1 | 2/2017 | Zimring et al. |
| 2017/0083396 | A1 | 3/2017 | Bishop et al. |
| 2017/0097816 | A1 | 4/2017 | Joshi |
| 2017/0124812 | A1 * | 5/2017 | Washington ........ G07F 17/3248 |
| 2017/0142201 | A1 | 5/2017 | Holmes |
| 2017/0185464 | A1 | 6/2017 | Lipinski et al. |
| 2017/0246544 | A1 | 8/2017 | Agarwal et al. |
| 2017/0354878 | A1 | 12/2017 | Posin |
| 2017/0354893 | A1 | 12/2017 | Benedetto et al. |
| 2018/0229128 | A1 | 8/2018 | Chandrasekaran et al. |
| 2018/0250591 | A1 | 9/2018 | Prado Rojas et al. |
| 2018/0256981 | A1 | 9/2018 | Enomoto |
| 2019/0199722 | A1 | 6/2019 | Pennarun et al. |
| 2019/0272707 | A1 * | 9/2019 | Washington .......... A63F 13/352 |
| 2019/0308099 | A1 | 10/2019 | Lalonde et al. |
| 2019/0321725 | A1 | 10/2019 | Zimring et al. |
| 2019/0321727 | A1 | 10/2019 | Rodgers |
| 2019/0321732 | A1 * | 10/2019 | Zimring ................ A63F 13/355 |
| 2020/0001177 | A1 | 1/2020 | Champy |
| 2020/0111317 | A1 * | 4/2020 | Oberberger ......... G07F 17/3225 |

FOREIGN PATENT DOCUMENTS

| | | |
|---|---|---|
| EP | 2546811 A1 | 1/2013 |
| EP | 3610933 | 2/2020 |
| GB | 2525437 A | 10/2015 |
| JP | 2014130589 A | 7/2014 |
| JP | 2015139565 A | 8/2015 |
| KR | 20070082395 | 8/2007 |
| WO | 2005010680 A2 | 2/2005 |
| WO | 2008104221 A1 | 4/2008 |
| WO | 2012161102 A1 | 11/2012 |
| WO | 2012170437 A1 | 12/2012 |
| WO | 2014085717 A1 | 6/2014 |
| WO | 2014120369 A1 | 8/2014 |
| WO | 2014186858 A1 | 11/2014 |
| WO | 2015191965 A2 | 12/2015 |
| WO | 2016183253 A1 | 11/2016 |
| WO | 2017007659 A1 | 1/2017 |
| WO | 2017201472 A1 | 11/2017 |
| WO | 2019074952 A2 | 4/2019 |
| WO | 2019182752 A1 | 9/2019 |
| WO | 2019195300 A2 | 10/2019 |
| WO | 2020102493 A1 | 5/2020 |

OTHER PUBLICATIONS

Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.
English Translation of Korean Office Action dated Apr. 15, 2019 for KR Application No. KR 10-2018-7023961, 2 pages.
International Preliminary Report on Patentability dated May 9, 2018 for International Application No. PCT/US2017/033642, 13 pages.
International Search Report and Written Opinion dated Apr. 24, 2018 for International Application No. PCT/US2017/033642, 28 pages.
First Action Interview Office Action Summary dated Feb. 26, 2019 for U.S. Appl. No. 15/599,408, 3 pages.
First Action Interview Pilot Program Pre-Interview Communication dated Jan. 8, 2019 for U.S. Appl. No. 15/599,408, 4 pages.
Notice of Allowance dated Jun. 19, 2019 for U.S. Appl. No. 15/599,408, 6 pages.
Non-Final Office Action dated Jun. 12, 2020 for U.S. Appl. No. 16/566,607, 23 pages.
International Search Report and Written Opinion dated Feb. 26, 2019 for International Application No. PCT/US2018/066844, 13 pages.
Non-Final Office Action dated May 15, 2020 for U.S. Appl. No. 15/851,610, 15 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.

(56) References Cited

OTHER PUBLICATIONS

International Search Report and Written Opinion dated Apr. 26, 2019 for International Application No. PCT/US2018/055055, 21 pages.
International Search Report and Written Opinion dated Oct. 4, 2019 for International Application No. PCT/US2019/025182, 23 pages.
First Action Interview Pilot Program Pre-Interview Communication dated Apr. 9, 2020 for U.S. Appl. No. 16/368,801, 4 pages.
Notice of Allowance dated Jun. 10, 2020 for U.S. Appl. No. 16/368,801, 12 pages.
International Search Report and Written Opinion dated Jun. 18, 2019 for International Application No. PCT/US2019/025185, 11 pages.
Notice of Allowance dated May 5, 2020 for U.S. Appl. No. 16/368,806, 8 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
International Search Report and Written Opinion dated Aug. 1, 2019 for International Application No. PCT/US2019/020935, 23 pages.
International Search Report and Written Opinion dated Oct. 7, 2019 for International Application No. PCT/US2019/025400, 13 pages.
Bernier, Yahn W., "Latency Compensating Methods in Client/Server In-game Protocol Design and Optimization", Game Developers Conference Proceedings, Mar. 20, 2001, 13 pages.
Herrscher et al., "A Dynamic Network Scenario Emulation Tool", Proceedings of the IEEE Eleventh International Conference on Computer Communications and Networks, Oct. 16, 2002; pp. 262-267.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
Slivar, Ivan et al., "Empirical QoE Study of In-Home Streaming of Online Games", 2014 13th Annual Workshop on Network and Systems Support for Games, IEEE, Dec. 4, 2014, 6 pages.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.

* cited by examiner

METHODS, DEVICES, AND SYSTEMS FOR INTERACTIVE CLOUD GAMING

RELATED APPLICATIONS

This application is a continuation of and claims priority to PCT Application No. PCT/US19/22472, titled "Methods, Devices, and Systems for Interactive Cloud Gaming," filed Mar. 15, 2019, which claims priority to U.S. Provisional Application No. 62/651,542, titled "Methods, Devices, and Systems for Interactive Cloud Gaming," filed Apr. 2, 2018, all of which are hereby incorporated by reference herein in their entirety.

TECHNICAL FIELD

This relates generally to computer technology, including but not limited to devices, systems, and methods for interactive cloud gaming.

BACKGROUND

Game consoles are a type of media display devices that are used for gaming and other entertainment. A group of users can gather at one space that is equipped with a game console and enjoy a movie that is streamed using the game console. For gaming applications, the game console typically supports several game controllers (e.g., up to five game controllers) which connect simultaneously to the game console for play. However, these game controllers and the game console have to be powered off individually, and set up again, when a user decides to move a gaming session to a different location (e.g., to a different room within the house or to a friend's house). Further, because games need to be installed on the console's hard drive before they can be played, the user has a limited number of game choices at any given time. Additionally, older game consoles may not have the processing capabilities to meet the demands that newer games require, requiring the user to have to constantly upgrade his game console. Thus, console-based gaming can be cumbersome, time-consuming, and expensive for a user.

Accordingly, there is a need for users to be able to experience high quality gaming without requiring significant time, cost, and effort. The users should also have the freedom to choose any game they would like to play, and the number of people that they would like to play the game with.

SUMMARY

The various implementations described in this specification are directed to providing a gaming application platform that enables efficient and portable gaming experiences. Specifically, an interface device (e.g., a hardware dongle such as CHROMECAST by Google Inc.) hosting software that enables gaming is used for cloud gaming. The interface device interacts with a gaming server to access games, and streams, from the gaming server (e.g., at real-time), gaming media content (e.g., audio and/or visual content) for display on a display device (e.g., a TV) that is coupled to or integrated with the interface device. The interface device also communicates simultaneously with game controller(s) and/or electronic device(s) that enable online gaming.

In accordance with some implementations of this application, a cloud-enabled game controller that provides instant gameplay is used for gaming. The game controller communicates with the interface device on a local network (e.g., Wifi). The game controller transmits messages (e.g., game setup commands) to the interface device. During gameplay, the game controller transmits gaming inputs directly to the gaming server. Accordingly, the game controller operates as a portable and standalone device that obviates the need for a game console, making it easy and convenient to move from one location to another (e.g., within a home environment, a dormitory, an office, or between houses etc.).

In some implementations, the game controller stores multiple player credentials and/or multiple network credentials. The game controller can be used in many different locations and in a multi-player gaming setting.

Additionally, in some implementations, the interface device connects simultaneously (e.g., pairs with) with multiple game controllers and/or multiple electronic devices on the same network.

In some implementations, the game controller is identified by a device identification (e.g., game controller identification) and/or a client certificate, which gets associated with users of the game controller (e.g., during the setup process).

In some implementations, the interface device is identified by a device identification and/or a client certificate (e.g., interface device identification). In some implementations, the game controller stores an identifier of each interface device that it has communicatively connected to (e.g., paired with).

In some implementations, the game controller is used in a household. The game controller gets associated with the household and its users (e.g., members of the household) during setup (e.g., the provisioning process). In some implementations, an application (e.g., GOOGLE Home app) that enables cloud gaming is used to provision the game controller. In some implementations, the household and its users are identified by credentials which are verified to enable access to purchased games and other entitlements through the gaming server.

In some implementations, the game controller receives voice inputs (e.g., commands) from the player, and processes and/or transmits the voice inputs.

In some implementations, the game controller includes a headset that is plugged into the game controller. Audio inputs are sent to the game controller (e.g., via the headset).

Thus, by combining various advanced technologies of interface devices, game controllers, and cloud gaming servers as disclosed herein, gaming experience can be expanded from gameplay by users gathered in one space to online interactive gameplay by multiple players (e.g., hundreds or thousands) at different venues. Furthermore, since the user has access to cloud-gaming services and resources including large cloud-managed libraries of content, rendering, encoding, and streaming resources, s/he is no longer bound by the storage and processing capabilities of the game console.

In one aspect, some implementations include an interface device (e.g., a gaming interface device) that comprises one or more processors and memory storing one or more programs for execution by the one or more processors, the one or more programs including an application (e.g., gaming application and streaming application). The interface device includes a communication module for receiving and/or transmitting messages and media streams between the interface device and a game controller, and between the interface device and a gaming server that is remote from the interface device. The interface device further includes an output module configured to provide output of the application to an input of a display device coupled to or integrated with the interface device. The application is configured to implement a first mode (e.g., menu mode) in which the interface device processes and displays outputs associated with substantially all messages transmitted by the game controller. The application (e.g., gaming application) is further configured to implement a second mode (e.g., gameplay mode) in which the interface device processes and displays a predefined subset of messages from the game controller, and displays gaming media streams (e.g., streaming application) transmitted by the gaming server. In some implementations, the communication module can be one or more of a radio transmission module, a communication bus, and a wired connection. In some implementations, the game controller is proximate to the interface device. In some implementations, the output module comprises an output port that is configured to provide (e.g., transmit) output of the application to an input port of the display device that is coupled to or integrated with the interface device. In some implementations, the application is further configured to decode and output to the display device the gaming media streams transmitted by the gaming server. In some implementations, the gaming media streams are displayed in real time. In some implementations, the streams are generated by the gaming server to indicate gameplay state of a gaming session. In some implementations, in the second mode the interface device disregards most commands from the game controller (e.g., only commands from a quick menu press button on the game controller are sent to the interface device).

In another aspect, some implementations include a game controller that comprises one or more processors and memory storing one or more programs for execution by the one or more processors, the one or more programs including an application. The game controller includes a communication module for receiving and/or transmitting messages and media streams between the game controller and an interface device, and between the game controller and a gaming server that is remote from the game controller. The application is being configured to implement a first mode (e.g., menu mode) in which the game controller transmits gaming setup commands to the interface device. The application is further being configured to implement a second mode (e.g., gameplay mode) in which the game controller transmits gameplay commands to the gaming server and a predefined subset of the gaming setup commands to the interface device. In some implementations, the interface device is proximate to the game controller. In some implementations, the game controller and the interface device are connected on the same local network, and the game controller transmits the gaming setup commands to the interface device over the same local network. In some implementations, the game controller stores multiple user credentials and multiple network credentials. In some implementations, the communication module can be one or more of a radio transmission module, a communication bus, and a wired connection.

In one aspect, some implementations include a method for cloud gaming performed at a gaming system. The gaming system comprises an interface device, a game controller, and a gaming server remote from the interface device and the game controller. Each of the interface device, the game controller, and the gaming server includes one or more processors and memory storing one or more programs for execution by the one or more processors. The method comprises, at the interface device: (1) receiving, from the game controller, a selection of a game; (2) processing and displaying automatically and without user intervention, in a first mode (e.g., menu mode), outputs associated with substantially all messages transmitted by the game controller; and (3) processing and displaying automatically and without user intervention, in a second mode (e.g., gameplay mode), a predefined subset of messages from the game controller and displaying in real time gaming media streams of the game transmitted by the gaming server; wherein the displaying comprises displaying on a display device coupled to or integrated with the interface device. The method also comprises, at the game controller: (4) transmitting, in the first mode, controller commands (e.g., gaming setup commands) to the interface device; and (5) transmitting, in the second mode, gameplay commands to the gaming server and a predefined subset of the controller commands to the interface device. The method further comprises, at the gaming server, for a respective game: (6) receiving the gameplay commands from the game controller; (7) rendering a respective frame of content of the game in accordance with a respective subset of one or more of the received commands; and (8) transmitting, in real time to the interface device, the gaming media streams of the game including the respective rendered frame. In some implementations, the game controller is proximate to the interface device.

In one aspect, some implementations include a gaming method performed at a first electronic device (e.g., an interface device) that is coupled to or integrated with a display device (e.g., a TV) and having one or more processors and memory storing one or more programs for execution by the one or more processors. The method includes: (1) receiving, from a second electronic device (e.g., a game controller), a first user input (e.g., the user selects a button on the game controller) to launch a cloud gaming session; in response to receiving the first user input: (2A) connecting to a gaming service on a gaming server; (2B) identifying automatically and without user intervention, a default player identification (e.g., the identification is associated with a player or household account) associated with the user; and (2C) launching in conjunction with the gaming server the cloud gaming session using the default player identification. In some implementations, the first electronic device and the second electronic device are proximate to each other. In some implementations, the first electronic device and the second electronic device are communicatively connected. In some implementations, the first electronic device and the second electronic device are on a common network (e.g., wired or Wifi). In some implementations, the second electronic device automatically connects to the Wifi network after powering on and automatically pairs with the first (e.g., default) electronic device. In some implementations, the game controller stores a default gamer (e.g., user) identification.

In another aspect, some implementations include a method for cloud gaming performed at a first electronic device (e.g., an interface device) coupled to or integrated with a display device (e.g., TV), the first electronic device having one or more processors and memory storing one or more programs for execution by the one or more processors. The method includes: (1) receiving, from a second electronic device (e.g., a game controller), a first user input (e.g., the user selects a button on the game controller) to launch a cloud gaming session, wherein the first user input includes a game selection; in response to the received input: (2) connecting to a gaming service on a gaming server; (3) displaying automatically and without user intervention, on the display device, a login screen including a plurality of player identifications (e.g., user/gamer names and/or avatars representing the players); (4) receiving, from the second electronic device, a selection of a first player identification from the plurality of player identifications; (5) logging on to the gaming service using the selected first player identification; and (6) launching in conjunction with the gaming server the cloud gaming session and initiating gameplay, including: (6A) obtaining gaming media streams of the game from the gaming server; (6B) decoding the gaming media streams; and (6C) outputting to the display device the decoded gaming media streams, wherein the gaming media streams are generated by the gaming server in response to gaming inputs transmitted directly to the gaming server from the second electronic device. The first electronic device and the second electronic device are communicatively connected. In some implementations, the first electronic device and the second electronic device are on a common network. In some implementations, the first electronic device and the second electronic device are proximate to each other. In some implementations, the method includes a security mode that requires the user to verify his/her identification (e.g., using a voice input or entering a password) before logging on to the gaming service using the selected first player identification. In some implementations, the method includes multiple second electronic devices, each storing at least one player identification.

In yet another aspect, some implementations include a method for cloud gaming performed at a second electronic device (e.g., a game controller) having one or more processors and memory storing one or more programs for execution by the one or more processors. The method includes: (1) sending, to a plurality of first electronic devices (e.g., interface devices), a first input to launch a gaming session, wherein the second electronic device is communicatively connected to each of first electronic devices, and each of the first electronic devices is coupled to or integrated with a respective display device; in response to the first input: (2) causing a first one of the first electronic devices to display automatically and without user intervention, on a first display device, a login screen including plurality of player identifications; and (3) causing a second one of the first electronic devices to display automatically and without user intervention, on a second display device, a notification including instructions; (4) sending a second input to the first one of the first electronic devices, the second input including selection of a first player identification from the plurality of player identifications; in response to the second input: (5) launching the gaming session on the first one of the first electronic devices. In some implementations, the first one and the second one of the first electronic devices are located in different areas of the same premise (e.g., the living room and the bedroom of a home environment). In some implementations, the first one of the second electronic devices is a default second electronic device. In some implementations, the first one of the second electronic devices is the device that was most recently used. In some implementations, the second electronic device and each of first electronic devices are on a common network.

In yet another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, and networks have not been described in detail so as not to unnecessarily obscure aspects of the implementations.

Display interface devices (referred to herein as "interface devices," "streaming devices," or "casting devices"), such as Google's CHROMECAST device, can be used to stream media content to a coupled display from a local or remote media source (such as an Internet-connected media service or a local digital video recorder (DVR)). Interface devices can display on a coupled display user interfaces cast from an application running on a user device that is communicatively coupled to the interface device (e.g., a mobile device user can cast a YOUTUBE video playing on the mobile device to a large display via a coupled CHROMECAST device, or a laptop user can cast via a CHROMECAST device a CHROME browser window to the large display). The functionality of these interface devices can be further expanded to stream cloud gaming content from gaming servers. The interface devices can further be combined with cloud-enabled game controllers that store user and network credentials, to create efficient and portable gaming experiences.

For example, Julia's home includes two interface devices that are coupled, respectively, to the living room TV and the bedroom TV. Julia plays her favorite online game on the living room TV using her cloud-enabled game controller. During her gaming session, her mother's friends visit and they will like to watch a football game on the living room TV. Julia pauses her game session and takes her game controller with her into the bedroom. The interface device in the bedroom detects the presence of Julia and the game controller in the bedroom (e.g., using audio and/or other cues) and switches on the bedroom TV, which displays a screen showing the paused state of the game that Julia had left. Julia un-pauses the screen and resumes her game session. Julia visits her friend Brandon, taking along with her the game controller. At Brandon's house, Brandon gives Julia the credentials to his home Wifi. Julia connects her game controller to Brandon's network and pairs her game controller with Brandon's interface device. Brandon joins Julia's game session, and they both play the game using their respective game controllers. The next time Julia visits Brandon, her game controller automatically connects to Brandon's network.

Figure 1A:
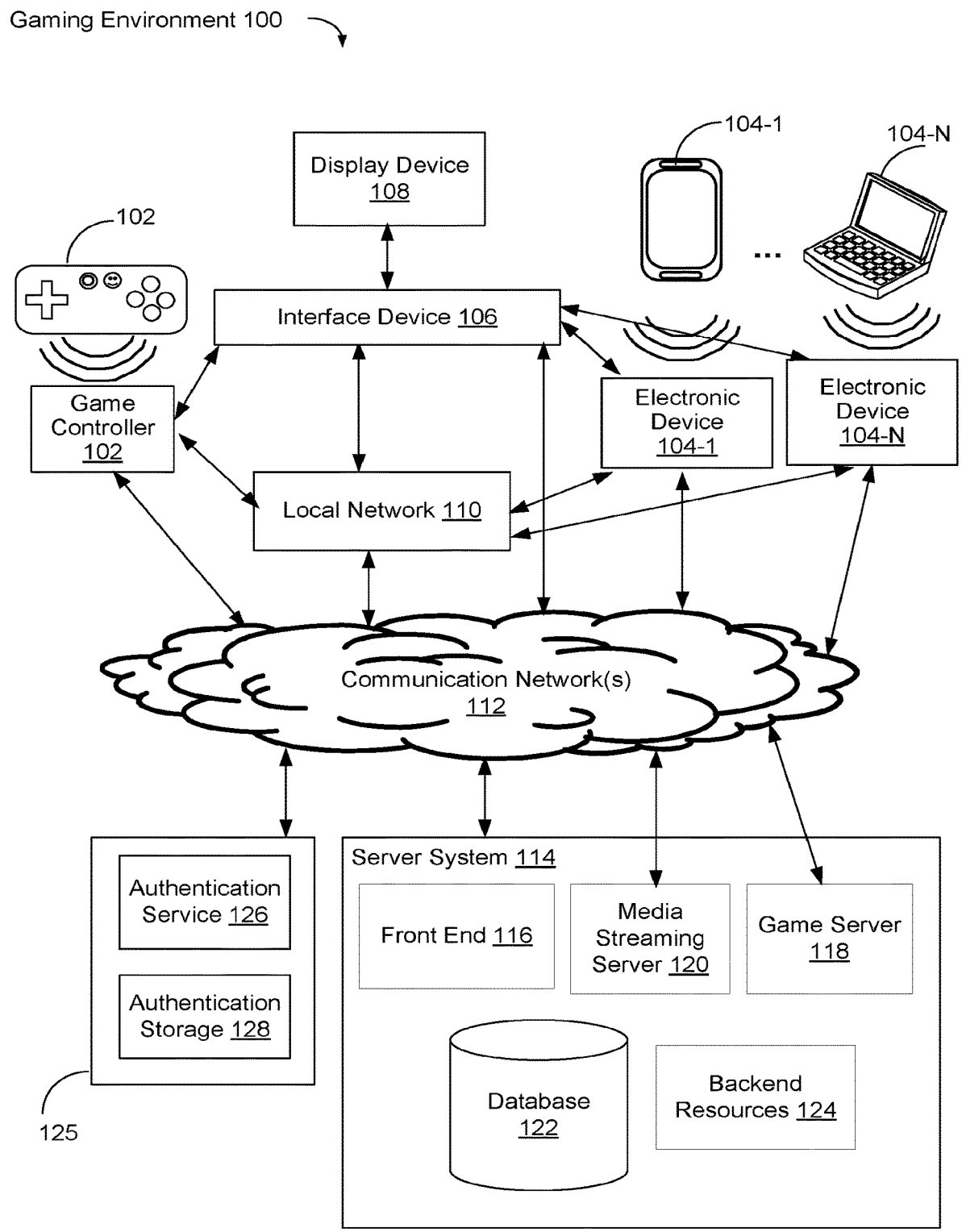
FIG. 1A is an example gaming environment, in accordance with some implementations.

FIG. 1A is an example gaming environment 100, in accordance with some implementations. The gaming environment 100 includes a game controller 102, one or more electronic devices 104, and an interface device 106 that is coupled to a display device 108, on a local network 110. In some implementations, the local network 110 networks one or more devices using wired (e.g., Ethernet) and/or wireless (e.g., Wi-Fi) communications. For example, the local network 110 includes a router device that networks one or more devices into the local network 110. The local network 110 is communicatively coupled to communication networks 112 (e.g., wide-area networks, the Internet).

The game controller 102 and the interface device 106 are communicatively coupled. The game controller 102 and the interface device 106 may communicate with each other through the local network 110 and/or directly (e.g., via Bluetooth or other wireless communications). In some implementations, the game controller 102 and the interface device 106 are local to each other (e.g., in the same room, in the same house, etc.). The interface device 106 is coupled to one or more display devices 108 that can output visual and/or audio content (e.g., the display device 108 includes a television, a display monitor, a tablet, a computer/laptop with a display screen, a sound system, speakers, etc.). The interface device 106 is configured to output content to the display device(s) 108.

The game controller 102 includes, and can run, one or more applications. In some implementations, the game controller 102 includes one or more applications that are configured to operate in conjunction with the interface device 106. In some implementations, the applications include an interface device application and a gaming application. The interface device application is used for pairing the game controller 102 with the interface device 106 and for configuring the interface device 106.

In some implementations, the applications include a gaming application that is used for cloud gaming. The gaming application is used for transmitting messages (e.g., gaming setup commands) from the game controller 102 to the interface device 106 and for transmitting gaming inputs (e.g., gameplay commands) from the game controller 102 to a gaming server (e.g., server system 114) during a gaming session. In some implementations, the setup and gameplay commands are transmitted to a gaming application of the interface device 106 and/or to the server system 114 using a combination of buttons, directional pad(s), and/or joystick(s) of the game controller 102. In some implementations, the setup and gameplay commands are voice commands that are issued by a user (also known as a "gamer") of the game controller 102, and transmitted to the interface device 106 and/or the server system 114.

In some implementations, a user can initiate gaming by pressing a button (e.g., a "start" or a "home" button) on the game controller 102, which sends a signal to the interface device 106 to launch a gaming portal user interface (UI) that is displayed on the display device 108. Then, the user can select a game on the gaming portal UI to initiate a game launch (e.g., by pressing another button). The processes of launching the gaming portal UI and initiating the gaming session are described further detail in FIG. 2.

The gaming environment 100 includes one or more electronic devices 104 (e.g., 104-1 and/or 104-2). The electronic device 104 and the interface device 106 are communicatively coupled. The electronic device 104 and the interface device 106 may communicate with each other through the local network 110 and/or directly (e.g., via Bluetooth or other wireless communications). In some implementations, the electronic device 104 and the interface device 106 are local to each other (e.g., in the same room, in the same house, etc.).

The electronic device 104 is a device that include, and can run, one or more applications. In some implementations, the electronic devices 104 is be a smartphone, tablet device, a laptop or notebook computer, a desktop computer, or a multimedia device.

In some implementations, the electronic device 104 includes one or more applications that are configured to operate in conjunction with the interface device 106. In some implementations, the applications include an interface device application (e.g., interface device application 344, FIG. 3) for pairing the electronic device 104 with the interface device 106 and configuring the interface device 106. The applications also include one or more applications that can cast associated content to the interface device 106. In some implementations, an application casts data and/or content to the interface device 106 by sending the data/content directly to the interface device 106 (e.g., via the local network 110) and/or by directing the interface device 106 to a remote location (e.g., a Universal Resource Locator ("URL") or other link to a location at a server system) from which the interface device 106 can stream or otherwise receive data/content. The interface device 106 receives data/content from the application and/or the remote location and outputs visual and/or audio content corresponding to the received data/content to the display device 108.

In some implementations, the applications include a gaming application (e.g., gaming application 346, FIG. 3) for transmitting messages (e.g., gaming setup commands) to the interface device 106 and for transmitting gaming inputs (e.g., gameplay commands) from the electronic device 104 to the gaming server (e.g., the server system 114) during a gaming session. In some implementations, the setup and gameplay commands are sent to the interface device 106 and/or the server system 114 using input devices that are integrated with the electronic device 104 (e.g., a keyboard and/or mouse of the laptop computer 104-2).

In some implementations, the applications further include a controller application for implementing one or more standardized game controller configurations, templates, or the like, on the electronic device 104. Each of the standardized controller configurations configures the input devices and/or sensors on the electronic device 104 in some way to implement a virtual controller. Which standardized controller configuration is used may vary by the game and/or by the type of electronic device 104. For example, if the electronic device 104 is a mobile device (e.g., 104-1) with a touch screen, a standardized controller configuration that implements a virtual controller pad displayed on, and utilizing the touch screen, is used. The virtual controller pad may include virtual buttons, a virtual directional pad, and/or a virtual joystick. As another example, if the electronic device 104 is a laptop or desktop computer (e.g., 104-2) with a physical keyboard, a standardized controller configuration that maps keys of the physical keyboard to controller functions may be used. As a further example, on an electronic device 104 that includes sensors (e.g., an accelerometer) and for games that use motion of the electronic device 104 as an input, a standardized controller configuration that turns the electronic device 104 into a motion controller with optionally one or more virtual buttons displayed on the touch screen is used.

The interface device 106 is communicatively connected to the game controller 102 and/or the electronic device 104, and to a display device 108. The interface device 106 includes, and can run, one or more applications. In some implementations, the interface device 106 includes one or more applications that are configured to operate in conjunction with the game controller 102 and/or the electronic device 104.

In some implementations, the one or more applications includes a gaming application for receiving and processing messages (e.g., setup commands) from the game controller 102 and/or the electronic device 104, and displaying outputs associated with the commands on the display device 108. In some implementations, the gaming application further receives, in real time, gaming media streams transmitted by the gaming server (e.g., the server system 114), and decodes and outputs to the display device 108. In some implementations, the interface device 106 includes one or more modules for processing the setup commands and the gaming media streams, as will be described in FIG. 4.

In some implementations, the interface device 106 is a casting device (e.g., CHROMECAST by Google Inc.), a hardware dongle, a streaming device, or a device that otherwise includes streaming and/or casting functionalities.

In some implementations, the output of the interface device 106 is connected to an input (e.g., a HDMI port, a USB port etc.) of the display device 108.

In the gaming environment 100, the game controller 102, the interface device 106, and the electronic device 104 are communicatively coupled through communication network(s) 112 to a server system 114 and an authentication system 125. In some implementations, at least some of the devices (e.g., the game controller 102, the electronic devices 104, the interface device 106, and the display device 108) are communicatively coupled to the local network 110, which is communicatively coupled to the communication network(s) 112. In some implementations, the devices (e.g., the game controller 102, the electronic devices 104, the interface device 106, and the display device 108) are communicatively coupled to one another (e.g., without going through the local network 110 or the communication network(s) 112). In some implementations, the authentication system 125 is part of the server system 114.

Figure 1B:
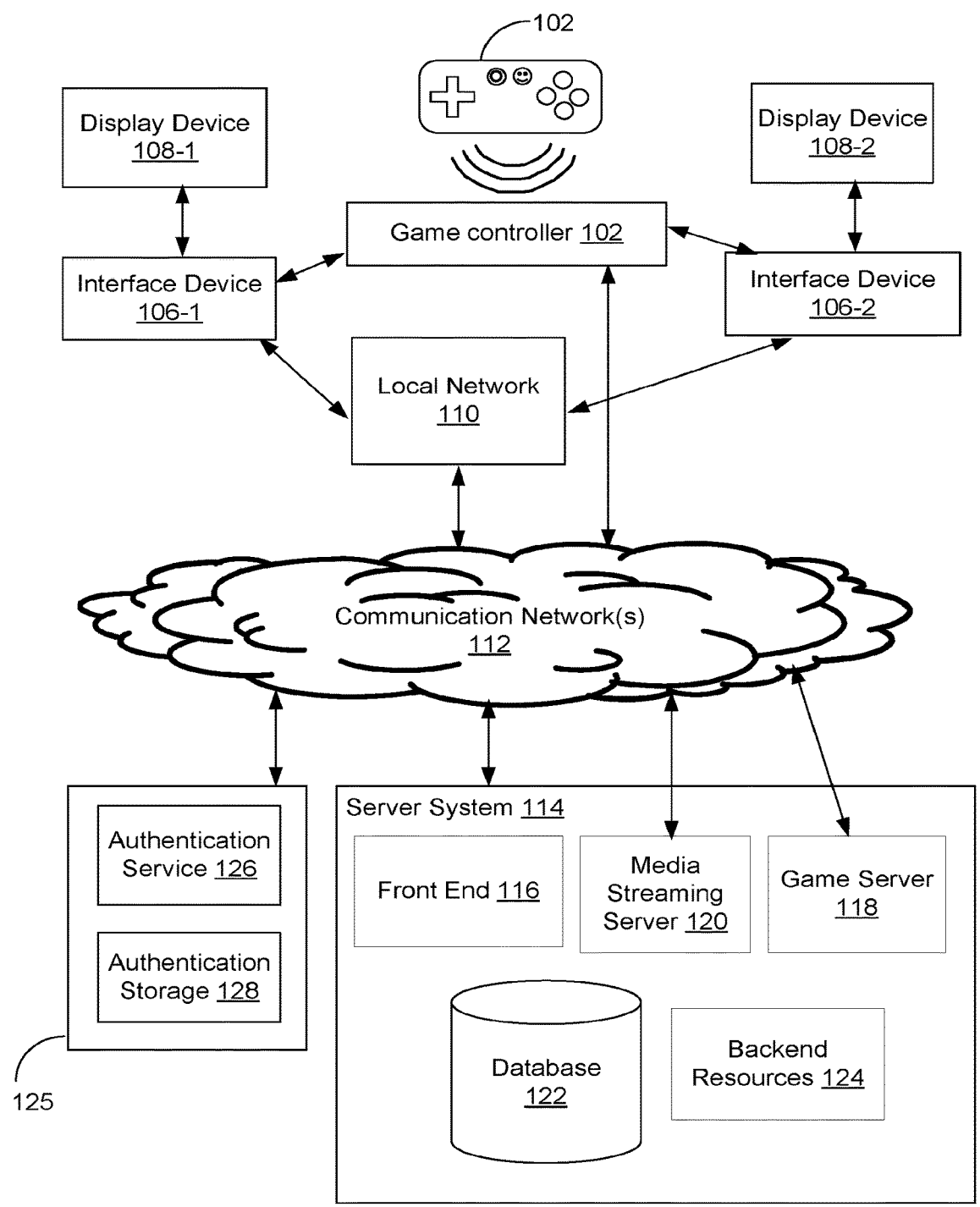
FIG. 1B is another example gaming environment, in accordance with some implementations.
Figure 1C:
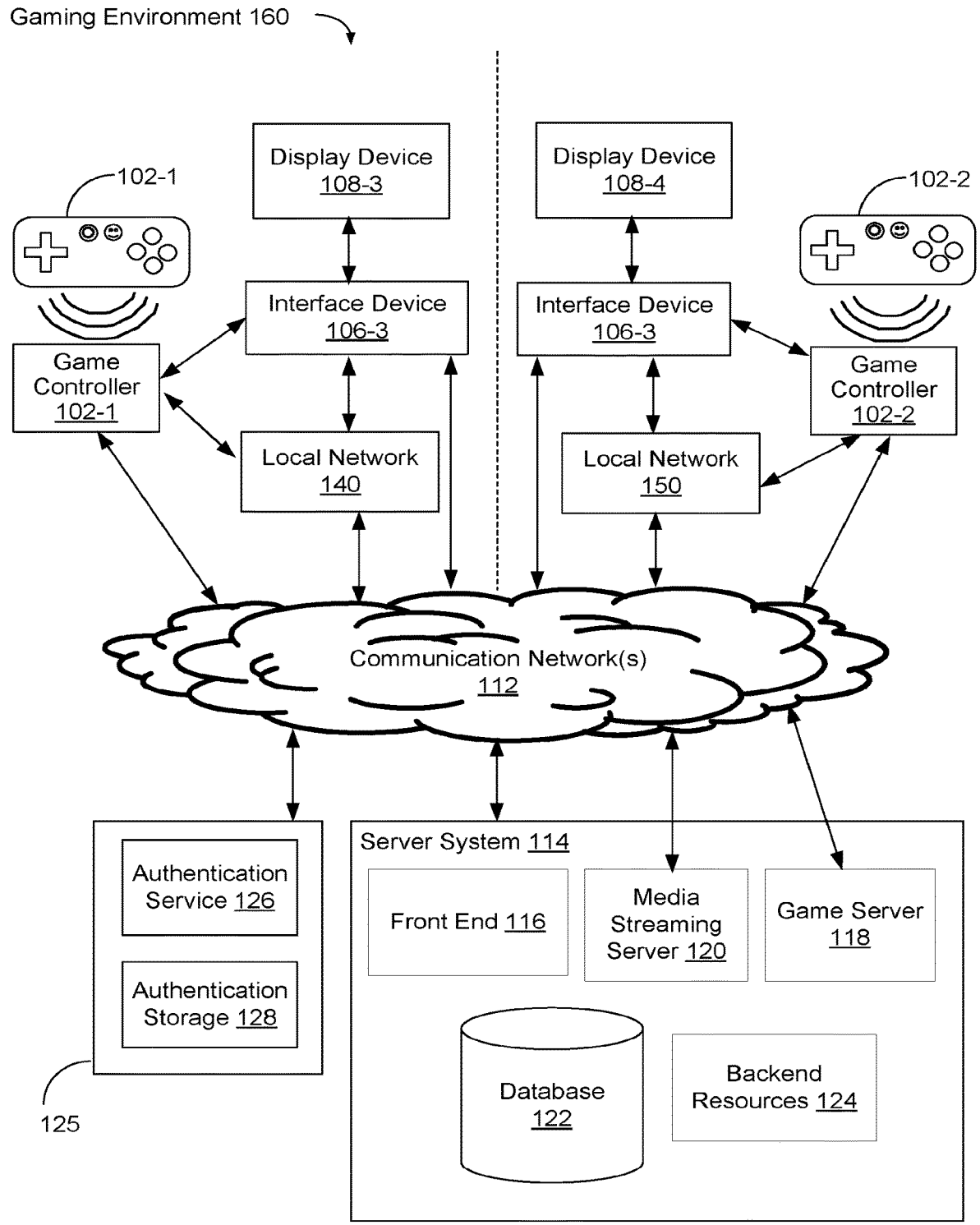
FIG. 1C is yet another example gaming environment, in accordance with some implementations.
Figure 1D:
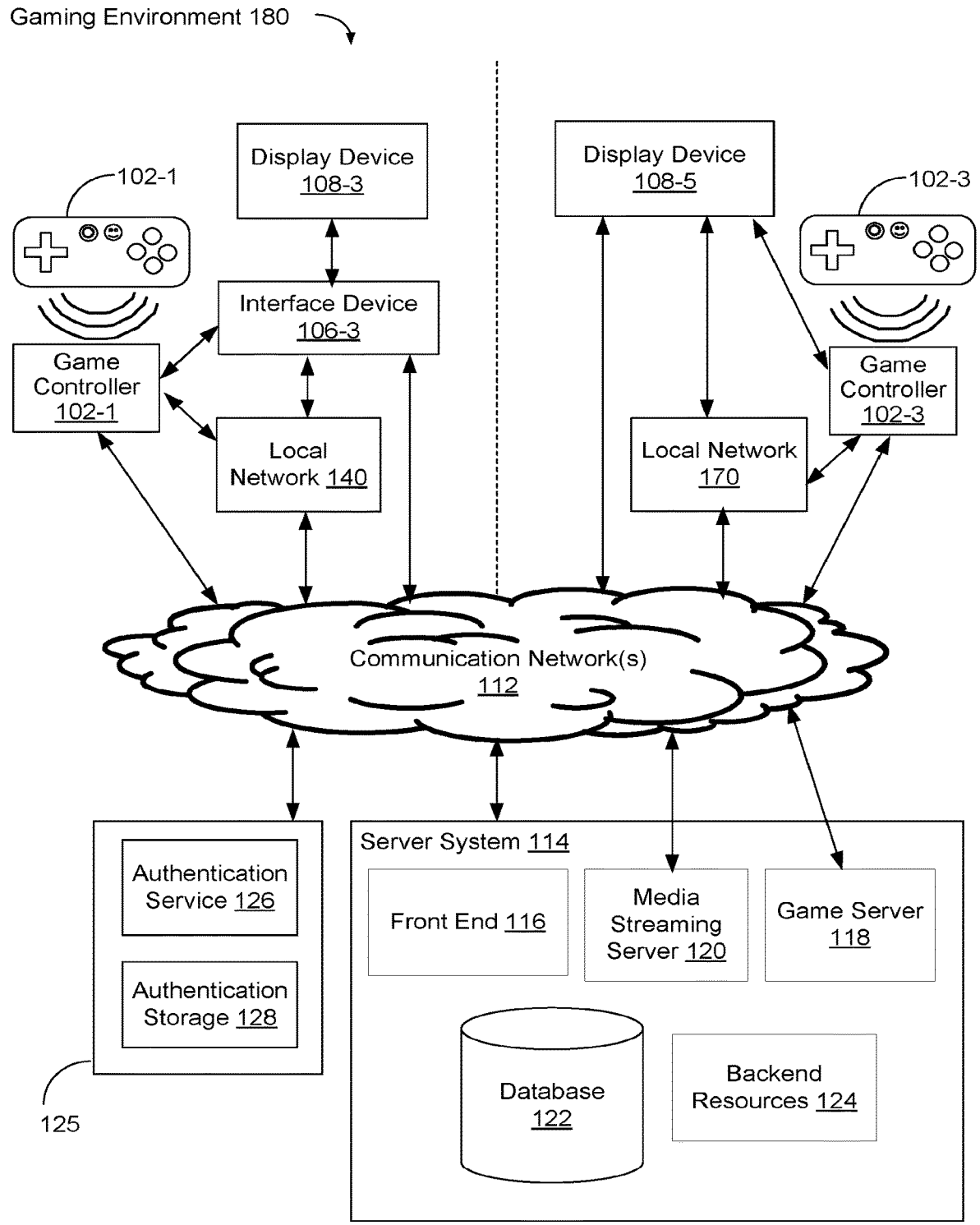
FIG. 1D is yet another example gaming environment, in accordance with some implementations.

In some implementations, the functionality of the interface device 106 is combined with (i.e., contained within or included in) the display device 108 (See also FIG. 1D). For example, in accordance with some implementations, the display device 108 is a television display or a computer monitor with a processing module hosts the one or more applications including the gaming application. In another example, the display 108 is associated with a computing device with an integral display, such as a laptop or tablet, whose processor hosts the one or more applications, including the gaming application. In some implementations, the display device 108 hosts one or more functionalities, including functionalities that enable online gaming. In some implementations, the functionality of the interface device 106 is divided (e.g., split) between the game controller 102 and the display device 108.

In some implementations, the server system 114 is an interactive cloud gaming platform and provides gaming content and processing capabilities. In some implementations, the server system 114 serves hundreds of thousands of users ("gamers") at any given point in time.

The server system 114 hosts an online interactive gaming platform to support client devices (In this application, the game controllers 102, the electronic devices 104, and the interface devices 106 are collectively referred to as "client devices" of the server system 114) to play the one or more gaming applications. Specifically, the server system 114 includes a plurality of user accounts associated with the client devices, and authenticates the users of the client devices in association with each of the one or more gaming applications. The server system 114 renders and refreshes a scene of the online interactive game on the client devices 102 that join corresponding gaming sessions associated with the scene. In some implementations, the server system 114 may assess the capabilities of the client devices and/or a quality of the communicative connection between the server system 114 and each of the client devices, and adaptively generates synchronous data streams for the gaming sessions associated with the client devices. By these means, the server system 114 is configured to facilitate synchronous gaming sessions of an online interactive game on two or more client devices simultaneously and with substantially low latencies.

In some implementations, the server system 114 includes a front end 116 that interfaces directly with the game controller 102, the interface device 106, and the electronic device 104 via the communication network(s) 112. The front end 116 receives requests (e.g., a request to start a gaming session) and transmits information in response to the requests (e.g., sends game content). In some implementations, the front end 116 is configured to send data (e.g., database updates) to the client devices.

In some implementations, the front end 116 forwards a subset of the received requests to backend resources 124, which obtains the requested data and/or performs the requested service. In some implementations, the backend resources 124 may store and/or access data (e.g., game state data) in accordance with the requests.

The server system 114 includes a game server 118 that communicates directly with a media streaming server 120. The game server 118 provides gaming content and other functionalities (e.g., processing capabilities) that allow for seamless gameplay.

In some implementations, the game server 118 dynamically allocates cloud gaming hardware resources (e.g., GPU and encoder resources) and monitors and utilizes network bandwidth available to individual end users to provide optimal cloud gaming experience. In some implementations, the game server 118 provides multiple performance tiers, including a tier that supports high performance, real time gaming sessions with high definition video/media streams.

In some implementations, the game server 118 dynamically generates a number of frames in response to a user command from a user who plays an online gaming session. In accordance with a type of the user command (e.g., jumping, shooting a gun), the game server 118 determines an expected response latency, actual communication and processing latencies, and an actual transmission latency. The number of frames is calculated based on the actual transmission latency and a predefined frame rate. As a result, the command is executed in the online gaming session by generating a set of frames reflecting an effect of the command. The set of frames when transmitted at a predefined frame rate occupy a transmission time corresponding to the actual transmission latency, and can be received at a client device (e.g., the interface device 106) within a time corresponding to the expected response latency.

In accordance with some implementations, the game server 118 renders gameplay outputs in response to the gameplay inputs. In some implementations, to minimize latency perceived by the user during gameplay, the game controller 102 and the electronic device 104 each communicates directly with the game server 118. For example, the game server 118 receives gameplay commands directly from the game controller 102 and renders a respective frame of content of the game in accordance with the received commands. The game server 118 sends information about the rendered frames to the media streaming server 120, which then transmits to the interface device 106, in real time, the gaming media streams including the respective rendered frame, for display on the display device.

In some implementations, the game server 118 supports different subscription models and/or is configured to provide one or more concurrent real time gameplay and/or review media streams that correspond with little or no latency to one or more actual gaming streams (e.g., a video stream output to a client device of a user participating in an online/cloud gaming session via either a mobile app or a browser-based program). In accordance with some implementations, the game server 118 is configured to generate concurrent media streams for gameplay and review videos, and the media streaming server 120 is provided with review videos for concurrent gameplay. Such review videos are provided with little or no latency via a media streaming site, such as YouTube, to one or more users. In some implementations, the media streaming server 120 further manages one or more media streaming sites.

In some implementations, the server system 114 regularly communicates with the interface device 106 to check if the player is still online. In some implementations, when the game server does not receive a response (e.g., from the interface device 106 and/or the game controller 102), the server system 114 issues commands to set the game character associated with the player to a standby mode, or "kicks" the character from the game.

In some implementations, the server system 114 includes a database 122 for storing users and sessions data. The database 122 stores at least user information associated with user accounts of each of one or more gaming applications (e.g., gaming application 348, FIG. 3) that are hosted on the server system 114. Examples of the user information 126 include, but are not limited to, user account information (e.g., identification and passwords), membership type, preference, and activity history. In some implementations, the server system 114 stores session data associated with the online gaming sessions that are played using the game controllers 102. Examples of the session data for each online gaming session include, but are not limited to, a frame rate, a rendering specification, a normal latency requirement, information of GPU allocation, information of encoder allocation, identifications of related sessions, and latest status information. The session data is accessed more frequently than the user information. In some implementations, memory storing the user information and the session data is made of a flash memory and random access memory (RAM), respectively.

In some implementations, the server system 114 supports a live online community associated with a game application. Users (e.g., subscribers of a service) participate in live events, tournaments or activities on the corresponding gaming API platform throughout the day. Examples of the live events, tournaments or activities include spectating live gaming sessions played by other users, posting your accomplishments to a public domain (e.g., YouTube), and getting live tips and coaching videos. For example, in response to a user action, the game server 118 provides two or more live streams. While keeping a first gaming stream on a first gaming session of the first client device for a game player, the server system 114 also broadcasts a second live review stream (e.g., YOUTUBE streams) to one or more other client devices (e.g., of subscribers). The second live review stream allows the user to share gaming experience with audience. Optionally, the second live stream is a reproduction of a screen of the first client device of the player (e.g., the display device 108). The server system 114 may obtain an audio stream in which the player explains the first gaming session, or a video stream of the player playing and explaining the first gaming session. The audio stream is optionally played for the audience while the second live review stream is played for the audience. The video stream is optionally played in an embedded window in the second live review stream.

The gaming environment 100 further comprises an authentication system 125 that includes an authentication service 126 and an authentication storage 128. The authentication service 126 is a standalone service that serves as a proxy and handles first- and third-party authentication related operations. The authentication storage 128 stores device identification of each and every game controller 102 and information about linked users that are associated with each and every game controller 102.

In accordance with some implementations, the game controller 102 is identified by a (e.g., unique) device identification and a client certificate that is used by the game controller to make authenticated requests to a remote server (e.g., to the server system 114 and/or the authentication system 125). Further, in some implementations, the game controller 102 stores credentials for every user of the game controller 102. As an example, the game controller 102 may be used by various members of a household for gaming. Accordingly, the game controller 102 stores credentials (e.g., usernames, login credentials, password, authentication challenges and responses) for each household member that uses it. Thus, the game controller 102 can be linked to (associated with) its device identification, client certificate, users and their credentials. In some implementations, in response to a request to start a gaming session, the game controller sends information about the device identification, client certificate and/or user credentials for verification by the authentication service 126 against information stored in the authentication storage 128.

In some implementations, as part of the process of linking a gaming session, the server system 114 accesses a quality of the communicative connection between the server 114 system and each of the client devices.

In some implementations, the server system 114 measures network latency between the client devices and the server system 114. If the measured latency is above a threshold and a lower-latency connection is available, the server 114 can suggest that the player client 104 change to the lower latency connection, or invite the player user of the player client 104 to change the player client 104 to the lower latency connection. For example, if the client device is an electronic device 104 (e.g., a mobile phone) on a cellular wireless connection (not shown) the local network 110 is available, the server system 114 can suggest that the electronic device 104 should connect through the local network 110. In some implementations, the latency threshold requirements differ between games. For example, some games (e.g., action games) are best experienced on lower latency connections, and some other games (e.g., online board games or card games) are not as demanding with respect to latency, and the server system 114 may make connection recommendations in view of these different requirements.

In some implementations, as part of the electronic device 104 starting a gaming session, the server system 114 communicates with the electronic device 104 to set up a virtual controller (e.g., using the controller application) on the electronic device 104. In some implementations, this includes the server system 114 assessing whether the electronic device 104 has the needed resources for the controller, including whether the electronic device 104 has an application needed to implement the virtual controller and/or whether the communicative connection between the electronic device 104 and the server 114 has a latency that is appropriate for the game session (e.g., as part of the capabilities and connection quality assessment described above). Depending on the available resources at the electronic device 104, the connection quality, and the requirements for the game, the controller may be implemented differently at the electronic device 104.

FIG. 1B illustrates another example gaming environment 130 in accordance with some implementations. In many aspects, the gaming environment 130 is similar to the gaming environment 100. The main difference between the gaming environment 130 and the gaming environment 100 is that the gaming environment 130 comprises the game controller 102 and two interface devices 106-1 and 106-2, which are coupled, respectively, to display devices 108-1 and 108-2. The game controller 102 is communicatively coupled to (e.g., pairs with) each of the interface devices 106-1 and 106-2.

In some implementations, the game controller 102, the interface devices 106-1 and 106-2, and the display devices 108-1 and 108-2 reside in a local environment (e.g., a home environment, a dormitory, an office environment etc.) that includes the local network 110. In some implementations, the interface device 106-1 and the interface device 106-2 are located in different areas (e.g., in different rooms) of the local environment.

In accordance with some implementations of this application, the server system 114 enables cloud features that allow a user of the game controller 102 to move around, e.g., pausing/suspending a first game stream of a first gaming session executed on a first interface device 106-1, and restarting the first game stream on a second interface device 106-2 to continue the first gaming session. The server system 114 also supports multiple players on a massive scale, and provides richer more persistent cloud-based worlds. The server system 114 uses a cloud-based system to store, in the database 122, session data related to different gaming sessions of the same user, or different gaming sessions of different users. Accordingly, by applying this example in the context of the home environment, the user of the game controller 102 is able to start gameplay using the first interface device 106-1 (e.g., in the bedroom), pause the gaming session, take the game controller 102 to a location that includes the second interface device 106-2 (e.g., the living room), and resume gameplay in the living room.

In some implementations, the game controller 102 stores an identifier of each of the interface devices 106-1 and 106-2 that it has been paired with. In some implementations, the game controller 102 sets one of the interface devices 106 as its default pairing device.

In some implementations, the gaming environment 130 can be expanded to include three or more interface devices 106, each of which is communicatively coupled with the game controller 102.

In some implementations, the gaming environment 130 includes two or more game controllers 102 (e.g., 102-1 and 102-2), each of which is communicatively coupled to each of the interface devices 106.

FIG. 1C illustrates yet another example gaming environment 160, in accordance with some implementations. In many aspects, the gaming environment 160 is similar to the gaming environments 100 and 130. The main difference between the gaming environment 160 and the gaming environments 100 and 130 is that the gaming environment 160 comprises two game controllers and two interface devices, including a first game controller 102-1 and a first interface device 106-3 on a first local network 140, and a second game controller 102-2 and a second interface device 106-4 on a second local network 140. Each of the interface devices 106-3 and 106-4 is coupled to respective display devices 108-3 and 108-4 that output visual and/or audio content. It will be apparent to one of ordinary skill in the art that the gaming environment 160 can be expanded to include three or more sets of game controllers 102 and interface devices 106, wherein each of the sets is on a respective local network.

In the gaming environment 160, the game controller 102-1 (and the interface device 106-3) is remote from the game controller 102-2. In other words, a user of the game controller 102-1 is not located in the same area (e.g., in the same room or even structure) as a user of the game controller 102-1.

In some implementations, gaming sessions of the game controllers 102 are synchronized to play the same game scene, optionally with distinct perspectives corresponding to their respective users.

In accordance with some implementations, even though the game controller 102-1 (the interface device 106-1) and the game controller 102-2 1 (the interface device 106-2) are remote from each other, a game may be started by launching a gaming application for execution at each game controller 102 (interface device 106). In some implementations, for each game controller 102 (interface device 106), the gaming application establishes an online gaming session with the server system 114 independently. The online gaming sessions of two or more game controllers 102 (interface devices 106) are related to each other (e.g., because they are played in the same game domain of the gaming application), and therefore, share a game scene in the gaming application. The related online gaming sessions are synchronized with each other, and each online gaming session optionally shows the same game scene with a unique player perspective corresponding to the respective game controller 102 (interface device 106). A user of each game controller 102 (interface device 106) can therefore play the game on the respective game controller 102 (interface device 106) and influence the output from the online gaming sessions on the other game controller(s) 102 (interface device(s) 106).

Alternatively, in some other implementations, after the gaming application of a first game controller 102-1 establishes an online gaming session, one or more second game controllers 102-2 are invited to join the online gaming session by an invitation message, and for example, a message with the link (e.g., a URL address) to join the online gaming session is sent to each of the second interface devices 106-2. In accordance with some implementations, when the second game controllers 102-2 join a gaming session, the server system 114 creates a separate gaming session for each individual second game controllers 102-2. Each separate gaming session of the respective second client second game controllers 102-2 is synchronized with and shares the same scene with the gaming session of the first second game controllers 102-1, but can have a unique player perspective corresponding to the respective second client second game controllers 102-2. After each second game controllers 102-2 has joined the gaming session (more accurately, started its related gaming session), a user can play the game on the respective second game controllers 102-2 and influence the output of the gaming sessions running on the other game controllers 102.

FIG. 1D illustrates yet another example gaming environment 180, in accordance with some implementations, in which one or more game controllers 102-1 are coupled to a display device 108-3 via an interface device 106-3, and in which one or more game controllers 102-3 are coupled to a display device 108-5—either directly or via a local area network 170—without need for an interface device 106. In some implementations, at least a subset of the functionality of the interface device is contained within (i.e., included in) the display device 108-5. For example, as illustrated in FIG. 1D, the display device 108-5 is configured to interact directly with the game controller 102-3, and directly with the server system 114 and the authentication system 125 via the communication network(s) 112. In some implementations, the display device 108 is a television display or a computer monitor with a processing module hosts one or more applications, including a gaming application and one or more applications that provide at least a subset or a superset of the functionality of an interface device 106, that enable a user of one or more of the controllers 102-3 to participate in an online gaming session. In another example, the display 108-5 is associated with a computing device with an integral display, such as a laptop or tablet, whose processor hosts the one or more applications, including the gaming applications and one or more applications that provide at least a subset or a superset of the functionality of an interface device 106.

In some implementations, communication between the display device 108-5 and the game controller 102-3 is via the local network 170. In some implementations, the display device 108-5 and the game controller 102-3 are communicatively coupled to each other directly (e.g., without going through the local network or the communication network(s) 112). For example, the game controller 102-3 can communicate directly with the display device 108-5 via a wired connection or a wireless connection (e.g., a Bluetooth, cellular, direct WiFi, or IEEE 802.15.4 connection). In some implementations, the local network 140 and local network 170 are the same local network. This allows two or more players to connect from a same location (e.g., house or public location) to a gaming server 114 to play the same or different gaming titles whose respective outputs are displayed on a respective display device 108-3, 108-5, with or without an interface device 106-3.

Process Flow

Having described the various gaming environments, we now discuss various process flows.

In accordance with some implementations of this application, a game controller is communicatively connected to (e.g., paired with) an interface device 106 and powered on. A user can initiate gaming by pressing a button (e.g., a "start" or a "home" button) on the game controller 102, which sends a signal to the interface device 106 to launch a gaming portal user interface (UI) that is displayed on the display device 108. Then, the user can select a game on the gaming portal UI to initiate a game launch (e.g., by pressing another button).

Figure 2A:
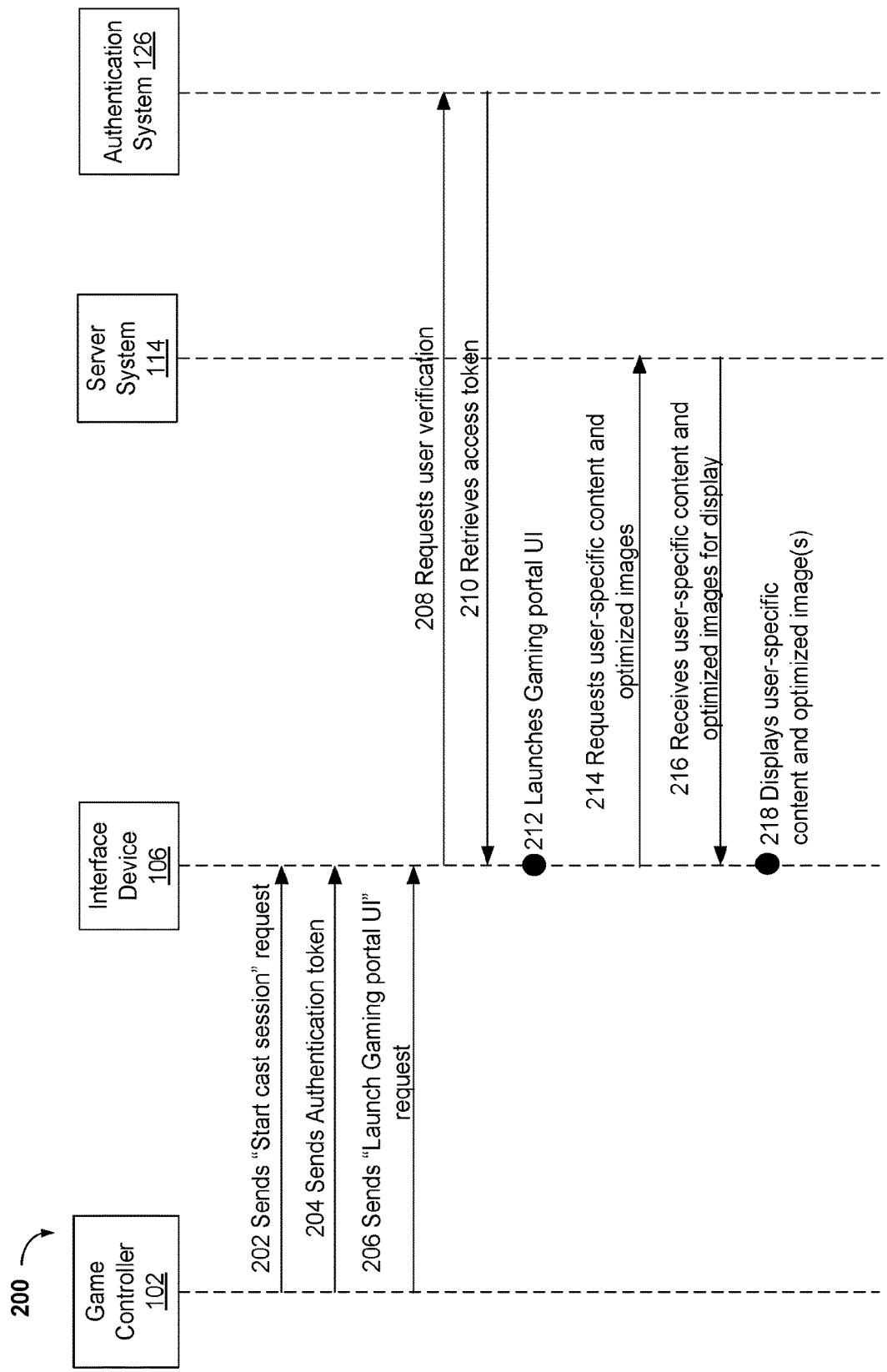
FIG. 2A illustrates an example operation sequence to launch a gaming portal user interface (UI).

FIG. 2A illustrates an example operation sequence 200 to launch the gaming portal user interface (UI). In some implementations, the elements and steps described in the operation 200 may pertain to elements and flows shown in FIG. 1. Other implementations are possible.

In some implementations, the gaming portal UI is hosted on the interface device 106 (e.g., gaming portal UI module 437, FIG. 4) and is launched when starting the gaming application on the interface device 106. The gaming portal UI enables access to a user's profile, purchased games, and other entitlements, game catalog, friends, messaging etc.

As illustrated by FIG. 2A, launching of the gaming user interface (UI) portal includes communication between the game controller 102, the interface device 106, the server system 114, and the authentication system 125. The sequence 200 (or message flows) may be executed in a gaming environment (e.g., the gaming environment(s) 100, 130, and/or 160), in which the environment is asynchronous and non-blocking.

The user presses a button (e.g., a "start" button or a "home" button) on the game controller 102 to start the gaming application on the interface device 106 (not shown). The game controller 102 sends (202) a "start cast session" request to the gaming application on the interface device 106 using the default interface device identifier that it retrieves from its internal storage. If successful, a cast (game pairing) session is established between the game controller 102 and the interface device 106, and the gaming application is launched on the interface device 106.

In some implementations, the interface device 106 determines a state of the display device 108 (e.g., on or off) that it is connected to, and attempts to switch on the display device 108 if it is off. In some implementations, the interface device 106 attempts to switch on the display device 108 is in accordance with a determination that Consumer Electronics Control (CEC) is enabled on the display device 108.

The game controller 102 sends (204) an authentication token to the interface device 106. In some implementations, the authentication token is self-contained and transmits information between parties in a secure manner. In some implementations, upon pairing with the interface device 106, the game controller 102 retrieves a token (e.g., a JSON Web token (JWT)). The game controller 102 parses it to extract the signed JWT, client certificate and intermediate certificate chain, and sends the signed JWT, its expiry period, client certificate and intermediate certificate chain to the gaming application on the interface device 106.

The user launches (206) the gaming portal UI by pressing a second button (which may be the same button, or a different button) on the game controller 102, which transmits a launch command to the interface device 106.

The interface device 106 receives the launch command and requests (208) user verification from the authentication system 125.

Figure 4:
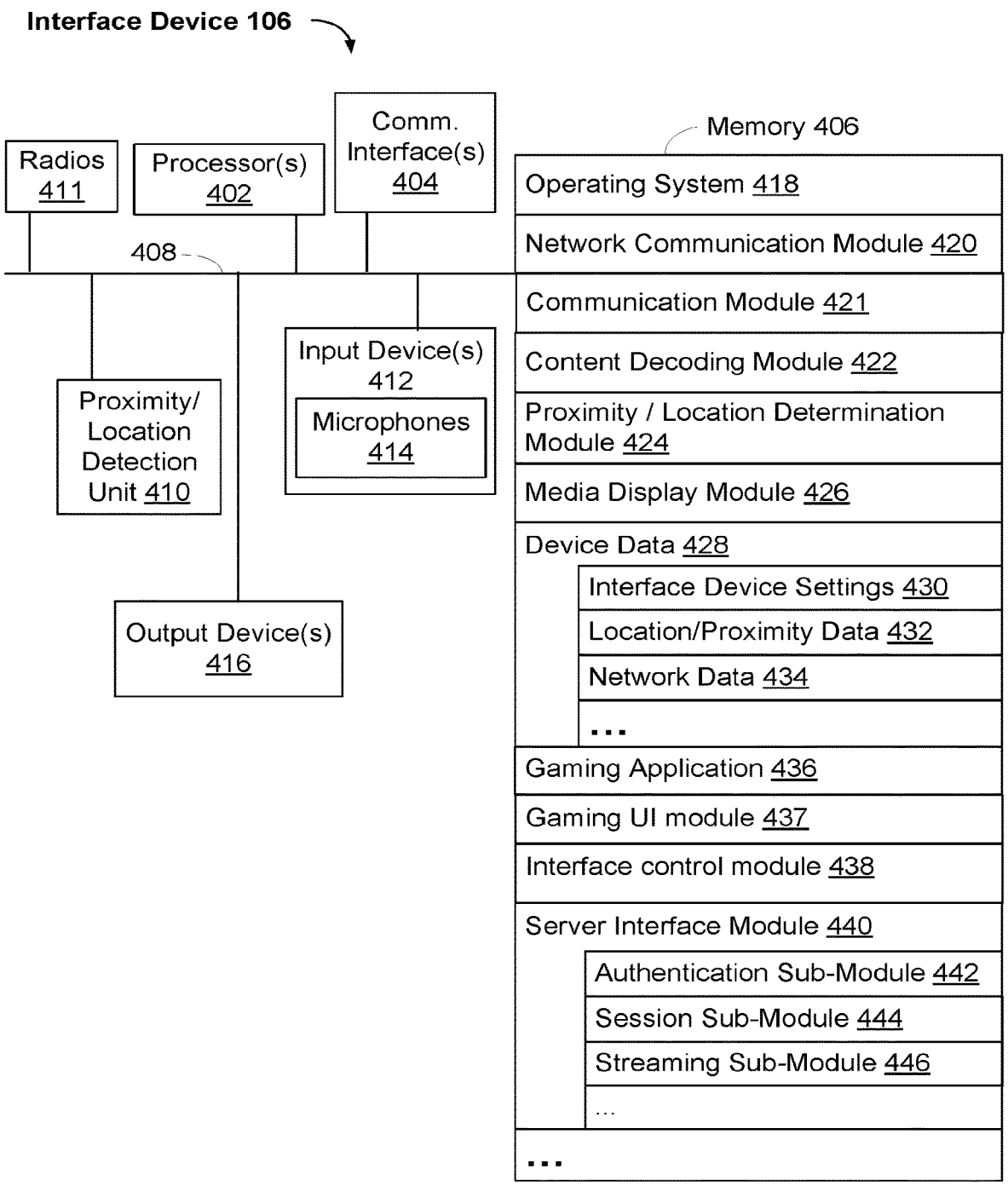
FIG. 4 is a block diagram illustrating a representative interface device, in accordance with some implementations.

In accordance with some implementations, the launch command is received by the gaming application of the interface device 106 (e.g., gaming application 436, FIG. 4), and relayed to an interface control module (e.g., interface control module 438, FIG. 4). The interface control module sends a request to the authentication service 126 together with the received authentication token (step 204), to request access to gaming (i.e., server) resources. The authentication system 125 verifies the identification of the game controller 102 and its linked user (e.g., by matching the identification with information stored in the authentication storage 128).

If the verification is successful, the authentication system 125 retrieves (210) an access token (e.g., an OAUTH token) for the linked user. The interface device 106 launches (212) the gaming portal UI providing the access token and its expiry.

The interface device 106 requests (214), from the front end 116 of the server system 114, user specific content for the portal landing page (e.g., the user's Avatar, purchased games, friends, messaging etc.) and requests (214), from the backend resources 124, optimized images for display on the display device 108. In some implementations, the requesting step (step 216) are performed by a gaming portal module (e.g., gaming portal module 437, FIG. 4).

The interface device 106 receives (216) the requested content, and displays (218) the requested content.

In some implementations, when the gaming portal UI is launched for the first time, or is restarted, the interface device 106 operates in a default first mode (e.g., a "menu" mode) in which all inputs from the game controller 102 are sent to the gaming portal UI through the gaming application of the interface device 106 over the local wired or Wifi network that the game controller 102 and the interface device 106 are connected to.

In some implementations, if a headset is connected to (e.g., plugged into) the game controller 102, the game controller sends a "headset connected" message to the interface device 106. The interface device 106 tracks the game controller 102 device identification to the headset connection. The gaming portal UI sends back an audio message to the game controller 102 on any other user event (or other feedback) which is then decoded and played back on the game controller 102.

Figure 2B:
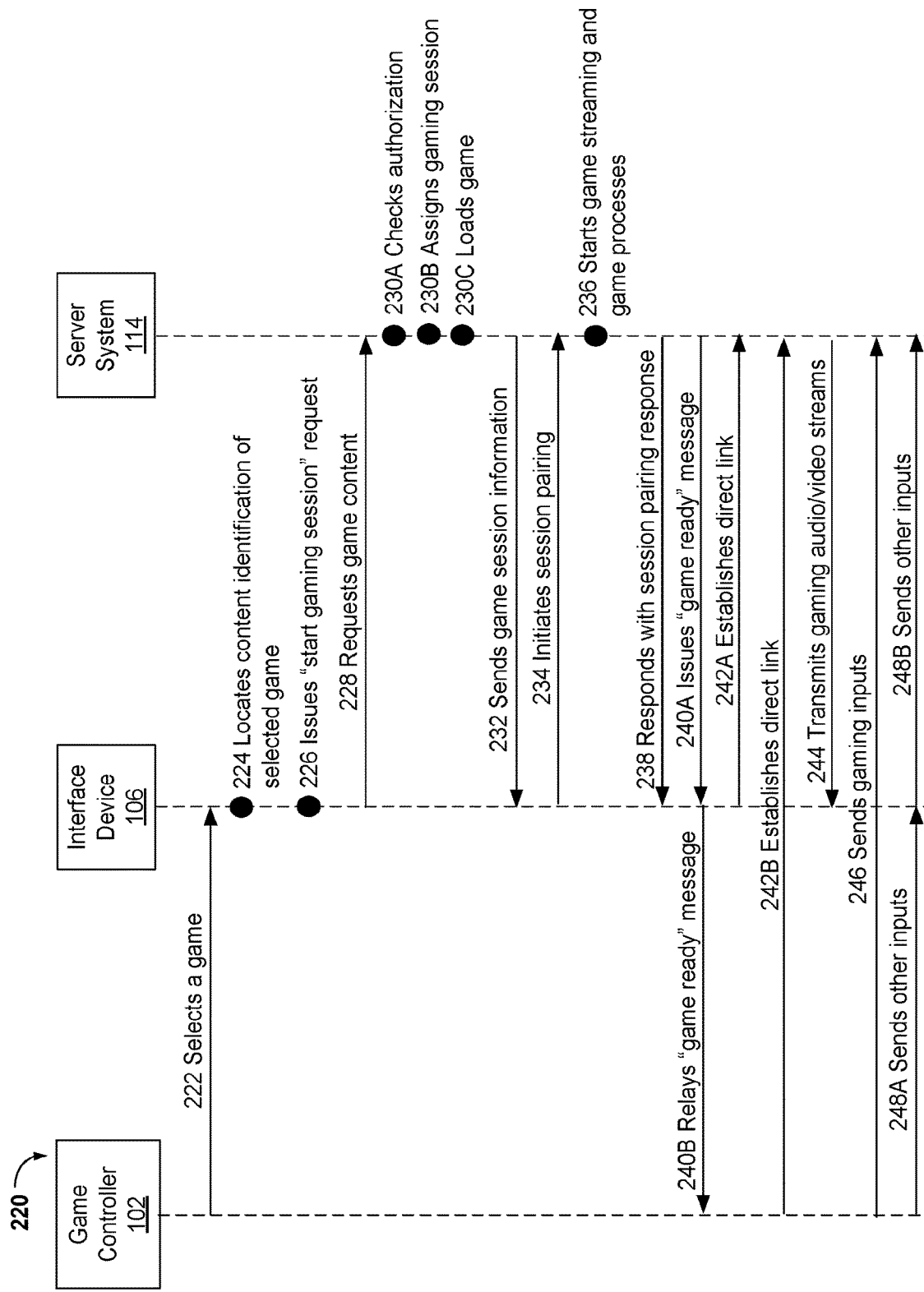
FIG. 2B illustrates an example operation sequence to launch a game session.

FIG. 2B illustrates an example operation sequence 220 to launch a game session, in accordance with some implementations. In some implementations, the elements and steps described in the operation 220 may pertain to elements and flows shown in FIGS. 1 and 2A. Other implementations are possible.

As shown in FIG. 2B, launching a game session involves communication between the game controller 102, the interface device 106, and the server system 114. The sequence 220 (or message flows) may be executed in a gaming environment (e.g., the gaming environment(s) 100, 130, and/or 160), in which the environment is asynchronous and non-blocking. The sequence 220 assumes that the gaming portal UI has been launched (e.g., using the process of FIG. 2A).

The user selects (222) a game on the gaming portal UI using the game controller 102, and initiates a game launch request.

The interface device 106 locates (224) content identification of the selected game and issues (226) a request to start a gaming session, in response to the game launch request.

In some implementations, the game launch request (e.g., command) is received by the gaming application of the interface device 106 (e.g., the gaming application 436, FIG. 4), and relayed to the interface control module (e.g., the interface control module 438, FIG. 4), which then forwards it to the gaming portal UI module (e.g., the gaming UI module 437, FIG. 4). The gaming UI module processes the command to locate a "content identification" of the selected game, and sends back the content identification of the selected game to the gaming portal UI. The gaming portal UI module invokes a callback on the interface control module, which then issues the request to start the gaming session. In some implementations, communications within the interface device 106 are performed using a standardized communications protocol (e.g., Web Socket).

The interface device 106 requests (228) game content from the server system 114 using the content identification of the selected game (e.g., using the interface control module 438, FIG. 4).

The server system 114 checks (230A) for proper authorization, assigns (230B) a gaming session, and loads (230C) the game.

In some implementations, the interface device 106 communicates requests to the game server 114 using a server interface module (e.g., server interface module 440, FIG. 4). The server interface module requests the game content from the front end 116 of the server system 114. The front end 116 checks for proper authorization and coordinates with the backend resources 124, which communicates with the game server 118. The game server 118 assigns the gaming session and initiates game launch.

The server system 114 sends (232) gaming session information (e.g., session id, game server provisioning IP address, port etc.) to the interface device 106. In some implementations, the server system 114 sends the gaming session information to the server interface module (e.g., server interface module 440, FIG. 4) of the interface device 106, which invokes a callback on the interface control module 438 providing this information.

In response to the gaming session information, the interface device 106 initiates (234) a session pairing request with the server system 114. The server system 114 starts (236) the game streaming and game processes (e.g., on the game server 118 and the streaming server 120), and immediately responds (238) with a session pairing response.

Once the game is done loading, the server system 114 issues (240A) a "game ready" message to the interface device 106, which in turn relays (240B) the game ready message to the game controller 102.

In some implementations, the game loading is performed by the game server 118. Once the game is done loading, the game server 118 informs the streaming server 120 to get ready to accept a client connection, and issues the game ready message (In this instance, the "client" refers to both the game controller 102 and the interface device 106).

In accordance with some implementations in this application, the game ready message issued by the server system 114 in steps 240A and 240B includes a "handshake" offer for direct communication between the streaming server 120 and the client (i.e., between the streaming server 120 and the interface device 106, and between the streaming server 120 and the game controller 102). In some implementations, the handshake offer is in a datagram transport layer security (DTLS) protocol message format. In some implementations, the handshake offer includes a value (e.g., a hash value of an authentication certificate) necessary for the handshake between the streaming server 120 and the client.

Using the handshake offer, the interface device 106 establishes (242A) a direct link with the server system 114 (e.g., with the game server 118 and the streaming server 120). Similarly, the game controller 102 establishes (242B) a direct link with the server system 114 (i.e., with the game server 118 and the streaming server 120).

The streaming server 120 of the server system 114 transmits (244) gaming audio/video streams to the interface device 106, for display on the display device 108.

The game controller 102 sends (246) gaming inputs to the game server 118, which renders the frame based on the gaming inputs and sends it to the streaming server 118, which transmits the gaming media streams to the interface device 106 for display on the display device 108. Additionally, the game controller 102 sends (248A) other messages to the interface device 106, which processes the messages and sends (248B) a subset of the messages to the game server 114.

In some implementations, the streaming server 120 includes two streams, one for sending audio/video and the other for receiving input and send back rumble and other information. In some implementations, the streaming server 120 receives a new initialization message from its streaming clients (e.g., the interface device 106) that indicates whether audio should be sent on a particular connection channel, with the current audio/video connection defaulting to true.

In some implementations, if the game controller 102 detects a headset before it connects to the streaming server 102 (in step 242B), the game controller 102 will convey this message immediately after its connection to the streaming server 120 is established. Otherwise, the game controller 102 will send this message as soon as it detects a headset that is plugged in.

In some implementations, in accordance with receiving headset connection message on a particular connection channel, the streaming server 120 starts sending audio on the particular connection channel and stops audio on the other connection.

In some implementations, if the headset is unplugged from the game controller 102, the game controller 102, will send a "stop audio" message to the streaming server 120, causing the streaming server 120 to switch back to sending audio over the audio/video connection.

In some implementations, the game controller 102 includes a "quick access" button that allows the user to access key functionality regardless of whether the user is in the gaming portal UI or playing a game.

In some implementations, the interface device 106 (and corresponding, the game controller 102) operates in two modes, namely: (1) a first mode (e.g., "menu" mode) in which all game controller inputs are sent to the interface device 106 over the local network; and (2) a second mode (e.g., a "game" mode) in which a subset of controller commands is sent by the game controller 102 to the interface device 106 and everything else is sent to the remote game (e.g., to the server system 114). In some implementations, the subset of controller commands comprises commands (or functionality) accessed by the "quick access" button.

In some implementations, the interface device 106 is always in the first mode when the gaming portal UI is launched for the first time.

Architecture

We now discuss exemplary architecture of the game controller 102, the interface device 106, and the server system 114. In some implementations, the elements described in the architecture pertain to elements and flows in FIGS. 1 and 2.

Figure 3:
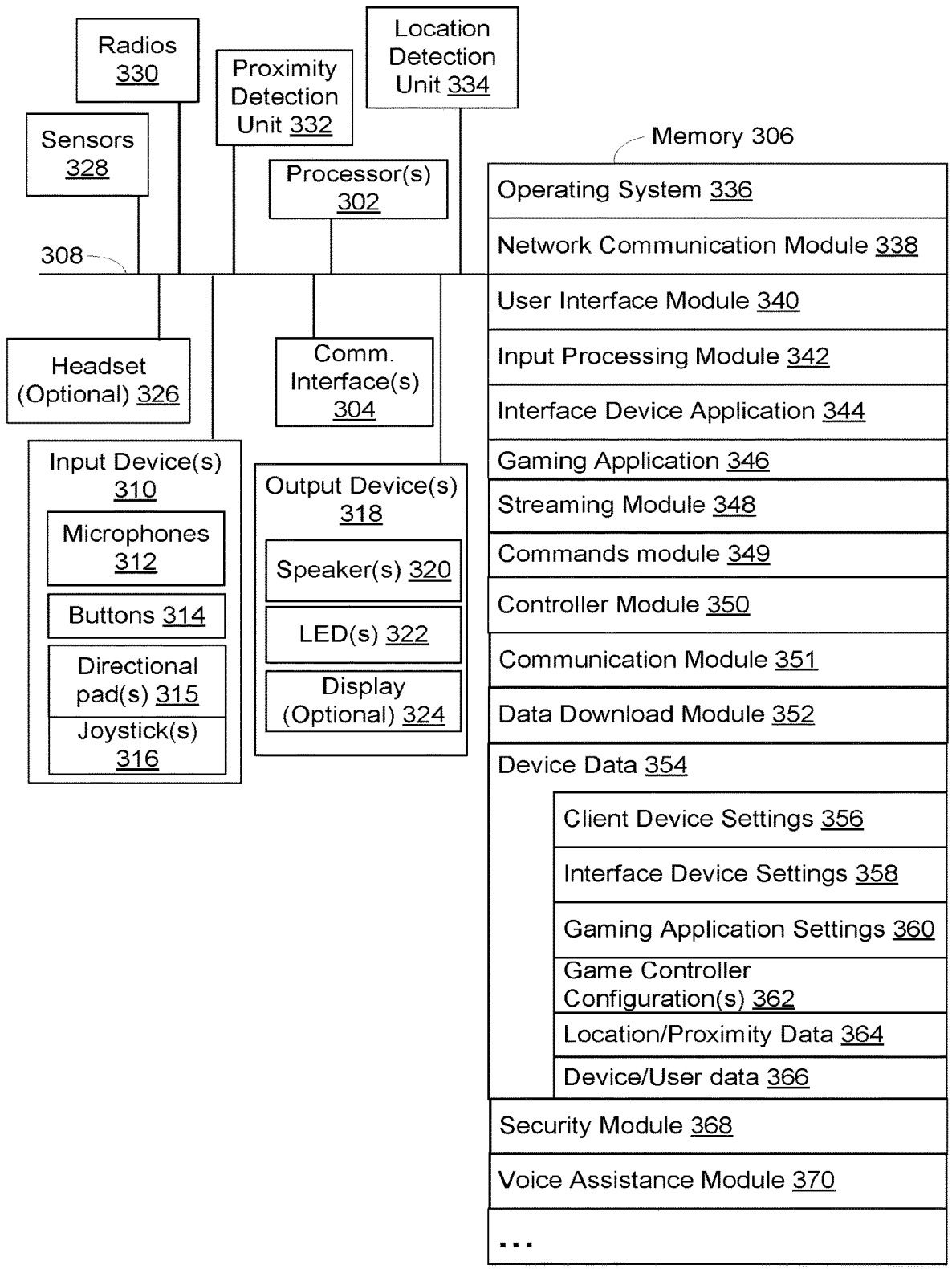
FIG. 3 is a block diagram illustrating a representative game controller, in accordance with some implementations.

FIG. 3 is a block diagram illustrating the game controller 102 of the gaming environments 100, 130, and 160, and in the operation sequences 200 and 220, in accordance with some implementations. The game controller 102, typically, includes one or more processor(s) (CPUs) 302, one or more communication interface(s) 304, memory 306, and one or more communication buses 308 for interconnecting these components (sometimes called a chipset). The game controller 102 includes one or more input device(s) 310 that facilitate user input, such microphones 312 (or a voice-command input unit), buttons 314, directional pad(s) 315, and joystick(s) 316. In some implementations the game controller 102 further includes gesture recognition features. In some implementations, the processing capabilities of the game controller 102 are integrated into a standalone hardware component that can be interfaced with the input device(s) 310.

The game controller 102 also includes one or more output device(s) 318 that facilitate audio output and/or visual output, including speaker(s) 320, LED(s) 322, and/or optionally, a display 324. The game controller 102 includes a location detection unit 334, such as a GPS (global positioning satellite) or other geo-location receiver, for determining the location of the game controller 102. The game controller 102 further include a proximity detection unit 332, e.g., an IR sensor, for determining a proximity of an interface device 106 and/or of other game controllers 102 and/or electronic devices 104. The game controller 102 may also include one or more sensor(s) 328 (e.g., accelerometer, gyroscope, etc.) for sensing motion, orientation, and other parameters of the game controller 102, which may be used as input. In some implementations, the processing capabilities of the game controller 102 are integrated into a standalone hardware component that can be interfaced with the output device(s) 318.

In some implementations, the game controller includes an optional headset 326 which plays back audio messages and/or gaming audio streams.

In some implementations, the game controller 102 includes radios 330 that enable one or more communication networks and allow the game controller 102 to communicate with other devices (e.g., with the interface device 106). In some implementations, the radios 330 are capable of data communications using any of a variety of custom or standard wireless protocols (e.g., IEEE 802.15.4, Wifi, ZigBee, 6LoWPAN, Thread, Z-Wave, Bluetooth Smart, ISA100.5A, WirelessHART, MiWi Whispernet, Bluetooth low energy etc.), custom or standard wired protocols (e.g., Ethernet, HomePlug etc.), and/or other suitable communication protocol, including communication protocols not yet developed as of the filing date of this document.

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processing units 202. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

- Operating system 336 including procedures for handling various basic system services and for performing hardware dependent tasks;
- Network communication module 338 for connecting the game controller 102 to other devices (e.g., the server system 114, the interface device 106, and the electronic devices 104) via one or more communication interfaces) 304 (wired or wireless) and the local networks 110, 140 and/or 150, and one or more networks 112, such as the Internet, other wide area networks, local area networks, metropolitan area networks, and so on;
- User interface module 340 for enabling presentation of information (e.g., audio and/or video content, and optionally a graphical user interface for presenting applications, widgets, text, etc.) at the game controller 102 via one or more output devices 318 (e.g., speakers, LED(s) etc.);
- Input processing module 342 for detecting one or more user inputs or interactions from one of the one or more input device(s) 310 and interpreting the detected input or interaction;
- Interface device application 344 for interacting with an interface device 106, including logging into a user account associated with the interface device 106, controlling the interface device 106 if associated with the user account, and editing and reviewing settings and data associated with the interface device 106;
- Gaming application 346 for cloud gaming functions that is configured to implement modules for various modes;
- Commands module 348 for transmitting messages (e.g., setup commands) between the game controller 102 and the interface device 106 in a menu mode; and
- Streaming module 349 for transmitting gameplay commands between the game controller 102 and the server system 114 (e.g., to the streaming server 120) in the gameplay mode;
- Controller module 350 for providing a gameplay input interface to the gaming application 346;
- Communication module 351 for receiving and/or transmitting messages and media streams between the game controller 102 and an interface device (e.g., the interface device 108), and between the game controller 102 and a gaming server (e.g., the server system 114);
- Data download module 352 for downloading data (e.g., user accounts, user credentials, updates to modules and applications and data in the memory 306) from the server system 114 and/or relayed from the interface device 106 and other content hosts and providers; and
- Device data 354 storing at least data associated with the gaming application 346 and other applications/modules, including:
    - Client device settings 356 for storing information associated with the game controller 102 itself, including common device settings (e.g., service tier, device model, storage capacity, processing capabilities, communication capabilities, etc.);
    - Interface device settings 358 for storing information associated with user accounts of the interface device application 344, including one or more of account access information, and information for interface device settings (e.g., service tier, device model, storage capacity, processing capabilities, communication capabilities, etc.);
    - Gaming application settings 360 for storing configured menus and/or shortcuts for the user to interact with the gaming Portal UI module 437 of FIG. 4;
    - Game controller configuration(s) 362 for storing information associated with configurations of the controller module 350 for the gaming application 346; and
    - Location/proximity data 164 including information associated with the presence, proximity or location of any of the game controller 102, the interface device 106, other game controllers 102 and/or electronic devices 104; and
    - Device/user data 366 for storing the game controller identification and client certificate, identifications and client certificates of respective paired interface devices, one or more local network credentials (e.g., Wifi credentials), and information associated with one or more users linked to the game controller 102, including login information, user credentials, authentication information, and optionally, storing user preferences, gameplay history data, and information on other players;
- Security module 368 for presenting one or more authentication options and receiving inputs to the authentication options when activated; and
- Voice assistance module 370 for processing audio inputs/commands received by the microphones 312.

In some implementations, the communication module 351 can be one or more of a radio transmission module, a communication bus, such as the one or more communication buses 308, and a wired connection.

In some implementations, the controller module 350 is a part (e.g., a sub-module) of the interface device application 334 or another application in the memory 306. In some other implementations, the controller module 350 is a part of the operating system 336. In some further implementations, the controller module 350 is a distinct module or application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

FIG. 4 is a block diagram illustrating an example interface device 106 of the gaming environments 100, 130, and 160, and in the operation sequences 200 and 220, in accordance with some implementations. The interface device 106, typically, includes one or more processor(s) (CPUs) 402, one or more communication interface(s) 404, memory 406, and one or more communication buses 408 for interconnecting these components (sometimes called a chipset). Further, the interface device 106 includes a proximity/location detection unit 410, such as an IR sensor, for determining the proximity of a game controller 102, and/or an electronic device 104, and/or other interface devices.

Further, in some implementations, the interface device 106 includes radios 411 that enable one or more communication networks and allow the interface device 106 to communicate with other devices (e.g., with the game controller 102). In some implementations, the radios 411 are capable of data communications using any of a variety of custom or standard wireless protocols (e.g., IEEE 802.15.4, Wifi, ZigBee, 6LoWPAN, Thread, Z-Wave, Bluetooth Smart, ISA100.5A, WirelessHART, MiWi, Whispernet, Bluetooth low energy etc.), custom or standard wired protocols (e.g., Ethernet, HomePlug etc.), and/or other suitable communication protocol, including communication protocols not yet developed as of the filing date of this document.

Additionally, the interface device 106 also includes one or more input device(s) 412 including microphones 414 to detect proximity of a user, and one or more output device(s) 416 (e.g., display device(s) 108) that are coupled to or integrated with the interface device 106.

The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, optionally, includes one or more storage devices remotely located from one or more processor(s) 402. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

Operating system 418 including procedures for handling various basic system services and for performing hardware dependent tasks;

Network communication module 420 for connecting the interface device 106 to other computers or systems (e.g., the server system 114, the game controller 102, and the electronic device 104) via one or more communication interfaces 404 (wired or wireless) and one or more networks 112, such as the Internet, other wide area networks, local area networks, metropolitan area networks, cable television systems, satellite television systems, IPTV systems, and so on;

Communication module 421 for receiving and/or transmitting messages and media streams between the interface device 106 and a game controller (e.g., the game controller 102) and between the interface device 106 and a gaming server (e.g., the server system 114);

Content Decoding Module 422 for decoding content signals received from one or more content sources (e.g., the game server 118 and the streaming server 120) and outputting the content in the decoded signals to the output device(s) 416 (e.g., the display device(s) 108) that are coupled to or integrated with the interface device 106;

Proximity/location determination module 424 for determining the proximity of the game controller 102, and/or electronic device 104, and/or other interface devices 106 based on proximity related information that is detected by the proximity/location detection unit 410 or provided by the server system 114;

Display module 426 for controlling media display;

Interface device data 428 for storing the interface device identification and client certificate, and for storing at least data including:

Interface device settings 430 for storing information associated with user accounts of an interface device application, including one or more of account access information and information for device settings (e.g., service tier, device model, storage capacity, processing capabilities, communication capabilities, etc.); and Location/proximity data 432 including information associated with the presence, proximity or location of any of the game controller 102 and/or the electronic device 104 and the interface device 106; and Network data 434 including information associated to the one or more local networks that the interface device is connect to;

Gaming application 436 for controlling the lifecycle of all the gaming components on the interface device 106, receiving messages (e.g., commands) from the game controller 102, and for relaying game controller inputs to the server system 114;

Gaming UI module 437 for accessing user content (e.g., profile, avatar, purchased games, game catalog, friends, messaging) and optimized images for display, and for receiving inputs the game controller 102 during gameplay;

Interface control module 438 for interfacing communications between the gaming application 436 and the gaming portal UI module 437, and for initiating a session pairing request with the server system 114 during game launch;

Server interface module 440 for communications with the server system 114 and the authentication system 125, including:

Authentication sub-module 442 for communicating with the authentication system 125 to authenticate a linked user of the game controller 102 during gaming portal UI launch;

Session sub-module 444 for receiving gaming session information (e.g., session id, game server provisioning IP address, port etc.) from the server system 114, and for invoking a callback on the interface control module 438 providing this information; and Streaming sub-module 446 for receiving and displaying, in real time during gameplay, gaming streams transmitted from the streaming server 120 of the server system 114.

In some implementations, the communication module 421 can be one or more of a radio transmission module, a communication bus, such as the one or more communication buses 408 (e.g., when the interface functionality is in the game controller), and a wired connection.

In some implementations, the gaming UI module 437, the interface control module 438, and the server interface module 440 are packaged as a shared library in the interface device 106 and are dynamically opened by the gaming application 436 when the application is started.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 406, optionally, stores a subset of the modules and data structures identified above. Furthermore, the memory 406, optionally, stores additional modules and data structures not described above.

Figure 5:
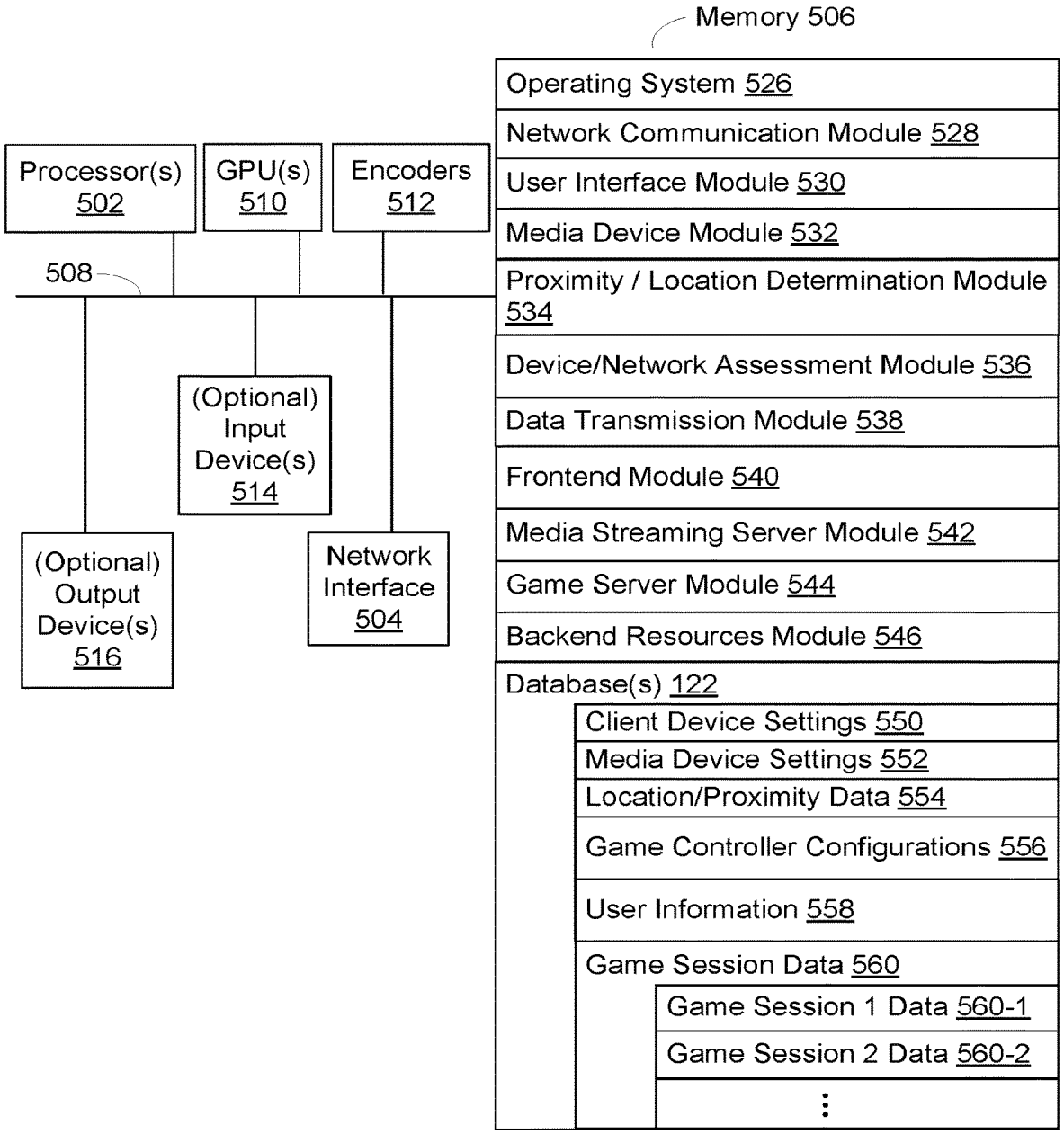
FIG. 5 is a block diagram illustrating a representative server system, in accordance with some implementations.

FIG. 5 is a block diagram illustrating an example server in the server system 114 of the gaming environments 100, 130, and 160, and in the operation sequences 200 and 220, in accordance with some implementations. The server system 114, typically, includes one or more processing units (e.g., processor(s) 502, GPU(s) 510 and encoders 512), one or more network interfaces 504, memory 506, and one or more communication buses 508 for interconnecting these components (sometimes called a chipset). The server system 114 may optionally include one or more input devices 514 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 516 that enable presentation of user interfaces and display content, including one or more speakers and/or one or more visual displays.

The memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 506, optionally, includes one or more storage devices remotely located from one or more processing units. The memory 506, or alternatively the non-volatile memory within the memory 506, includes a non-transitory computer readable storage medium. In some implementations, the memory 506, or the non-transitory computer readable storage medium of the memory 506, stores the following programs, modules, and data structures, or a subset or superset thereof:

Operating system 526 including procedures for handling various basic system services and for performing hardware dependent tasks;
Network communication module 528 for connecting the server system 114 to other devices (e.g., various servers in the server system 114, the game controller 102 and/or the electronic device 104, and the interface device 106) via one or more network interfaces 504 (wired or wireless) and one or more networks 112, such as the Internet, other wide area networks, local area networks, metropolitan area networks, and so on;
User interface module 530 for enabling presentation of information (e.g., a graphical user interface for presenting application(s), widgets, websites and web pages thereof, and/or games, audio and/or video content, text, etc.) at the display device 108 of the interface device 106, the game controller 102 and/or the electronic device 104;
Media device module 532 (optional) that is executed to provide server-side functionalities for device provisioning, device control, and user account management associated with interface device(s) 106;
Proximity/location determination module 534 for determining the proximity of the game controller 102 and/or the electronic device 104 to the interface device 106 based on location information of any of the game controller 102 and/or the electronic device 104 and the media device 106;
Device/network assessment module 536 for assessing device and network capabilities of the game controller 102 and/or the electronic device 104, including but not limited to assessing network bandwidth of the connection to the game controller 102 and/or the electronic device 104 and assessing whether the game controller 102 and/or the electronic device 104 has the needed module or application to play a game;
Data transmission module 538 for providing data (e.g., game controller configurations 456), software updates, etc.) to the game controller 102, the electronic device 104, and/or the interface device 106;
Frontend module 540 for managing user accounts associated with the game controller 102 and the electronic device 104, e.g., subscriptions to membership of one or more online interactive games by a user account, enabling service to subscribers for forwarding subscriber requests to the backend resources 124, the game server 118, and monitoring gameplay activity and related requests of subscribers;
Media streaming server module 542 for transmitting, in real time during gameplay, gaming audio and/or video streams to the interface device 106, managing streams (e.g., from headsets) and managing one or more streaming sites;
Game server module 544 for providing server-side functionalities associated with games (e.g., gaming applications 346 and 436), including but not limited to setting up game sessions, storing session state data and other game-related data, processing gameplay inputs from client device 102 and 104, rendering gameplay outputs in response to the gameplay inputs, and generating concurrent media streams for game play and review videos;
Backend resources module 542 for performing services requested by the front end 116, accessing and/or data (e.g., from the game server 120 and the streaming server 120); and
Databases(s) 122 including:
Client device settings 550 for storing information associated with the game controller 102 and the electronic device 104, including common device settings (e.g., service tier, device model, storage capacity, processing capabilities, communication capabilities, etc.);
Media device settings 552 (optional) for storing information associated with user accounts of the media device application 532, including one or more of account access information and information for device settings (e.g., service tier, device model, storage capacity, processing capabilities, communication capabilities, etc.);

Location/proximity data 554 including information associated with the presence, proximity or location of any of the game controller 102 and/or the electronic device 104 and the interface device 106;

Game controller configurations 556 for storing controller configurations for various games; and User information 558 for storing information associated with user accounts of each of one or more game applications (e.g., game application 228, FIG. 2) that are hosted on the server system 114, including for example user account information (e.g., identification and passwords), user profiles, purchased games, membership type, preference, games catalog, activity history and other entitlements; and Game session data 560 for storing data associated with game sessions (e.g., game state data, other game-related data), including for example game session data 560-1 for a first game session and game session data 560-2 for a second game session, where the session data 560 for each game session includes, but is not limited to a frame rate, a rendering specification, a normal latency requirement, information of GPU allocation, information of encoder allocation, identifications of related sessions, and latest status information associated with the respective game session.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

In some implementations, the server system 114 further includes a messaging module (not shown) for managing a messaging application in the gaming portal UI that allows players to exchange messages with their gamer friends.

In light of these principles, we now turn to certain implementations.

Implementations

Figure 6A:
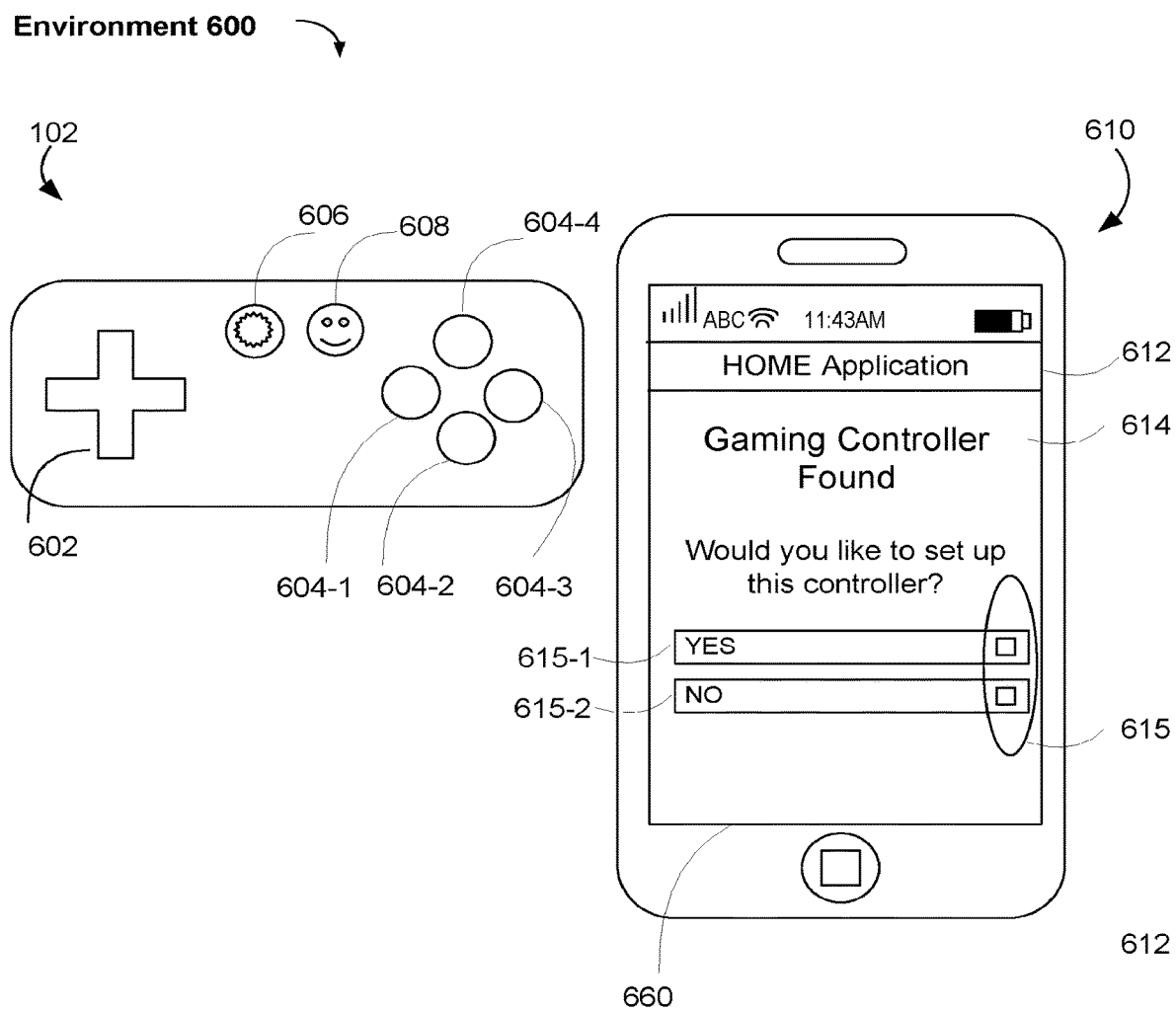
FIGS. 6A to 6C illustrate an exemplary process for setting up and provisioning the game controller of FIG. 3, in accordance with some implementations.
Figure 6B:
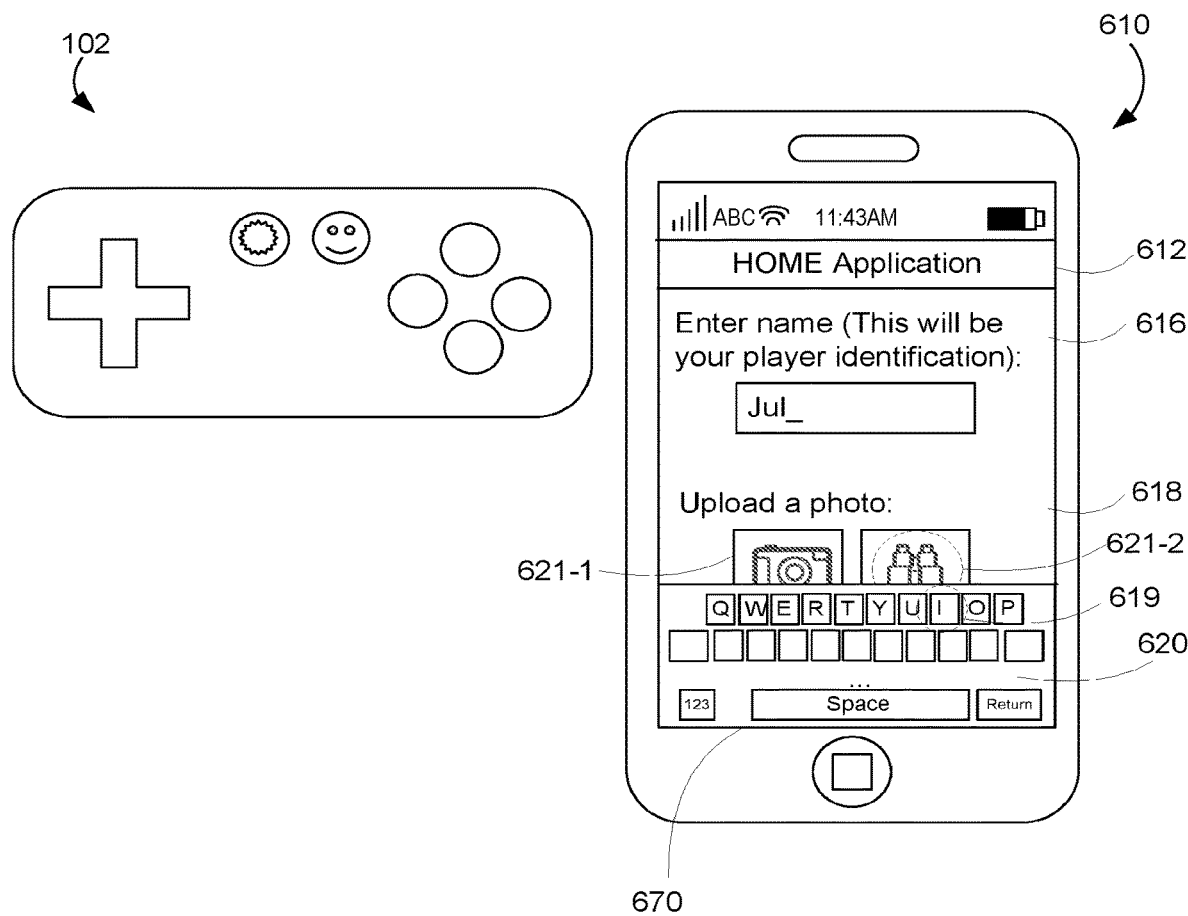
Figure 6C:
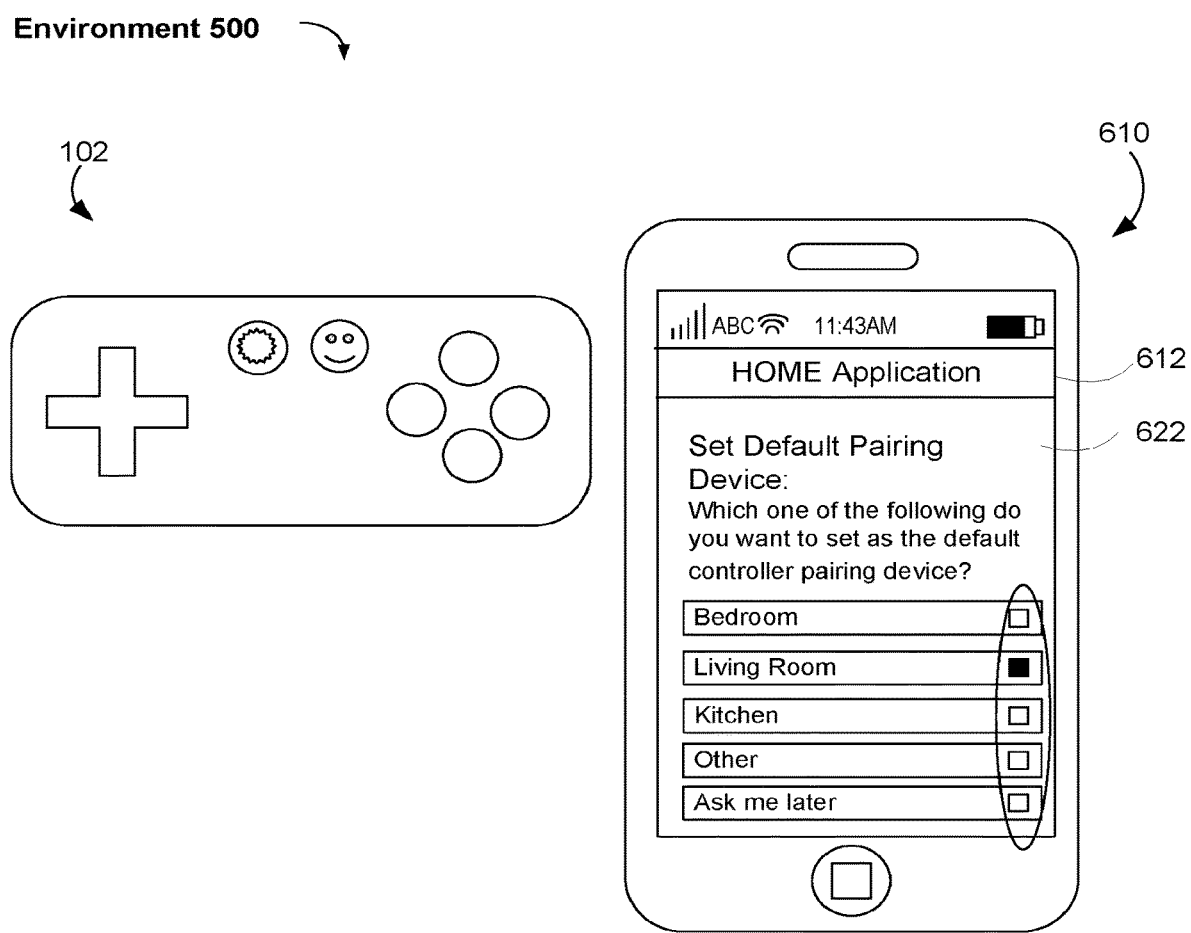

FIGS. 6A to 6C illustrate an exemplary process for provisioning a new game controller 102 for cloud gaming. In some implementations, the new game controller 102 needs to be set up before it can be used for gaming. In some implementations, the setup occurs in an environment 600 (e.g., a home, a dormitory, and/or an office), using a mobile phone 610 running an accompanying application (e.g. GOOGLE Home Application 612) that supports cloud gaming. In some implementations, the setup process includes adding one or more users to the game controller 102 and pairing the game controller 102 to one or more interface devices in the environment 600.

As illustrated by FIG. 6A, the game controller 102 is depicted to include input components such as a directional pad 602 (i.e. the directional pad 315) and a plurality of buttons, including an "assistant" button 606, a "home" button 608, and game control buttons 604-1, 604-2, 604-3, and 604-4 (i.e., the buttons 312). In some implementations, the game controller 102 further includes a joystick (i.e., the joystick 316, not shown) and output devices (e.g., the output device(s) 318) such as LEDs (e.g., the LED(s) 322 and/or speakers (e.g., the speaker(s) 320) (not shown). In some implementations, the number and types of input, and output components and their arrangements, can vary. In some implementations, the game controller has a different shape and/or size and/or geometry from the game controller 102 that is depicted in the figures.

In some implementations, the one or more buttons activate one or more microphones (e.g., the microphones 312) on the game controller 102, which enable audio inputs (e.g., voice commands) to be received. For example, a gamer can hold down the assistant button 606 and say "Play the Division on bedroom TV." In some implementations, the game controller 102 parses the commands (e.g., using the voice assistance module 370) and pairs with the interface device that is connected to the bedroom TV. In some implementations, the interface device also turns on the bedroom TV. The TV displays a paused scene from the game "Division" that was left from the gamer's most recent gaming session. The gamer pushes a button to unpause the scene, and resumes gameplay using the game controller 102 and bedroom TV.

In some implementations, the user initiates the setup of the new game controller 102 by first powering it up (e.g., by pressing the home button 608 and/or a power button (not shown)). The game controller 102 sends out a Bluetooth/Wifi beacon which is detected by the application. In some implementations, in accordance with the powering up, the application 612 displays automatically, on user interface 660, a message 614 indicating that a new device ("Gaming controller") has been found, and affordances 615 for setting the new device. In this example, the user selects the affordance 615-1 ("Yes") to continue the setup process.

FIG. 6B illustrates an exemplary user interface 670 that is displayed in accordance with continuing the setup process. In some implementations, the user is prompted to input fields, including a name 616 (e.g., a username), a photo 618, a password (not shown), and/or authentication challenge(s) (not shown). In some implementations, the user inputs her name using a keyboard display 620 and/or by tapping on icons 621 (e.g., an icon 621-1 to take a photo and/or an icon 621-2) to upload a photo).

In accordance with some implementations, as illustrated by FIG. 6C, the application 612 further displays, on user interface 680, an option 622 to set a default pairing device. The option 622 includes affordances 623 representing devices (e.g., interface device 106) available for pairing with the game controller 102. The option 622 further includes a prompt asking the user to select one of the interface devices 106 as a default device to display gaming content. In some implementations, the setup process concludes after a default pairing device has been selected (e.g., device 623-2 "Living room") and the game controller 102 is by default paired with the Living room" interface device.

In some implementations, the setting up of a new game controller 102 does not require the use of a mobile phone (e.g., the mobile phone 610) or the accompanying application (e.g., the application 612) running on the mobile phone. Rather, the setup and selection of the output device will work directly between the game controller 102 and the interface device 106, or directly between the game controller 102 and the display device 108. For example, in some implementations, the interface device 106 or the display device 108 includes an accompanying application that can be executed to set up the new game controller 102 and cause selection of the output device. In some implementations, the game controller 102 includes an accompanying application that can be executed to set up the game controller 102 (e.g., the game controller 102 includes the optional display 324 that displays setup instructions) and select the output device.

In some implementations, after powering up the game controller 102, the user initiates the setup process by pressing a second button, and/or by pressing again the same button that is used to power up the game controller 102.

In some implementations, the game controller 102 stores (e.g., in the device/user data 366) information of the user including name/username, photo, password, authentication challenges) and other defaults including the default interface device 106.

In some implementations, the game controller stores (e.g., in the device/user data 366) network credentials (e.g., Wifi network names and/or passwords).

In some implementations, the game controller 102 is used by multiple users (e.g., various members of a household). Accordingly, after a first user has finished with the setup, the application 612 further displays an option to add other users. The game controller 102 stores credentials for each user.

In some implementations, the game controller 102 includes a device identifier and/or a client certificate that are stored on the game controller 102 (e.g., in the device/user data 366). Accordingly, the game controller 102 links the credentials of each user with the device identifier and/or the client certificate. In some implementations, in accordance with a request to launch the gaming portal UI (e.g., as described in FIG. 2A), the game controller sends, to the authentication system 125, the information of the device identifier and/or the client certificate along with an identification of the user for verification by the authentication system 125.

In some implementations, the application 612 further includes options to edit and/or delete the profile of an existing user of the game controller 102.

In some implementations, information about the environment 600 (e.g., household, dormitory etc.) that is the game controller is associated with the game controller 102 is stored in the cloud (e.g., in the server system 114 and/or the authentication storage 128). Additionally, in some implementations, the cloud stores, for each user, user information settings, display settings, and the game controller(s) associated with the user.

FIGS. 7 to 11 illustrate representative operations of the game controller 102 and the interface device 106, in accordance with some implementations. In these examples, it is assumed that the game controller 102 has been provisioned and is communicatively connected to (e.g., paired with) the interface device 106. FIGS. 7 to 11 show the interface face 106 coupled to the display device 108. In some implementations, the functionality of the interface device 106 is contained within (i.e., integrated with and/or included in) the display device 108 and accordingly the display device 108 is configured to interact directly with the game controller 102 and with the gaming server (e.g., the server system 114).

Figure 7A:
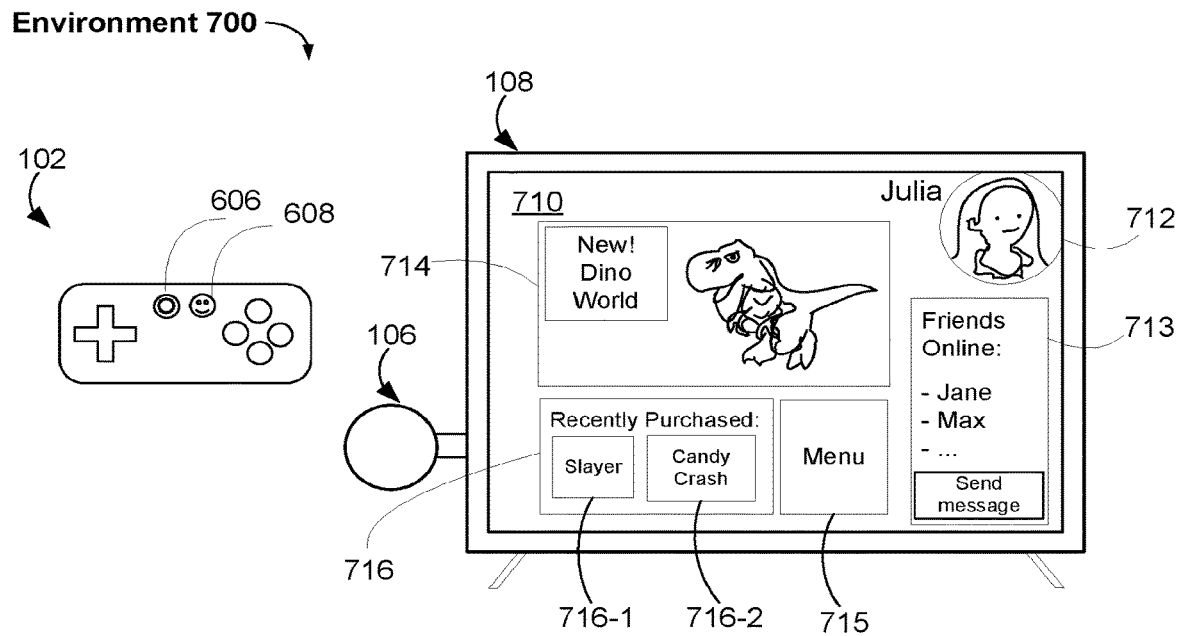
FIGS. 7A to 7C illustrate exemplary interaction between the game controller and the interface device, in accordance with some implementations.
Figure 7B:
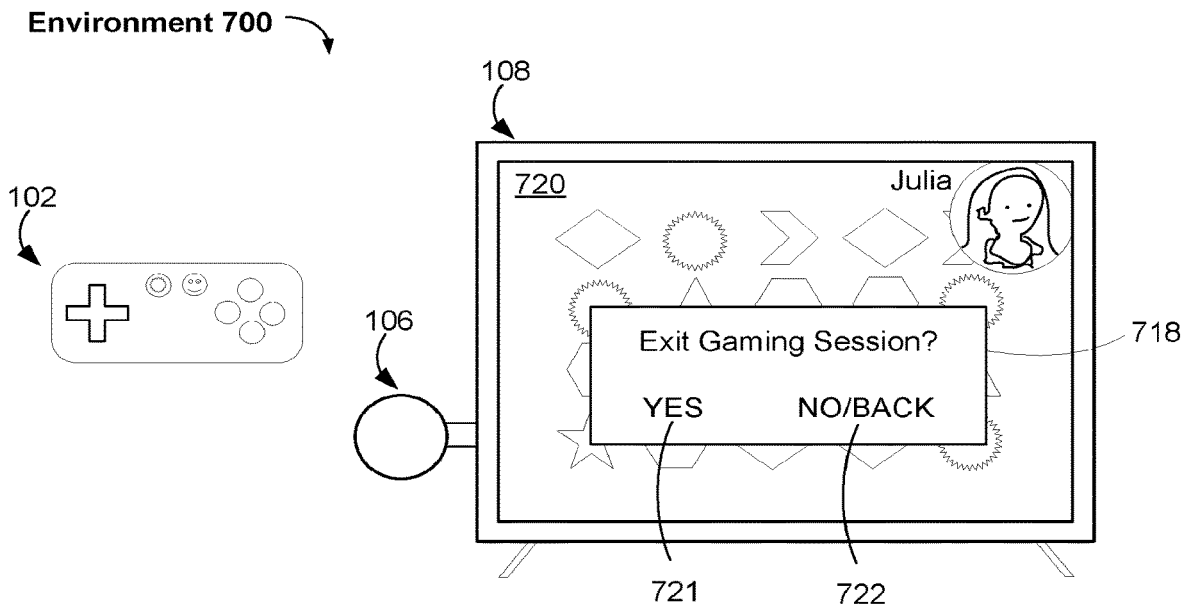
Figure 7C:
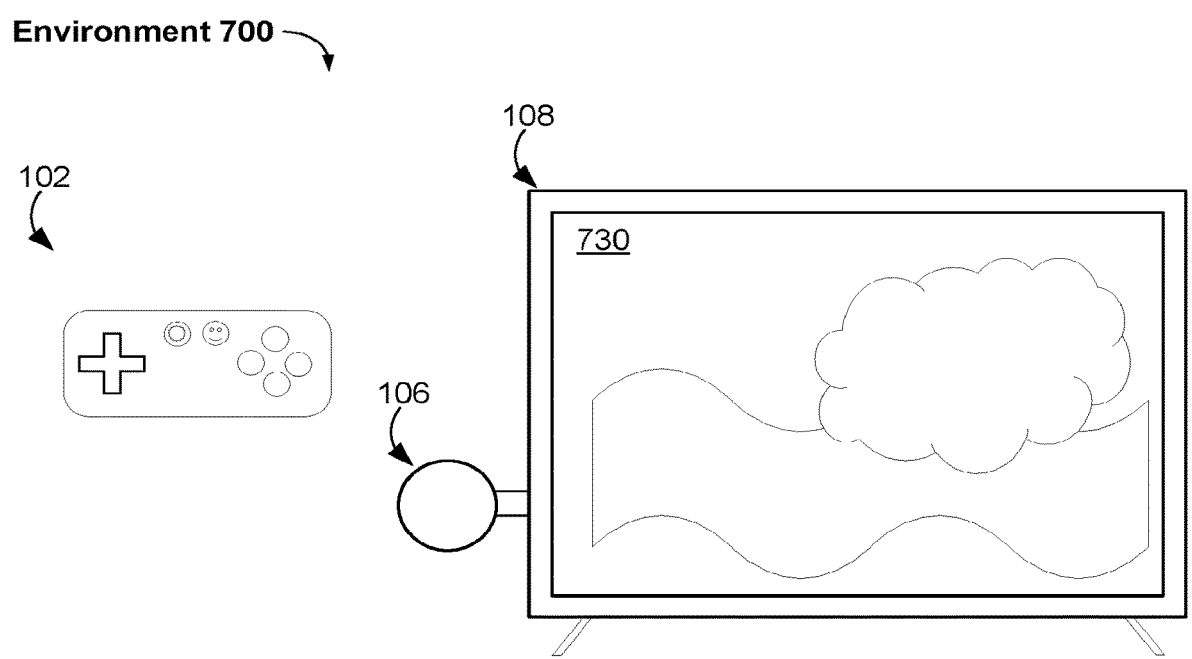

FIGS. 7A to 7C illustrate representative interactions between the game controller 102 of FIG. 3 and the interface device 106 of FIG. 4 in a single-person environment 700, in accordance with some implementations. In this example, the environment 700 is a home environment ("Julia's house") and the game controller 102 is linked to a default user ("Julia").

Julia initiates gaming by launching the gaming UI portal and selecting a game (See FIG. 2 for the process flows for UI launch and game initiation). In some implementations, the game controller is in an initial off/standby mode and Julia powers on the game controller 102. After the game controller 102 is powered on, it automatically connects to the Wifi network for Julia's house and gets household metadata (e.g., from the cache). The game controller 102 automatically pairs with the interface device 106 (e.g., "Living Room"), which activates the display device 108 and switches to the correct input (e.g., using CEC).

FIG. 7A illustrates a display screen 710 showing an exemplary gaming portal UI that includes features such as a user profile 712 ("Julia") (e.g., an avatar, a photo, and/or a name), friends who are online 713, games 714 and 716 (e.g., purchased games, new games, recently played games), and a menu 715. In this example, Julia is automatically logged in as the default player since she is the only user of the game controller 102. Julia selects a game on the gaming portal UI to initiate a game launch. (Details of the operation sequence that occurs for a game launch are described in FIG. 2B). Gaming streams are displayed on the display device 108. Julia plays the game.

In some implementations, the interface device 106 automatically powers on the display device 108 in accordance with a determination that the display device 108 is in a powered off/standby mode.

In some implementations, the activation of a single input (e.g., pressing a single button) performs the tasks of powering on the game controller 102 and starting the gaming application on the interface device 106. In some implementations, after the game controller 102 is powered on, the user activates a second input (e.g., pressing the button again, or pressing a second button) to launch the gaming portal UI.

In some implementations, the gaming portal UI includes a subset of the features and/or additional features that are not depicted in FIG. 7A. In some implementations, a subset the gaming portal UI features is customized for every user. In some implementations, the gaming portal UI allows a user to browse and access a listing of all gaming content that are hosted by the gaming server.

In some implementations, the user initiates game launch using voice inputs/commands (e.g., the user says "Play racing cars on living room TV") received by the microphones 312 and processed by the voice assistance module 370.

FIG. 7B illustrates a shutdown process for a gaming session. In some implementations, to initiate shutdown, the user presses a button on the game controller 102 (e.g., the home button 608), which sends an exit command to the interface device 106. Screen 720 displays a message window 718 confirming exit of the gaming session. If the user selects "YES" (721), the game controller 102 powers down (or goes to sleeps mode). If the user selects "NO/BACK" (722), the gaming session resumes and the message window 718 disappears from the screen 720 ((not shown).

In some implementations, in response to the user confirming exit of the gaming session, the interface device 106 transmits to exit command to the server system 114. The server system 114 saves the game/state as needed. The gaming session ends, the gaming application exits, and the display device displays a backdrop 730, as illustrated by FIG. 7C.

In some implementations, different menus and functionalities can be accessed using the same button (e.g., the home button 608), by pressing the button differently. For example, a "short/normal" press of the home button 608 is used to power up the game controller 102 and initiate launch of the gaming portal UI, and a "long" press of the home button 608 activates a menu button (e.g., quick access menu) and/or initiates shutdown of the gaming session.

In some implementations, the interface device 106 is also used to as a media streaming device to stream other (non-gaming) media content when it is not being used for gaming.

Figure 8A:
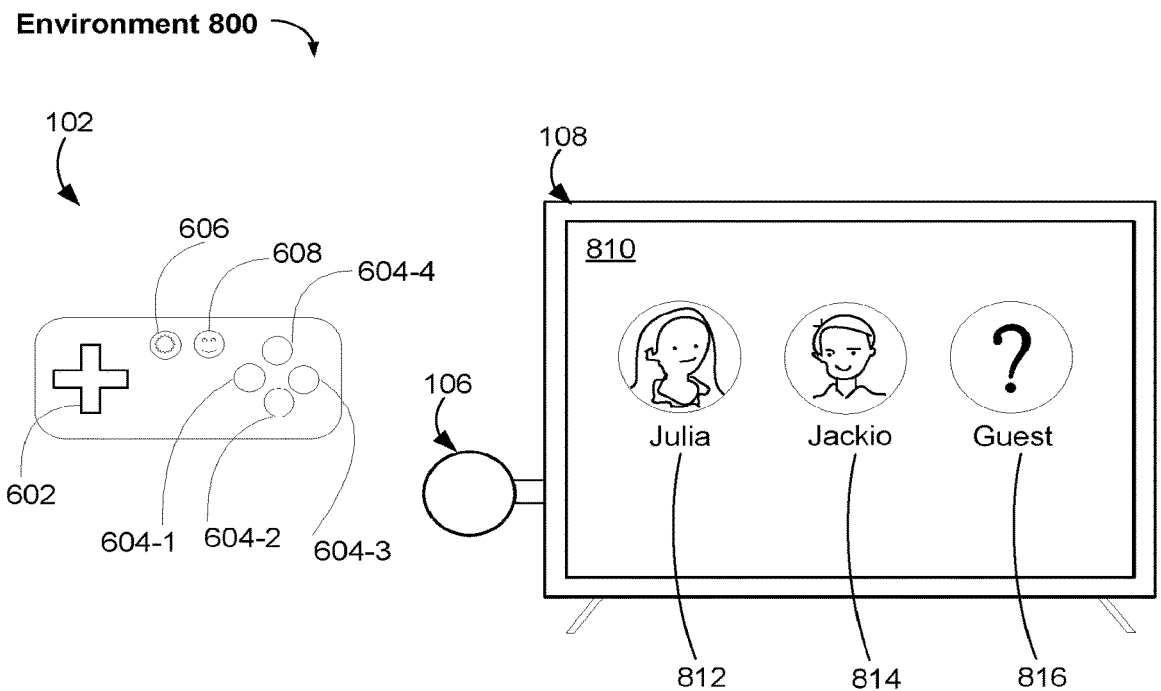
FIGS. 8A to 8B illustrates another exemplary interaction between the game controller and the interface device, in accordance with some implementations.
Figure 8B:
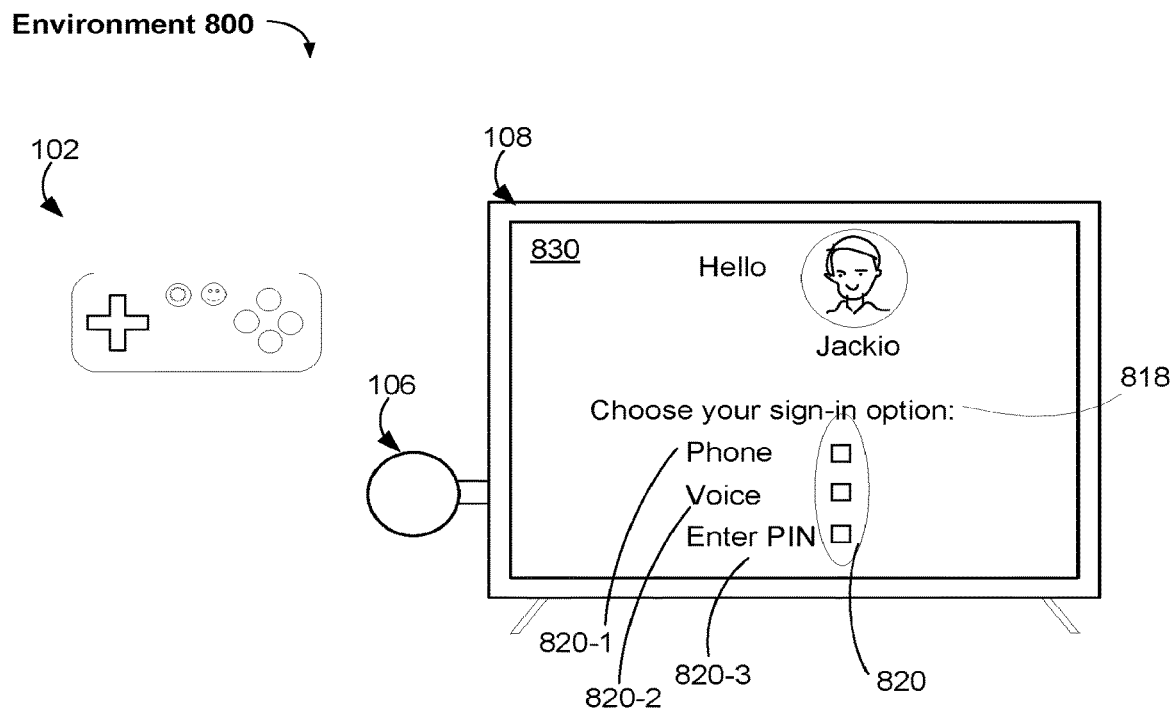

FIGS. 8A to 8B illustrate representative interaction between the game controller 102 of FIG. 3 and the interface device 106 of FIG. 4 in a multi-person environment 800, in accordance with some implementations. In this example, the multi-person environment 800 is two-person household and the game controller 102 is used by the household members "Julia" and "Jack." The game controller 102 stores user credentials for Julia and Jack. In some implementations, the multi-person environment includes three or more persons, each using the game controller 102 for online gaming.

In the example of FIG. 8, Jack launches the gaming portal UI using the steps described in FIGS. 2 and 7. FIG. 8A shows a screen 810 that displays options for a player account 812 ("Julia") and a player account 814 ("Jackio"). In some implementations, the screen 810 further includes an option for a "guest" player account 816. In this example, Jack selects the player account 814 ("Jackio").

In some implementations, the gaming application further includes features for authentication (e.g., using the security module 368). As illustrated in FIG. 8B, after Jack selects the player account 814 ("Jackio"), screen 830 displays a message 818 that includes a plurality of authentication options 820, including phone 820-1, voice 820-2, and PIN 820-3. If the phone option 820-1 is selected, the interface device 106 and/or the game controller 102 senses an identity of a phone in proximity to the game controller 102 and authenticates the user using the identity obtained from the phone. If the voice option 820-2 is selected, the screen will display a prompt requesting the user a voice input (e.g., using the microphones 312) (e.g., Jack presses down the assistant button 606 and says "I'm Jack."). The voice input is then compared against login credentials stored on the game controller 102 (in the device data 354). If the PIN option 820-3 is selected, Jack enters his PIN using one or more of the directional pad and/or buttons on the game controller 102, which is then compared against login credentials stored on the game controller 102. In some implementations, after the user Jack has been authenticated, the game controller 102 sends to the interface device 102 the authentication token corresponding to the user Jack (see step 204 of FIG. 2A) and the gaming portal UI is launched using the access token for the user Jack.

In some implementations, the gaming portal UI includes a guest account option (e.g., the "guest" player account 816) when launched. In some implementations, the guest account allows a guest user whose credentials are not stored on the game controller 102 to input information associated with the guest user. In some implementations, the guest account provides limited account privileges and/or limited options for the guest user (e.g., the guest user has access to a finite number of games, the guest user does not own any game, the guest user cannot purchase any game etc.).

FIGS. 9A to 9F illustrate exemplary interaction between two game controllers 102-1 and 102-2 and the interface device 106 in an environment 900, in accordance with some implementations. Each of the game controllers 102-1 and 102-2 is communicatively connected (e.g., paired with) the interface device 106.

In some implementations, a gaming session is carried out simultaneously by two players in one local environment 900, using two game controllers. In this example, suppose the environment 900 is home environment with two members Julia and Jack each having her/his own game controller. The first controller 102-1 is linked to user "Julia" and the second controller 102-2 is linked to user "Jack." Julia launches the gaming portal UI using the steps described in FIGS. 2 and 7.

In some implementations, each of the game controllers 102 and the interface device is identified by a respective device identification and a client certificate. The game controller identification ultimately identifies the linked users with gaming accounts and drives all user specific content on the interface device 106.

In some implementations, the interface device 106 starts an instance of the gaming application (the gaming application 436) for every game controller 102 that it is connected to (e.g., paired with) and identifies a respective game controller by its device identification and client certificate.

Figure 9A:
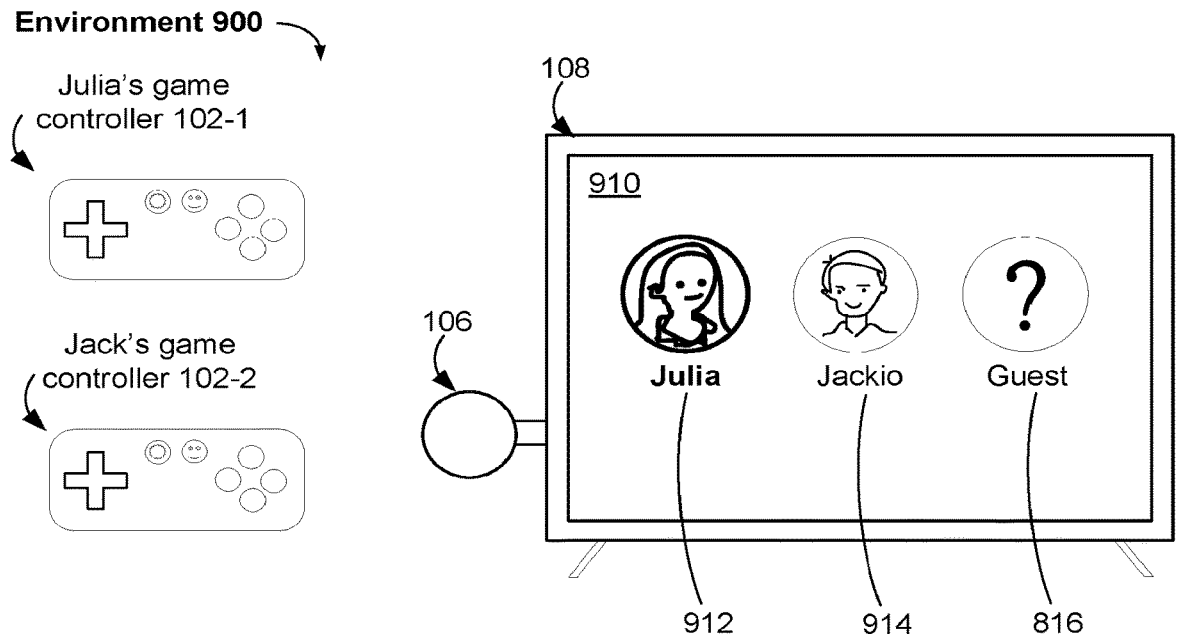
FIGS. 9A to 9F illustrate exemplary interaction between two game controllers and the interface device, in accordance with some implementations.

FIG. 9A shows a screen 910 with options to select a player account 912 ("Julia"), a player account 914 ("Jackio"), and a player account 816 ("Guest"). Julia uses the directional pad 902 and/or the buttons 904, 906, and/or 908 on her game controller 102-1 to select the player account 912 ("Julia"). In some implementations, Julia is prompted to authenticate her identification using the steps described in FIG. 8B. In some implementations, after the Julia selects her account (and goes through the authentication process), the game controller 102-1 sends to the interface device 106 the authentication token corresponding to the Julia and the gaming portal UI is launched using the access token for Julia.

Figure 9B:
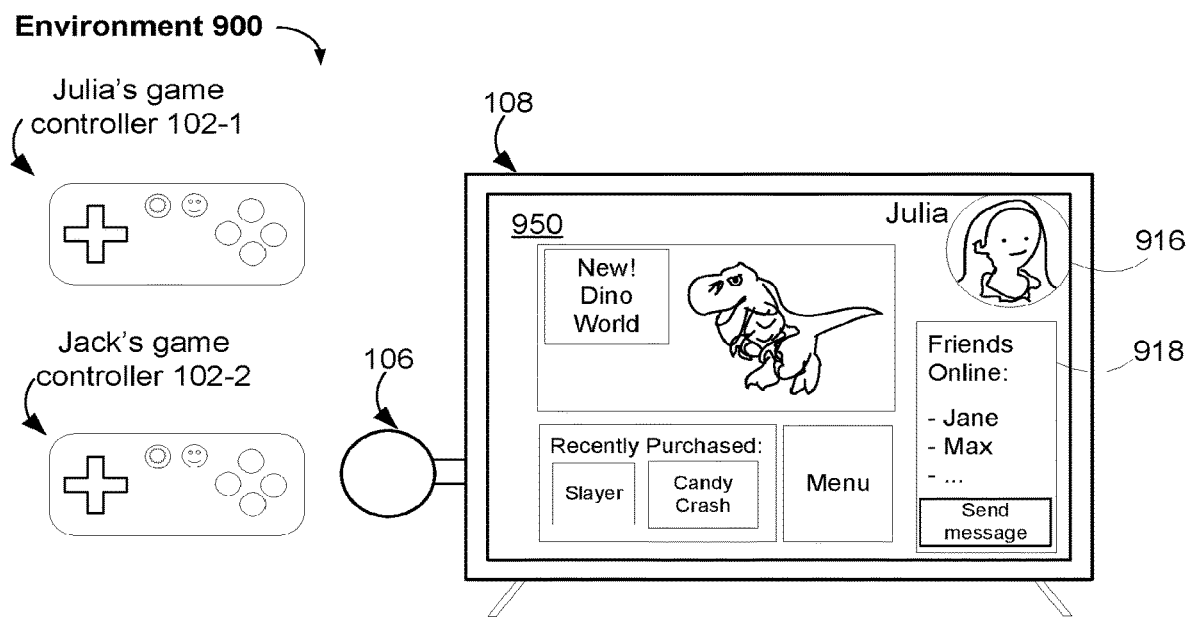

FIG. 9B shows a screen 950 displaying Julia's gaming portal UI after it has been launched. Features of the gaming portal UI have been described in FIG. 7A.

Figure 9C:
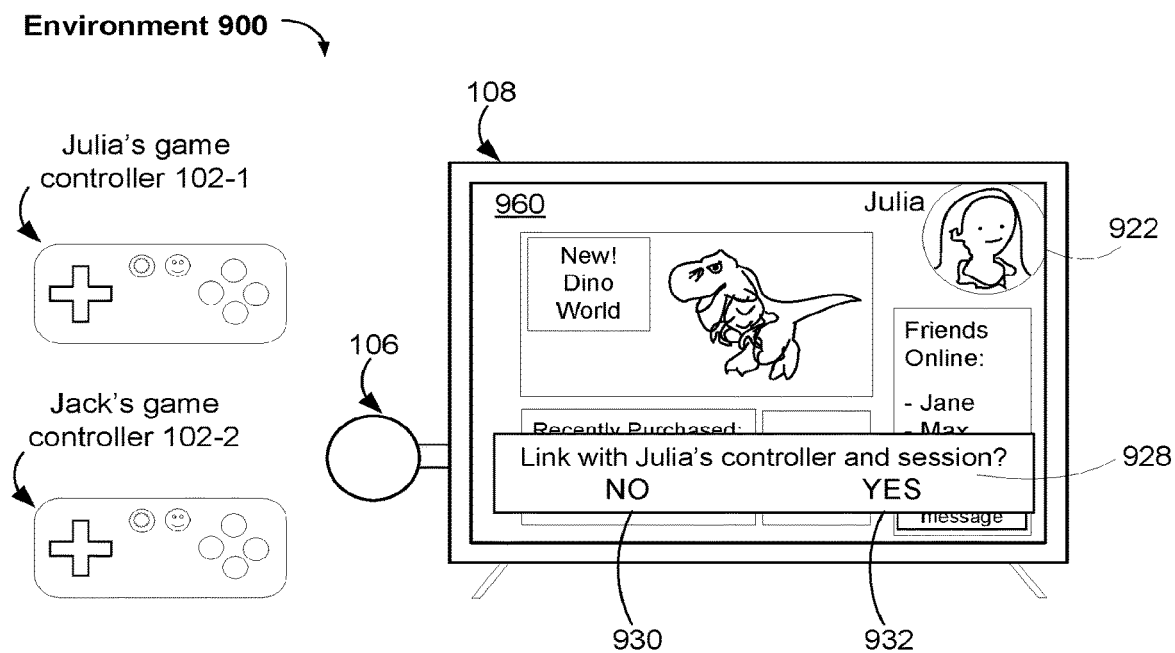

In FIG. 9C, Jack links to Julia's session by pressing a button on his game controller 102-2. In some implementations, Jack selects the player account 914 ("Jackio") and goes through the authentication process. Because the interface device 106 recognizes that the game controller 102-2 has also been paired with the interface device 106, it displays, on Julia's gaming portal UI 960, an alert window 928 requesting to link to Julia's controller (i.e., the game controller 102-1), and options 930 and 932. If Jack chooses the option 930 ("YES"), Jack joins Julia's gaming session. If Jack chooses the option 932 ("No"), Jack may select a different interface device to pair with (not shown).

In some implementations, when a second player joins a first player's gaming session, the first player becomes the "host" (or primary user) and the second player becomes the "guest" (or secondary user) of the gaming session. The server (e.g., the streaming server 102) streams gaming media content to the display device 108 and receives gaming inputs simultaneously from the game controller 102-1 and the game controller 102-2.

In some implementations, when multiple game controllers 102 are connected to the interface device 106, only the primary user's game controller (i.e., 102-1 in this instance) is used to drive the gaming portal UI. The primary user is the one who launches the gaming application and whose content is being shown by the gaming portal UI.

In some implementations, until the gaming session begins, only the host has control of the gaming portal UI. In some implementations, during the gaming session, each of the controllers 102-1 and 102-2 independently sends inputs to the server system 114, and each of the game controllers 102-1 and 102-2 independently communicates with the interface device 106.

Figure 9D:
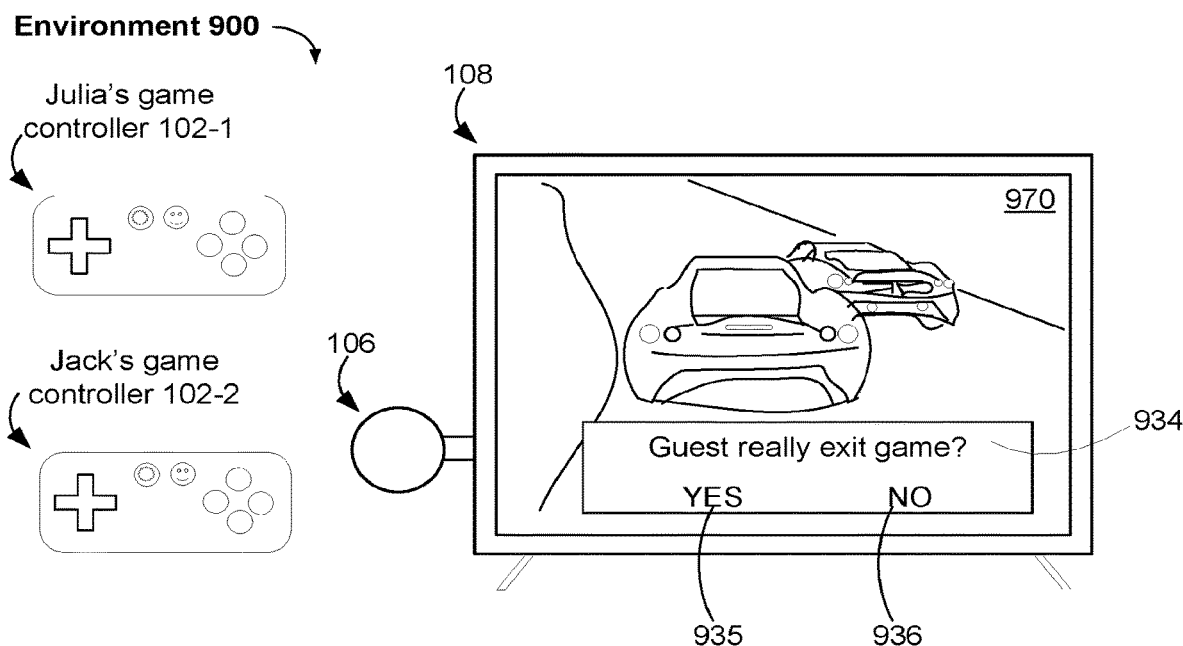
Figure 9E:
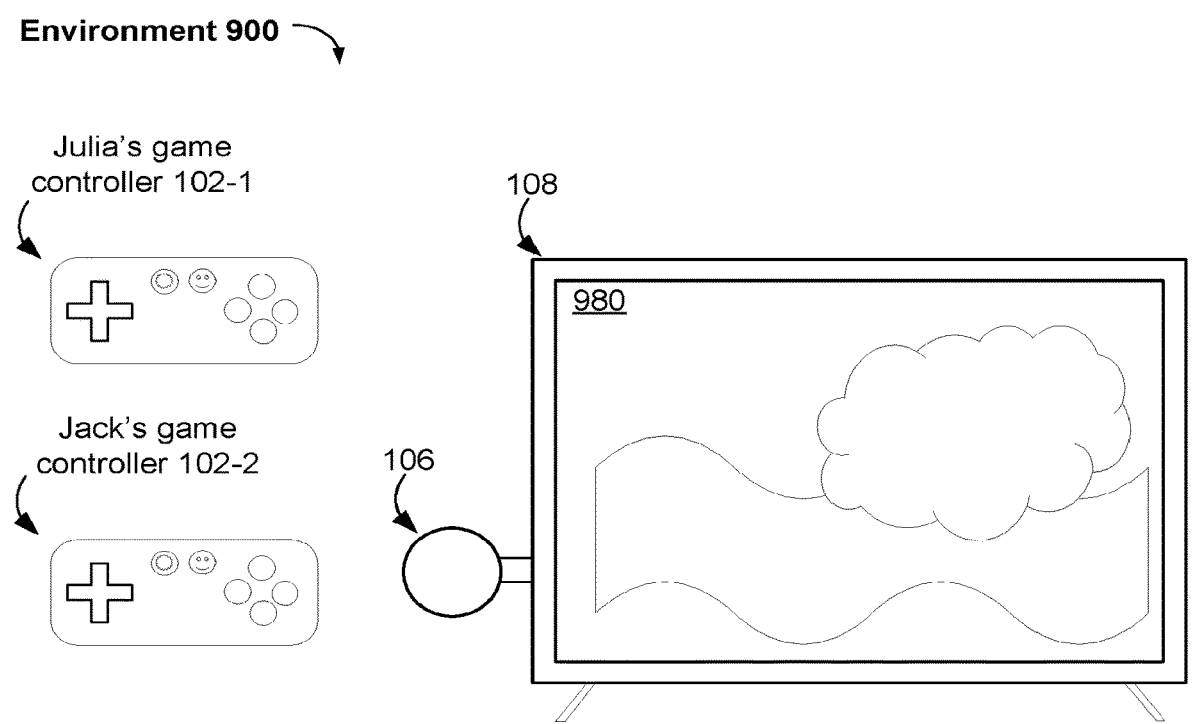

FIGS. 9D and 9E illustrate terminating a multiplayer gaming session, in accordance with some implementations. In this example, the guest player (i.e., Jack) ends the gaming session by pressing a button on the game controller 102-2 (e.g., by a long press of the home button 608). In response to the guest player input, screen 970 displays a message 932 confirming exit of the guest player. If Jack confirms exit (e.g., by selecting option 934 ("YES"), Jacks game controller 102-2 powers down. In some implementations, the hot player and other secondary users continue with the gaming session while the guest player exits. In some implementations, the gaming session continues as long as the host (i.e., Julia) is still connected).

Sometime after Jack has exited the gaming session, Julia the host player decides to terminate the gaming session. She presses a button on the game controller to initiate the game termination. In response to the host player input, a message is displayed on the screen to confirm exit of the host player (not shown). In some implementations, in accordance with a confirmation from the host player to exit the gaming session, the gaming server (e.g., the server system 114) saves the game/state and terminates the gaming service (e.g., in accordance with the steps described in FIG. 7B). In accordance with some implementations, as illustrated in FIG. 9E, the interface device 106 displays, on the display device 108, a backdrop display 980 after the gaming service has ended.

In some implementations, the gaming session ends only when the host player/account exits the gaming session and/or the host game controller is powered down.

Figure 9F:
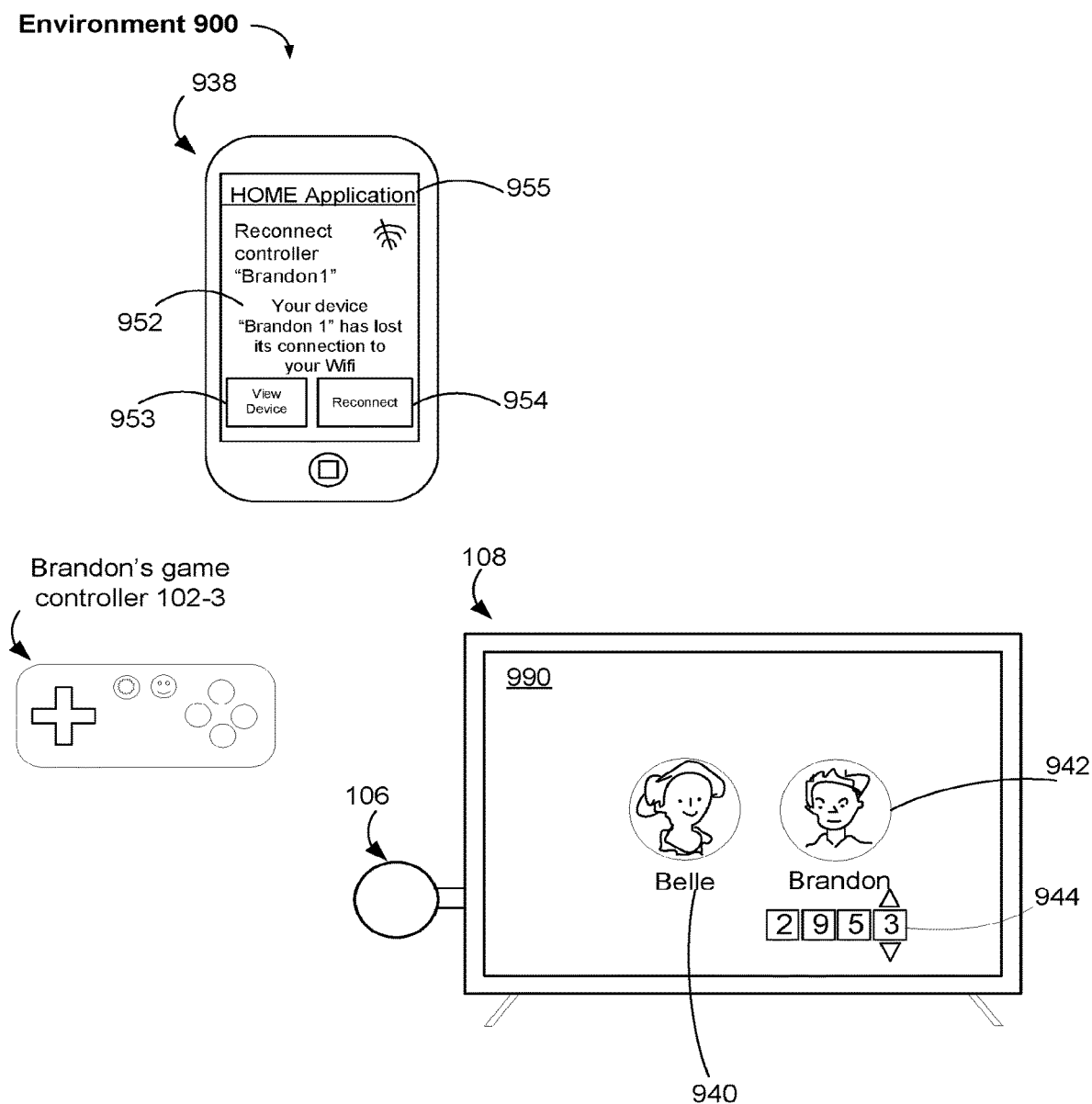

FIG. 9F illustrates a setup process for a guest ("Brandon") game controller 102-3 in the environment 900, in accordance with some implementations. In this example, Brandon visits Julia and Jack's house and brings along his game controller 102-3. At the house, Brandon receives a message 952 on an accompanying application 955 (e.g., the Home Application 612) on his mobile phone 938 that his game controller "Brandon1" has lost its connection. The message 952 also includes options 953 and 954. In some implementations, Brandon uses the application 955 to connect the game controller 102-3 to the local network of the house (e.g., to the Wifi connection of Julia and Jack's house). In some implementations, Brandon further uses the application 955 to select a default pairing device (e.g., the interface device 106 in Julia and Jack's house). In some implementations, after selecting the default pairing device, Brandon presses a button on the game controller 102-3 to pair with the interface device 106 and launch the gaming portal UI.

FIG. 9F illustrates a screen 990 displaying accounts that are linked to Brandon's game controller 102-3, including an account 940 ("Belle") and an account 942 ("Brandon"). Brandon selects the account 942 ("Brandon") corresponding to his identity. In this example, because the game controller 102-3 is connected to a different Wifi network, Brandon is required to enter a PIN 944 corresponding to the account 942 ("Brandon") to verify his identification. In accordance with a determination from the game controller 102-3 that the PIN 944 matches Brandon's stored credentials, the game controller proceeds to launch the gaming portal UI for Brandon. In some implementations, Julia can link her controller 102-1 to Brandon's session as a guest, using the steps described in FIGS. 9B and 9C.

Figure 10A:
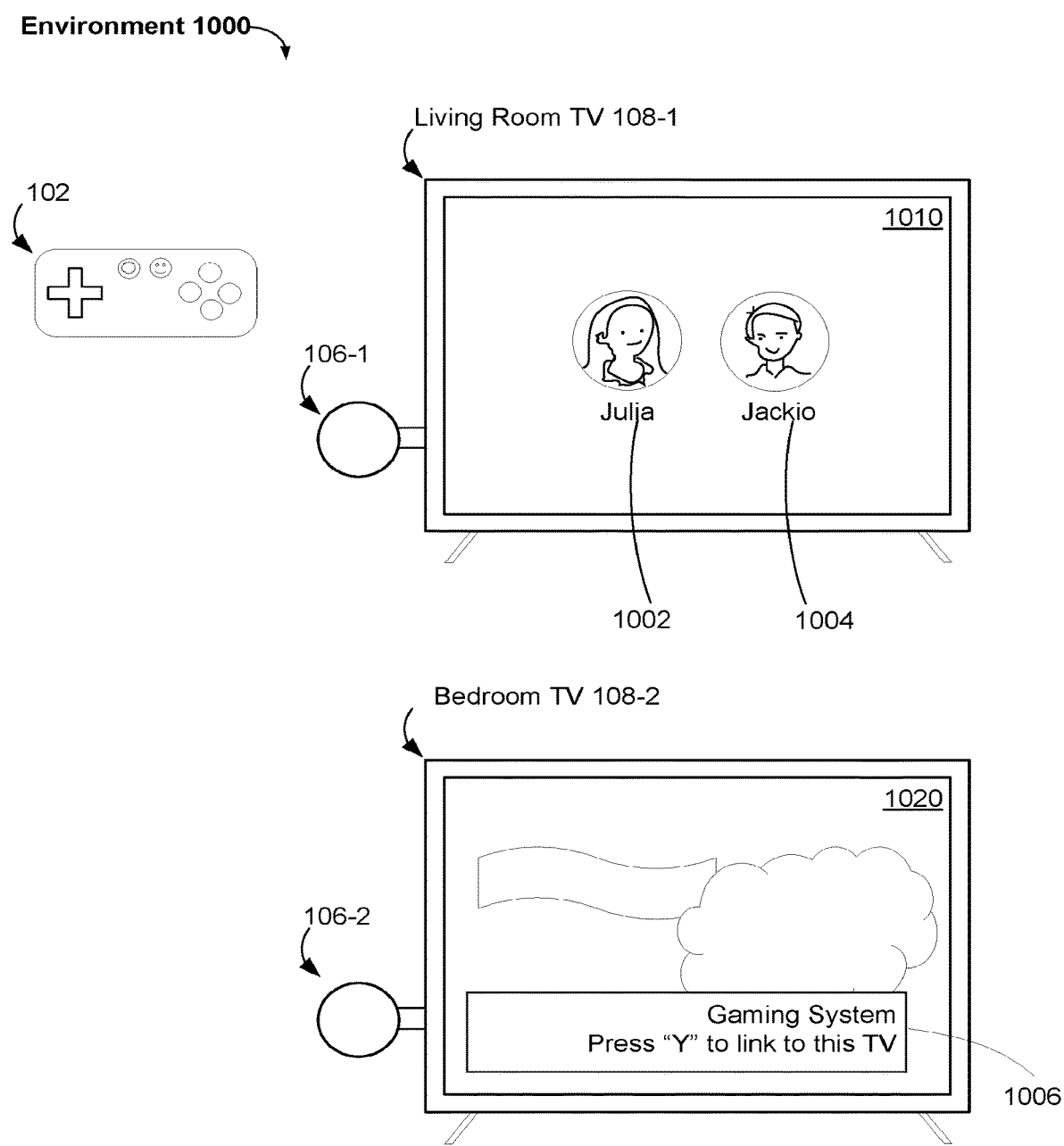
FIGS. 10A to 10B illustrate exemplary interaction between the game controller 102 and two interface devices, in accordance with some implementations.
Figure 10B:
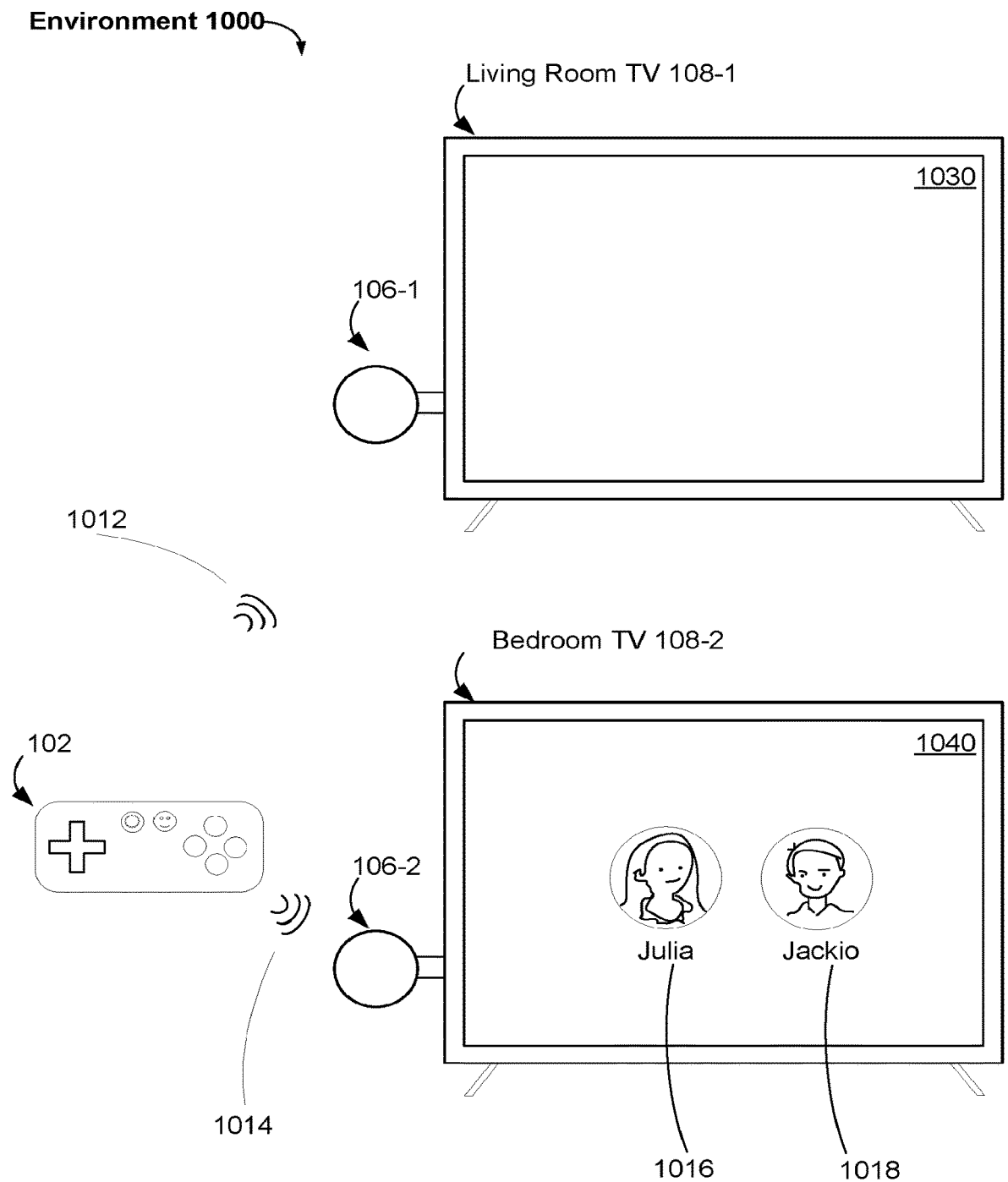

FIGS. 10A to 10B illustrate exemplary interaction between the game controller 102 and two interface devices 106-1 and 106-2 in an environment 1000, in accordance with some implementations. The interface devices 106-1 and 106-2 are coupled, respectively, to display devices 108-1 and 108-2. The game controller 102 is communicatively connected to (e.g., paired with) each of the interface devices 106-1 and 106-2.

In some implementations, the interface devices 106-1 and 106-2 are located at different locations of the environment 1000. In this example, the environment 1000 is a home environment and the interface devices 106-1 and 106-2 are located, respectively, in the living room and bedroom. It is assumed that the interface device 106-1 (living room TV) is the default pairing device for the game controller 102. Thus, when the gaming application is started, the default display device 108-1 displays a screen 1010 that includes accounts 1002 ("Julia") and 1004 ("Jackio") that are associated with the game controller 102. The non-default interface device (i.e., the interface device 106-2 which is coupled to the bedroom TV 108-2) displays a screen 1002 with a message 1006 that includes instructions to link the game controller 102 to the interface device 106-2.

FIG. 10B illustrates another implementation in which the game controller 102 automatically pairs with an interface device based on proximity to the interface device, irrespective of default settings. Here, even though the interface device 106-1 is the default pairing device for the game controller 102, the game controller 102 detects one or more interface device(s) in its proximity (e.g., 106-1 and 106-2) and pairs with the interface device (i.e., 106-2) that it is most proximate to.

In some implementations, the game controller 102 uses one or more communication networks (e.g., Whispernet, BLE and/or Wifi) enabled using the radios 330, to detect proximity to the interface devices 106-1 and 106-2, and to pair with an interface device that is more proximate to the game controller 102. For example, the game controller 102 uses signals 1012 and 1014 (e.g., Whispernet, BLE and/or Wifi) that are transmitted from the game controller 102, to determine that it is more proximate to the interface device 106-1 than to the interface device 106-2. The game controller 102 pairs with the most proximate device (106-2) in accordance with this determination.

Alternatively, in some implementations, proximity between the game controller 102 and respective interface devices 106 is determined by the respective interface devices using one or more microphones (e.g., the microphones 414) on the respective interface devices. For example, referring to FIG. 10B, the microphones 414 of the interface device 106-2 receive audio inputs indicating that a user has walked into the room, and accordingly the interface device 106-2 exposes to the game controller 102 its presence and availability for pairing.

In some implementations, as illustrated in FIG. 10B, in response to the pairing with the game controller 102, the interface device 106-2 activates the display device 108-2 and switches to the correct input (e.g., using CEC). Further, the interface device 106-2 displays a screen 1040 that includes accounts 1016 ("Julia") and 1016 ("Jackio") linked to the game controller 102. The default interface device 106-1 is not paired with the game controller 102 and accordingly the display device 108-1 shows a blank screen 1030.

FIGS. 11A to 11D illustrate another exemplary interaction between the game controller 102 and two interface devices 106-1 and 106-2 to switch displays during gameplay, in accordance with some implementations.

Figure 11A:
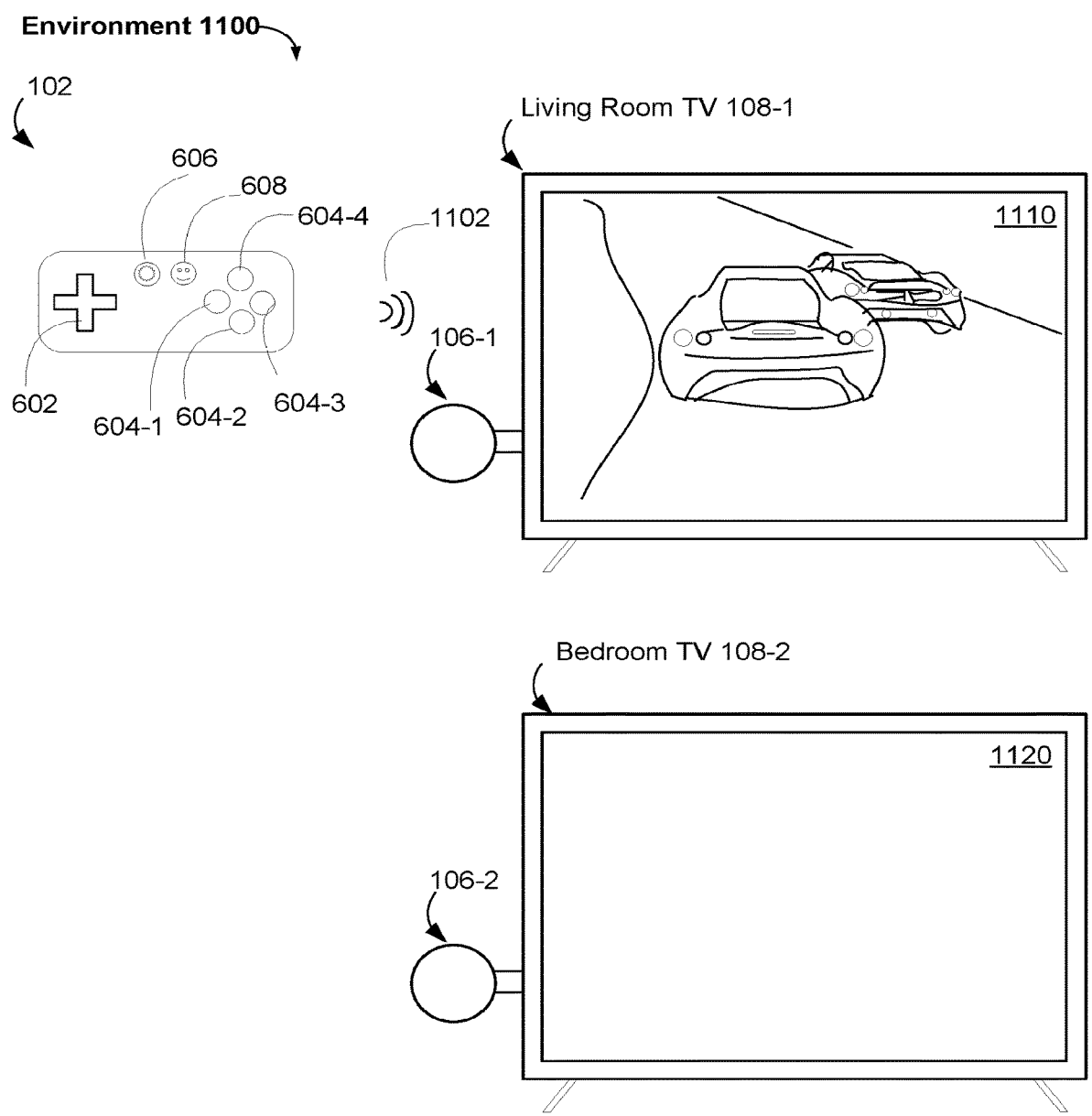
FIGS. 11A to 11D illustrate another exemplary interaction between the game controller 102 and two interface devices, in accordance with some implementations.

In this example, Jack is playing the game "racing cars" in the living room using the game controller 102. As illustrated in FIG. 11A, the living room TV 108-1 displays scene 1110 from the game and the bedroom TV 108-2 shows a blank screen 1120.

Figure 11B:
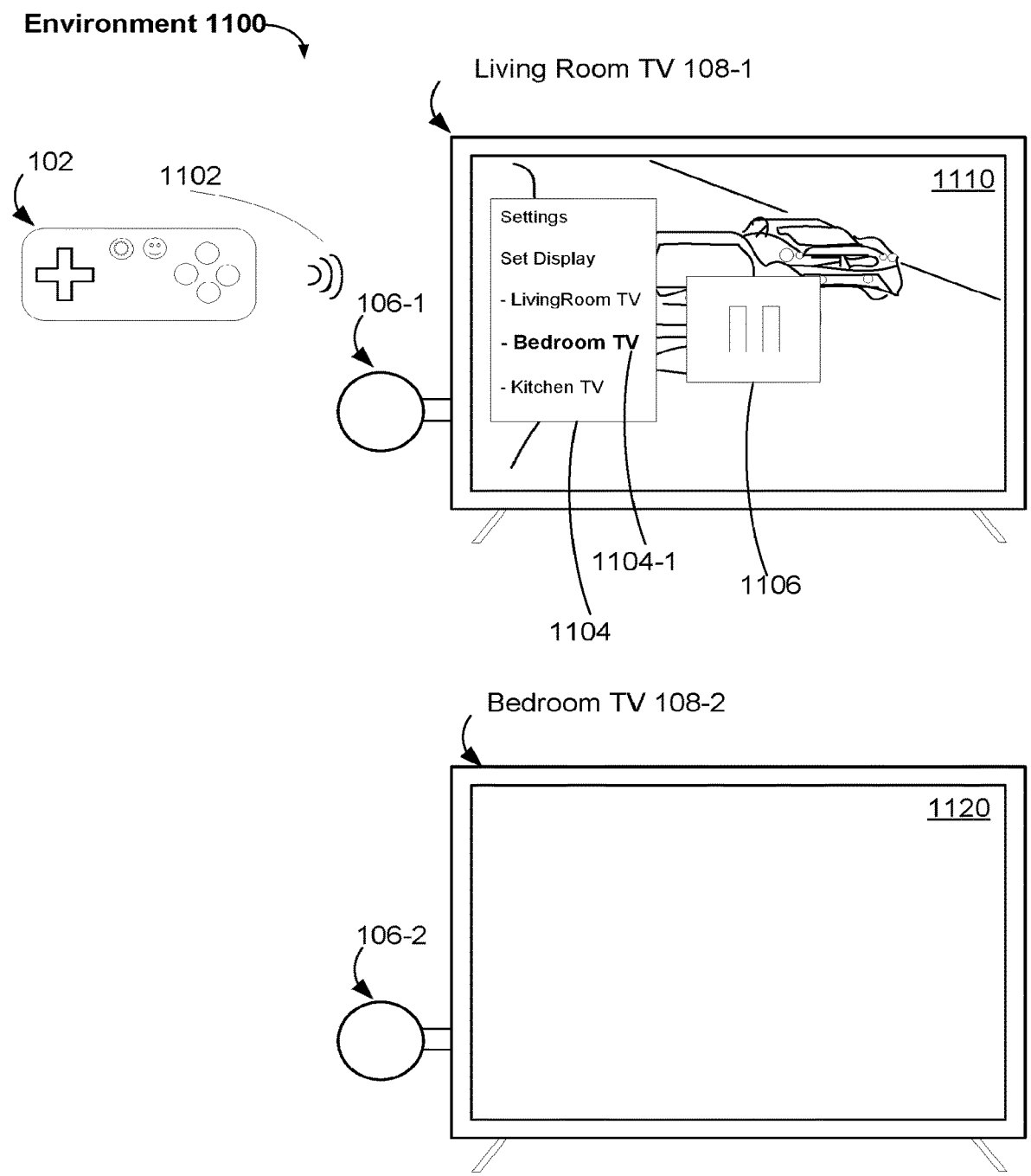

Jack decides to move to the game to the bedroom. As illustrated by FIG. 11B, Jack pauses the game on the living room TV 108-1 (e.g., by pressing one of the buttons 314 on the game controller 102). The screen 1110 displays a window 1106 indicating that the game has been paused. In some implementations, Jack presses a second button to access a menu 1104 that includes different display options. In this example, Jack chooses option 1104-1 ("Bedroom TV"). In some implementations, in response to Jack's selection of a different (i.e., bedroom) display, the interface device 106-1 that is connected to the living room TV 108-1 exits the gaming service and the respective display device 108-1 displays a backdrop 1130 (see FIG. 11C).

Figure 11C:
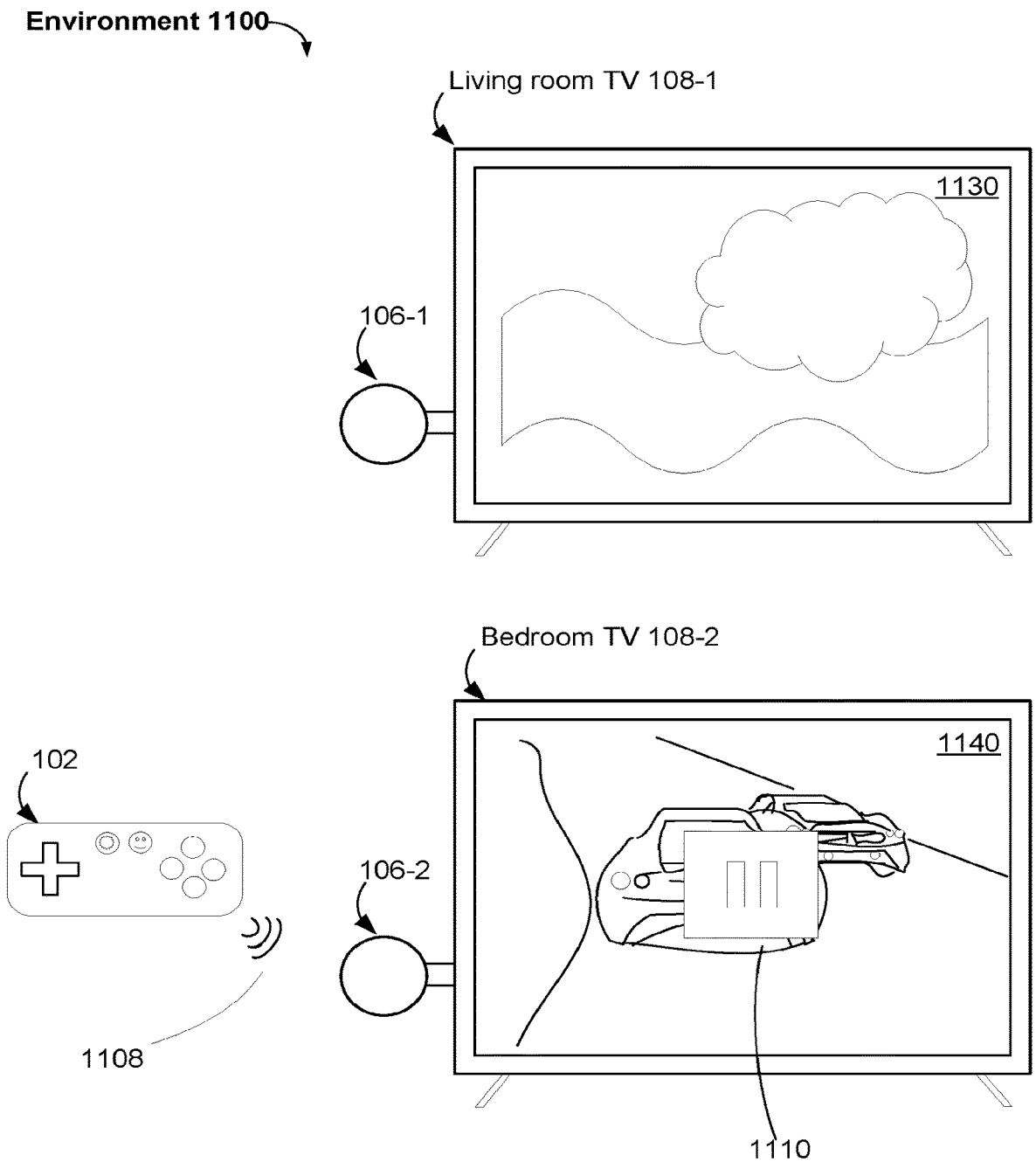

FIG. 11C shows Jack has moved to the bedroom with his game controller 102. In some implementations, the game controller 102 automatically pairs with the interface device 106-2 that it is most proximate to (e.g., in accordance with the implementations of FIG. 10B). In response to the pairing, the interface device 106-2 activates the display device 108-2 and switches to the correct input (e.g., using CEC). The gaming service launches and resumes the game in the paused state, as shown by screen 1140. Jack unpauses the game and resumes gameplay. All of these operations are performed easily and seamlessly with minimal interruption on the part of the user.

Figure 11D:
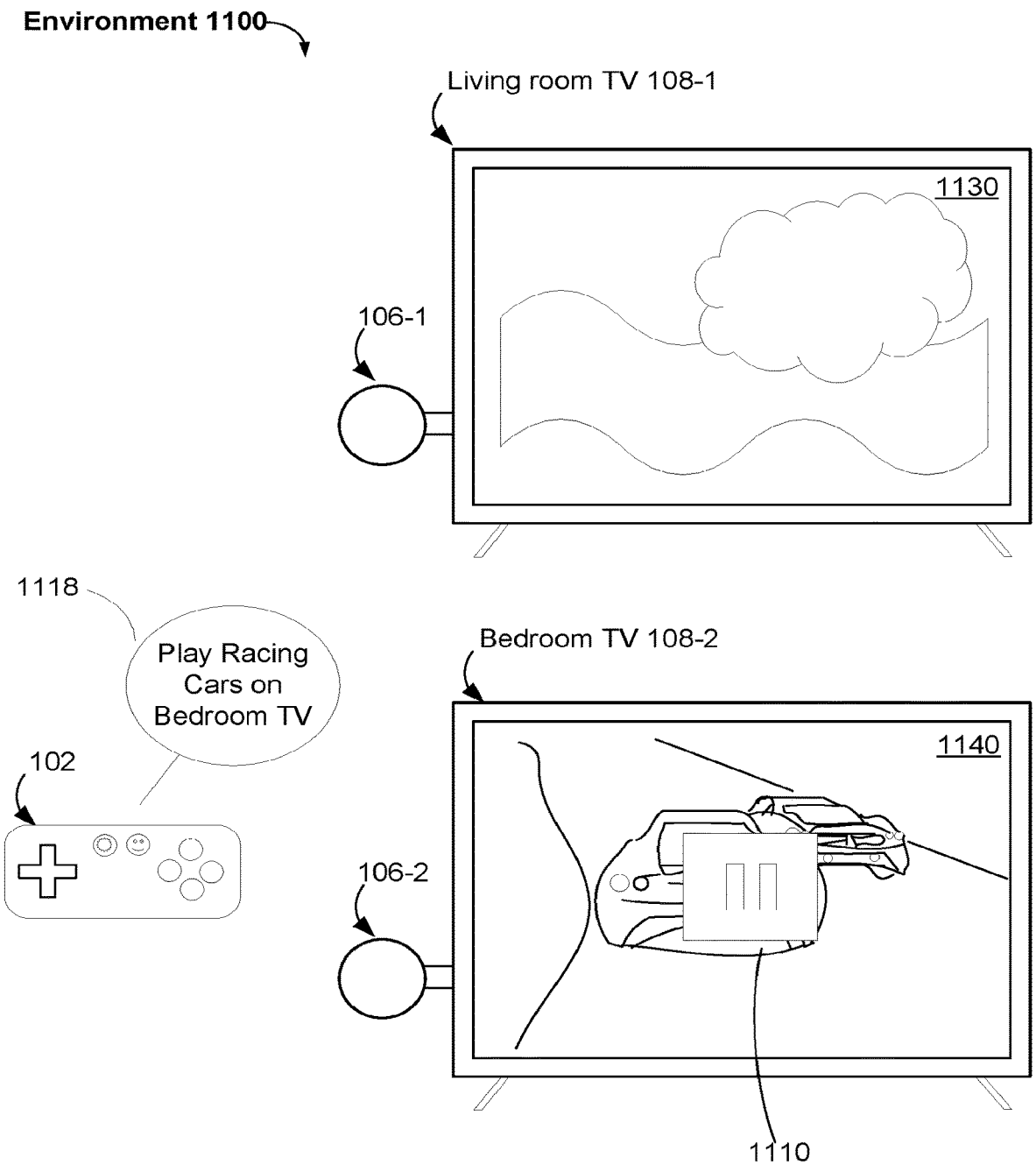

Alternatively, as illustrated by FIG. 11D the user can move gameplay to a different location within the environment 1100 using voice activation. In this instance after Jack walks into the bedroom with the game controller 102, Jack may press a button on the game controller 102 (e.g., the assistance button 606) which activates one or more microphones (e.g., the microphones 312) on the game controller 102. Jack issues a voice command 1118 ("Play Racing Cars on Bedroom TV"). In some implementations, in response to the voice command, the game controller 102 parses the command (e.g., using the voice assistance module 370), identifies "Bedroom TV" as one of the display options, and pairs with the interface device 106-2 that is coupled with the "Bedroom TV" 108-2. In some implementations, the voice command is transmitted to the server system 114 (via the interface device 106-2) for processing at the server system 114.

Additionally, as described by the various figures and implementations, using game controllers 102, electronic devices 104, and/or other electronic devices that can be communicatively connected to the interface devices 106, one can create an "environment graph" (e.g., a home graph in the case of a home environment) that knows about the users, networks, and devices within. In some implementations, a game controller 102 can use the graph to identify users, devices, and displays it can connect with.

Figure 12A:
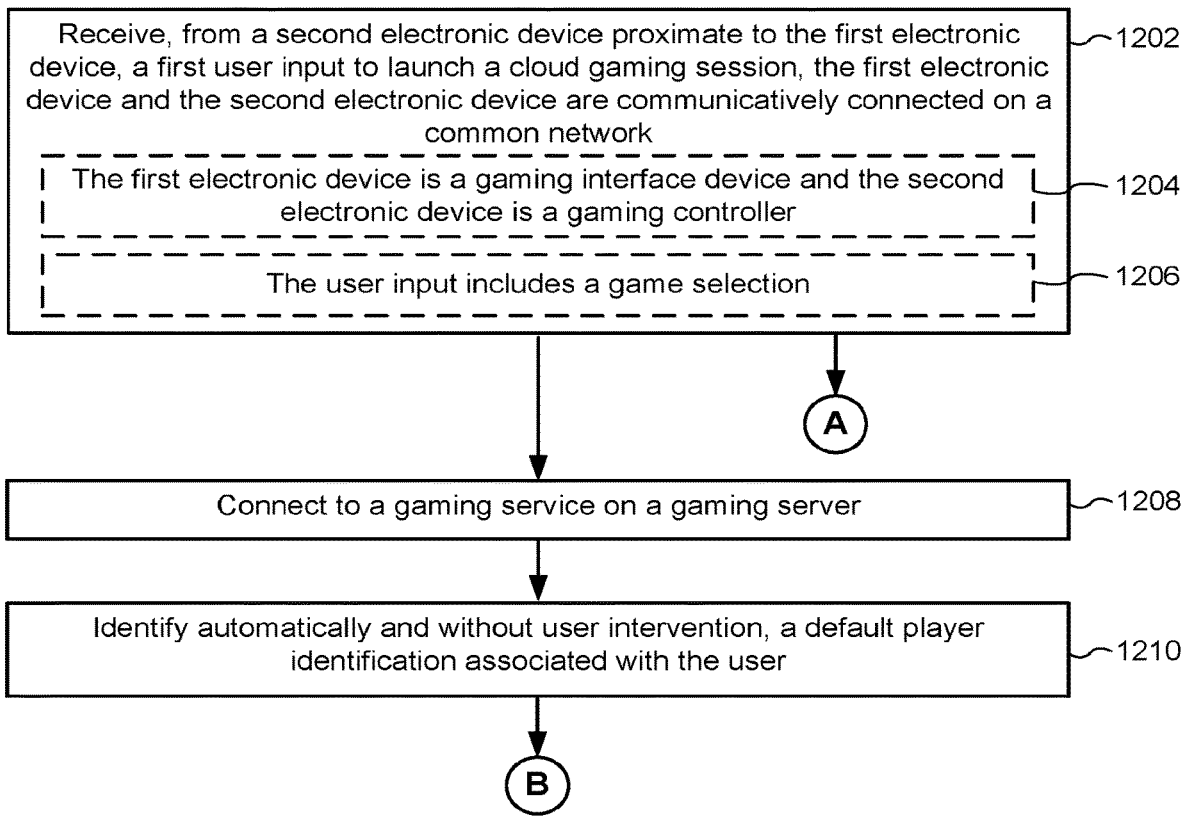
FIGS. 12A to 12C are flowchart representations of a method for cloud gaming, in accordance with some implementations.
Figure 12B:
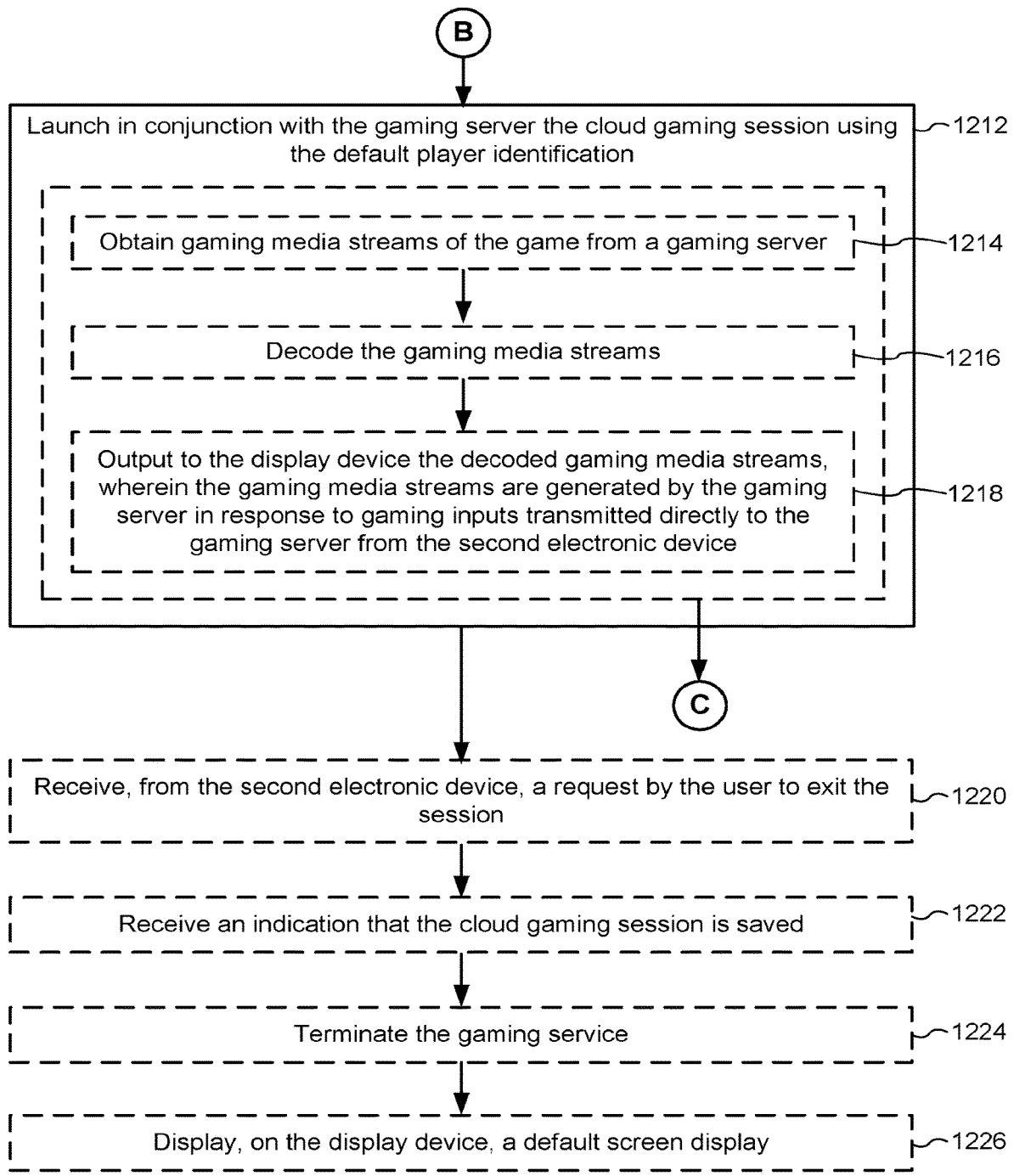
Figure 12C:
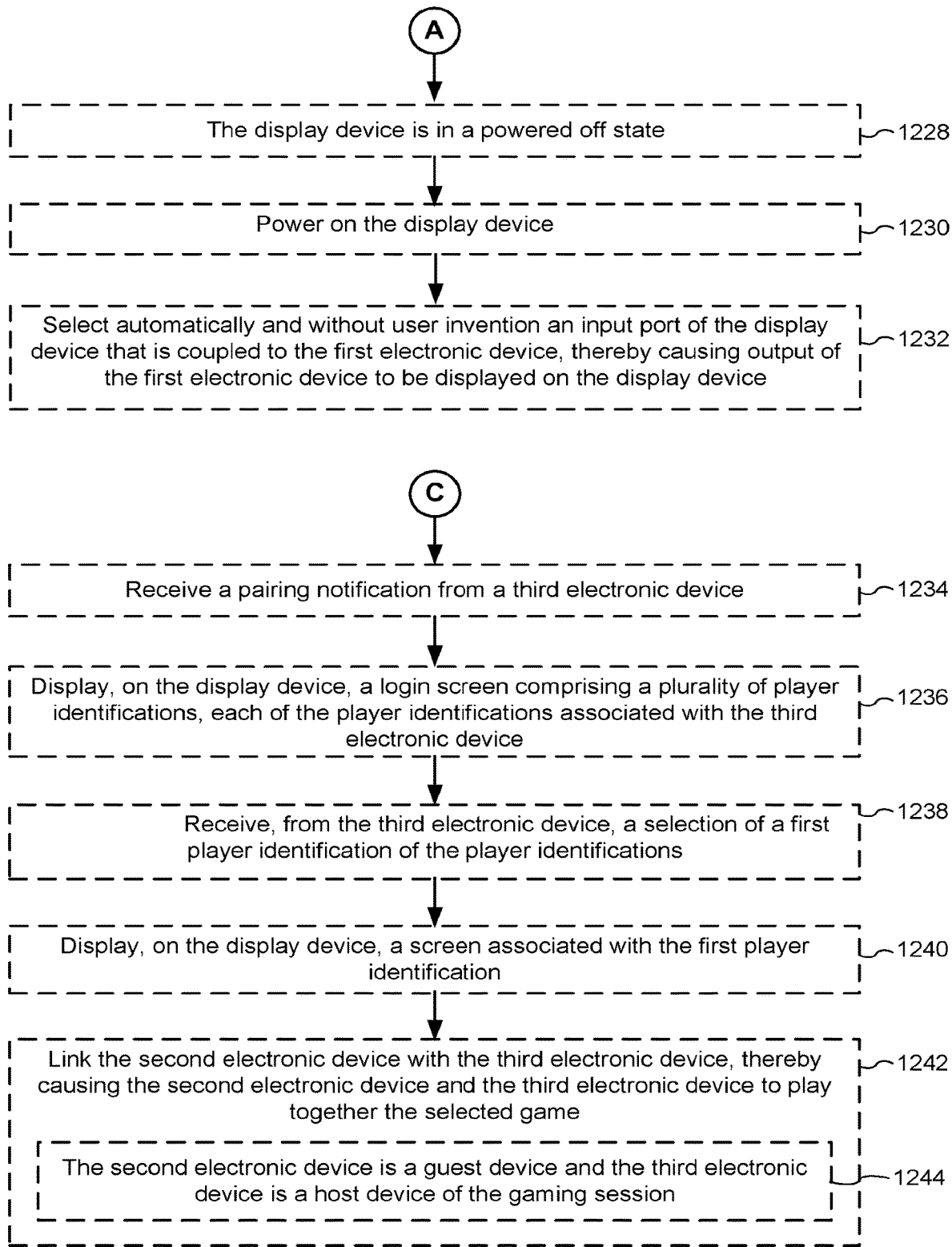
Figure 13A:
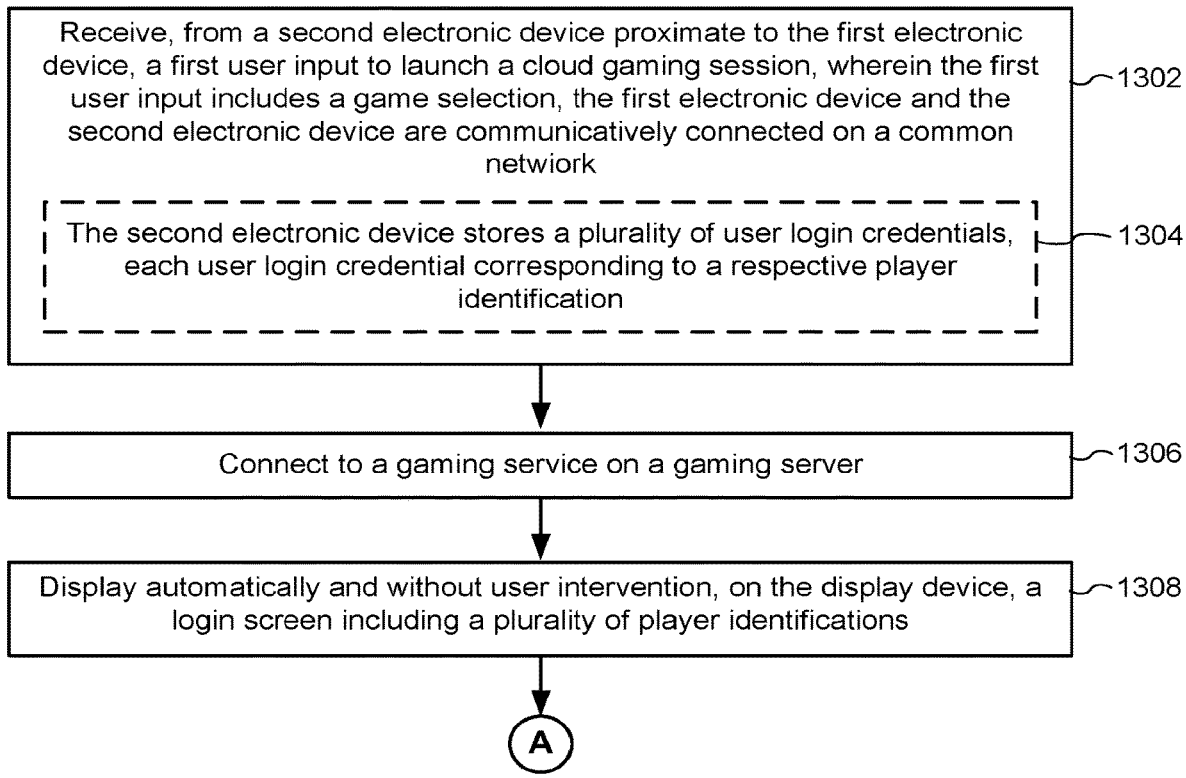
FIG. 13A to 13E are another flowchart representations of a method for cloud gaming, in accordance with some implementations.
Figure 13B:
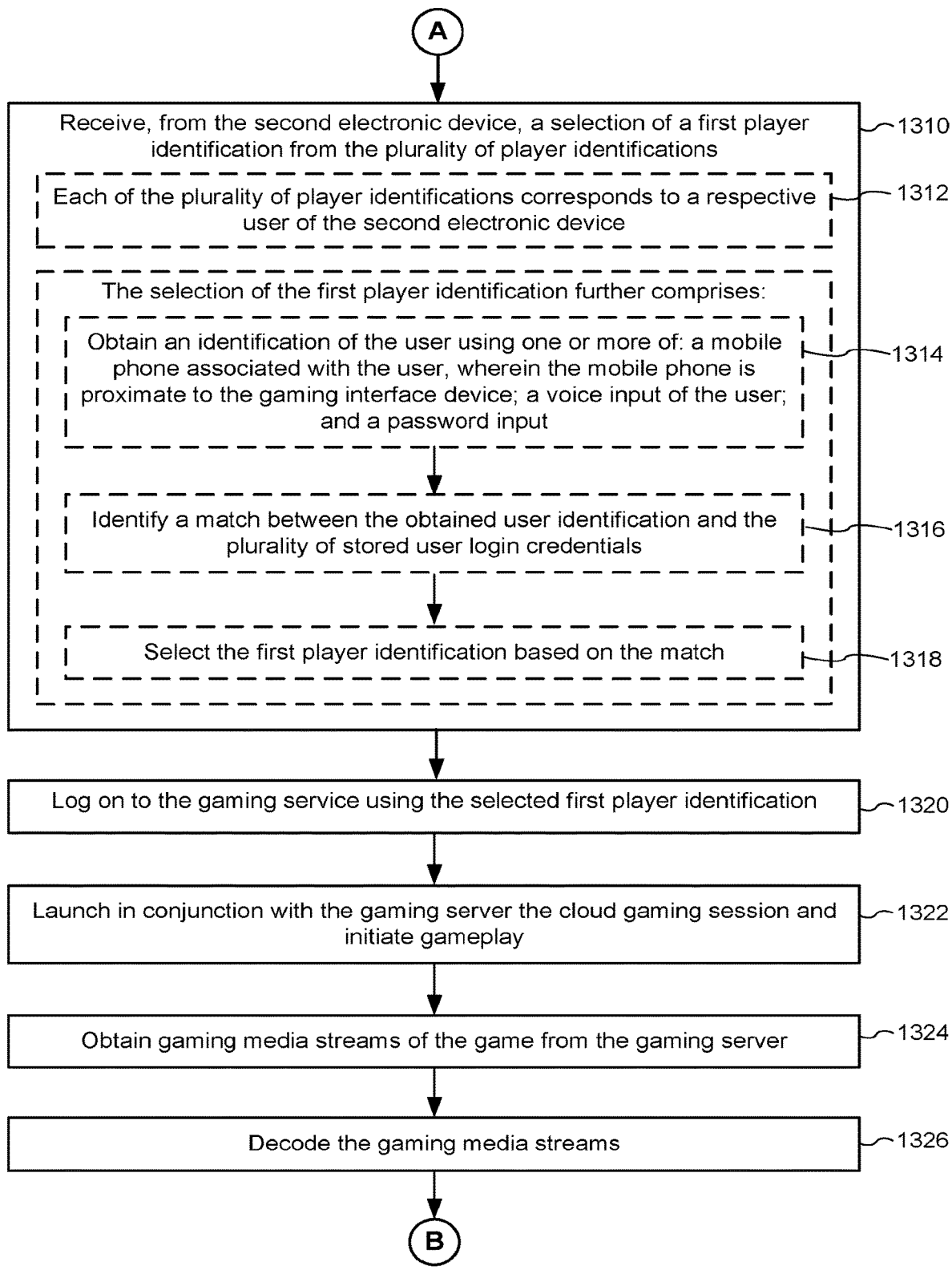
Figure 13C:
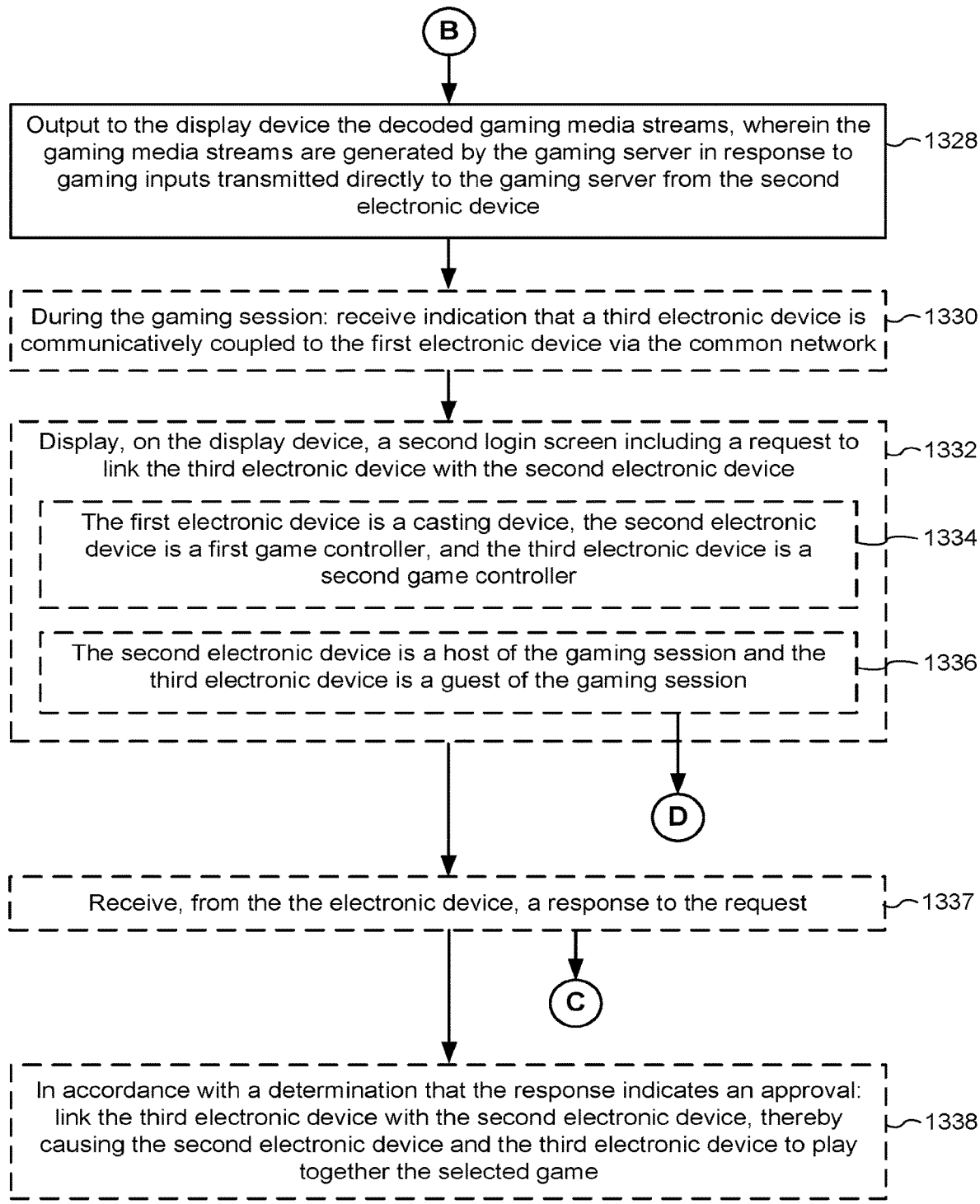
Figure 13D:
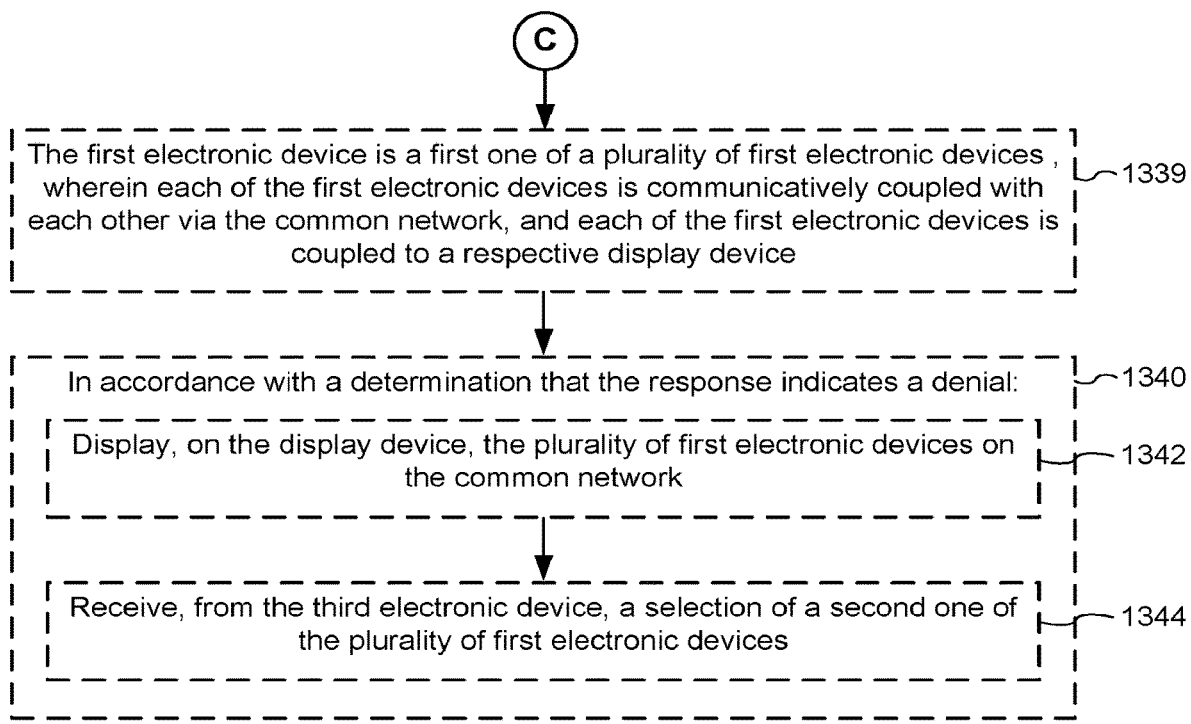
Figure 13E:
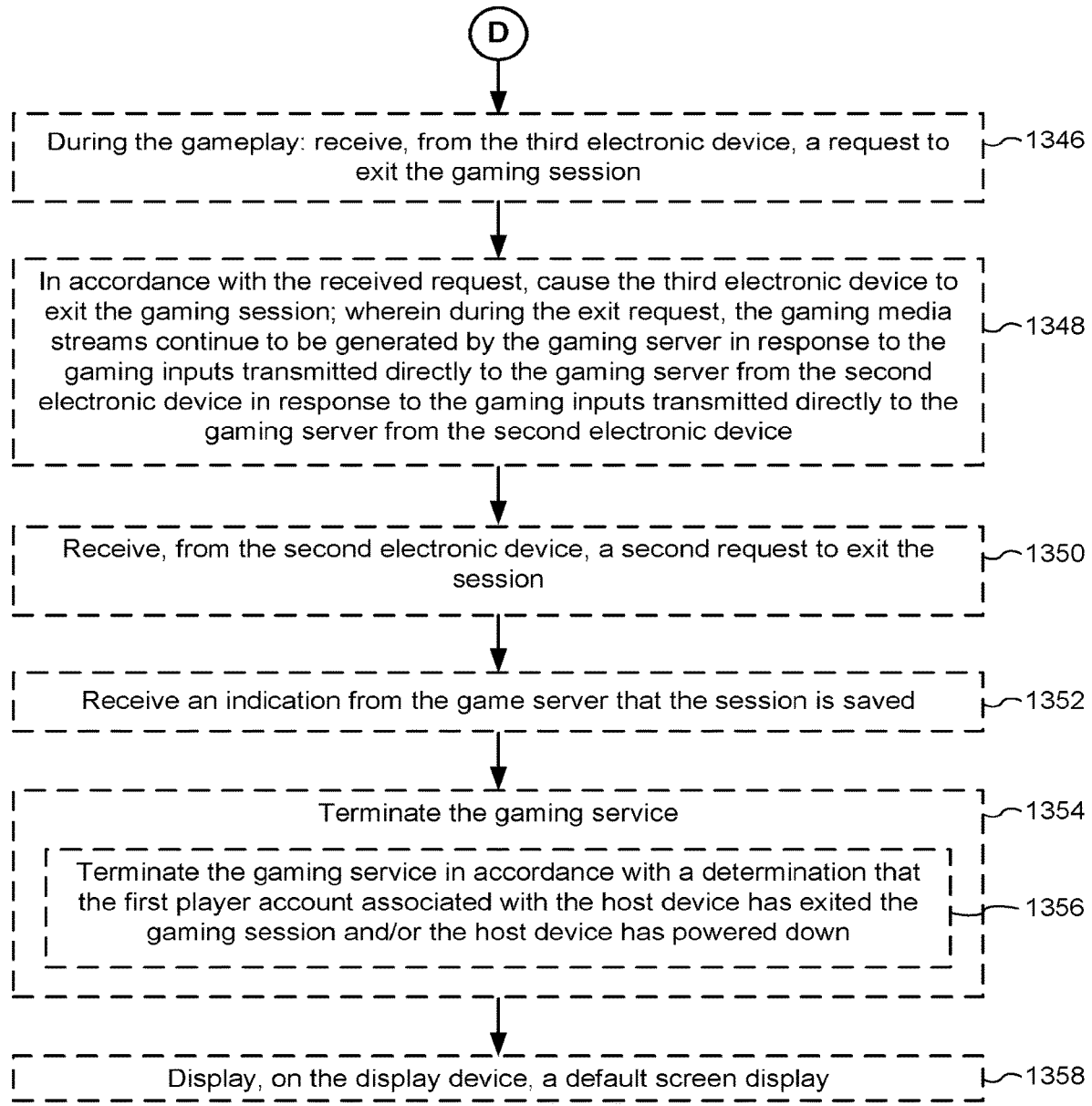

FIGS. 12A to 12C are flowchart representations of a method 1200 for cloud gaming, in accordance with some implementations. The method 1200 is implemented at a first electronic device (e.g., the interface device 106 of FIG. 4) having one or more processors and memory storing one or more programs for execution by the one or more processors. In some implementations, the method 1200 is performed by: (1) one or more interface devices 106; (2) one or more game controllers 102; (3) one or more electronic devices 104; (4) one or more server systems, such as server system 114; or (5) a combination thereof. In some implementations, the method 1200 is governed by instructions that are stored in a non-transitory computer readable storage medium and that are executed by one or more processors of a device/computing system, such as the one or more processors 302 of the game controller 102, and/or the one or more processors 402 of the interface device 106, and/or the one or more processors 502 of the server system 114. For convenience, specific operations detailed below are described as being performed by the interface device 106 that is coupled to the display device 108 (e.g., a television, a computer monitor).

The interface device 106 receives (1202), from a second electronic device proximate to the first electronic device, a first user input to launch a cloud gaming session. The interface device 106 and the second electronic device are communicatively connected on a common network (e.g., the local network 110, 140, and/or 150).

In some implementations, the second electronic device is (1204) a game controller (e.g., the game controller 102). In some implementations, the first user input includes a selection of a button (e.g., one of the buttons 314) on the game controller 102.

In some implementations, the game controller 102 is in an initial power off/standby mode and the first user input turns on the power to the game controller 102. In some implementations, the game controller 102 automatically connects to the local network (e.g., a Wifi network after it is powered on. In some implementations, the game controller automatically pairs with the (default) interface device 106 after it connects to the local network.

In some implementations, the interface device 106 is a casting device and/or a media streaming device. In some implementations, the interface device 106 is a hardware dongle.

In some implementations, the second electronic device is one of: a smartphone, a tablet device, a laptop, and a computer (e.g., the electronic devices 104 of FIG. 1). In some implementations, the second electronic device includes a virtual controller application for implementing one or more standardized game controller configurations.

In some implementations, the display device 108 is (1228) in a powered off state. In this instance, in response to receiving the first user input, the interface device 106 powers (1230) on the display device, and selects (1232) automatically and without user intervention an input port (e.g., an HDMI port) of the display device that is coupled to the first electronic device, thereby causing output of the interface device 106 to be displayed on the display device 108 (e.g., using Consumer Electronics Control).

In response to receiving the first user input, the interface device 106 connects (1208) to a gaming service on a gaming server. In some implementations, connecting to the gaming service includes launching a gaming portal user interface. In some implementations, the launching the gaming portal user interface is in accordance with the process described in FIG. 2A.

The interface device 106 identifies (1210) automatically and without user intervention, a default player identification associated with the user. In some implementations, the default player identification is a default user of the second electronic device. In some implementations, the second electronic device is associated with a single user (e.g., in a single-user household of FIG. 7) and the default player identification is the single user. In some implementations, the second electronic device is associated with more than one user, and the default player identification is established during setup (e.g., during the provisioning process as illustrated in FIG. 6). In some implementations, the default player identification is stored on the second electronic device (e.g., stored on the game controller 102).

The interface device 106 launches (1212), in conjunction with the gaming server, the cloud gaming session using the default player identification. In some implementations, the interface device 106 launches the cloud gaming session in response a second user input (e.g., the user presses a second button on the game controller 102).

In some implementations, the user input includes (1204) a game selection. In some implementations, the game selection is made using one or more buttons (e.g., the buttons, 314), and/or the directional pad (e.g., the directional pad(s) 315), and/or the joystick (e.g., the joystick 316) on the game controller 102. In some implementations, the game selection is made using one or more of keyboard, mouse, virtual buttons, virtual directional pad, and/or virtual joystick on the second electronic device.

In some implementations, in accordance with the game selection, the interface device 106 obtains (1214) gaming media streams of the game from a gaming server (e.g., the game server system 114), decodes (1216) the gaming media streams, and outputs (1218) to the display device 108 the decoded gaming media streams, wherein the gaming media streams are generated by the gaming server in response to gaming inputs transmitted directly to the gaming server from the second electronic device when launching (1212) the gaming session. In some implementations, the interface device 106 obtains the gaming media streams of the game via the server interface module 440 and/or using the process described in FIG. 2B.

In some implementations, during the gaming session, the interface device 106 receives (1220), from the second electronic device, a request by the user to exit the session.

In some implementations, in response to the request, the interface device 106 displays, on the display screen, a message confirming the exit request. In some implementations, the interface device 106 receives a second input confirming the exit request. In accordance with the confirmation, the interface device 106 transmits to the server system 114 the exit request, causing the server system 114 to save the game state (e.g., in the database(s) 122).

In some implementations, the interface device 106 receives (1222) an indication e.g., (from the game server 114) that the cloud gaming session is saved. In accordance with the indication, the interface device 106 terminates (1224) the gaming service, and displays (1226), on the display device 108, a default screen display. (e.g., the backdrop screen 730 of FIG. 7C). In accordance with some implementations, the interface device 106 receives the second user input that denies the exit request (e.g., the user selects the option 722 ("No/Back") of FIG. 8B). In accordance with the second user input that denies the exit request, the game session resumes/continues.

In some implementations, the interface device 106 receives (1234) a pairing notification from a third electronic device. In some implementations, the third electronic device is a second game controller (e.g., the game controller 102-3 of FIG. 9F) distinct from the game controller 102.

In some implementations, in accordance with the pairing notification, the interface device 106 displays (1236), on the display device 108, a login screen comprising a plurality of player identifications, each of the player identifications associated with (e.g., linked to) the third electronic device.

In some implementations, the interface device 106 receives (1238), from the third electronic device, a selection of a first player identification of the player identifications.

In some implementations, the interface device 106 displays (1240), on the display device 108, a screen associated with the first player identification. In some implementations, the third electronic device is associated with a second local network that is distinct from the local network. In this instance, the selection of the first player identification includes a request to input a password associated with the first player identification (e.g., as illustrated in FIG. 9F), and the display of the screen associated with the first player identification is in accordance with a determination that the password matches the password stored in the third electronic device 102-3.

In some implementations, the interface device 106 links (1242) the second electronic device with the third electronic device, thereby causing the second electronic device and the third electronic device to play together the selected game. As illustrated in the example of FIG. 9, Brandon and Julia both play together in the gaming session using the first electronic device (i.e., the interface device 106) and send separate, respective gaming commands via their respective controllers.

In some implementations, the second electronic device is (1244) a guest device and the third electronic device is a host device of the gaming session. In some implementations, when multiple game controllers 102 are connected to the interface device 106, only the game controller of the primary user (i.e., the user of the host device) is used to drive the gaming portal UI. In some implementations, the primary user (i.e., the user of the host device) is the user who launches the gaming application and whose content is being shown in the gaming portal UI.

In accordance with some implementations, a computing system (e.g., the interface device 106) includes: one or more processors; and memory coupled to the one or more processors, the memory storing one or more programs configured to be executed by the one or more processors, the one or more programs including instructions for performing any of the above methods and/or operations.

In accordance with some implementations, a non-transitory computer-readable storage medium (e.g., within the memory 406) stores one or more programs, the one or more programs comprising instructions, which when executed by a computing system, cause the system to perform any of the above methods and/or operations.

FIGS. 13A to 13E are flowchart representations of a method 1300 for cloud gaming, in accordance with some implementations. The method 1300 is implemented at a first electronic device (e.g., the interface device 106 of FIG. 4) having one or more processors and memory storing one or more programs for execution by the one or more processors. In some implementations, the method 1200 is performed by: (1) one or more interface devices 106; (2) one or more game controllers 102; (3) one or more electronic devices 104; (4) one or more server systems, such as server system 114; or (5) a combination thereof. In some implementations, the method 1300 is governed by instructions that are stored in a non-transitory computer readable storage medium and that are executed by one or more processors of a device/computing system, such as the one or more processors 302 of the game controller 102, and/or the one or more processors 402 of the interface device 106, and/or the one or more processors 502 of the server system 114. For convenience, specific operations detailed below are described as being performed by the interface device 106 that is coupled to the display device 108 (e.g., a television, a computer monitor).

The interface device 106 receives (1302), from a second electronic device proximate to the first electronic device, a first user input to launch a cloud gaming session, wherein the first user input includes a game selection. The interface device 106 and the second electronic device are communicatively connected on a common network. In some implementations, the second electronic device is (1204) a game controller (e.g., the game controller 102). In some implementations, the first user input includes a selection of a button (e.g., one of the buttons 314) on the game controller 102.

The interface device 106 connects (1306) to a gaming service on a gaming server in response to receiving the first user input. In some implementations, connecting to the gaming service includes launching a gaming portal user interface. In some implementations, the launching the gaming portal user interface is in accordance with the process described in FIG. 2A.

The interface device 106 displays (1308) automatically and without user intervention, on the display device, a login screen including a plurality of player identifications. In some implementations, each of the plurality of player identifications corresponds (1312) to a respective user of the second electronic device. In some implementations, the second electronic device is used by multiple players (users) and the plurality of player identifications corresponds to the plurality of players that the second electronic device is associated with (i.e., linked to). In some implementations, the plurality of player identifications includes a respective player name (or user name) and/or a visual representation of the respective player (e.g., a photo, an image, and/or an avatar of the player).

In some implementations, the second electronic device is identified by a device identification and/or a client certificate. In some implementations, the second electronic device is linked to a plurality of player identifications each corresponding to a user of the second electronic device. In some implementations, each player identification is associated with (e.g., linked to) the device identification and/or the client certificate.

The interface device 106 receives (1310), from the second electronic device, a selection of a first player identification from the plurality of player identifications.

In some implementations, the second electronic device stores (1304) a plurality of user login credentials, each user login credential corresponding to a respective player identification. In some implementations, the user login credentials are concurrently stored on the gaming server (e.g., in the database(s) 122 of the serve system 114). In some implementations, the second electronic device also stores a plurality of network login credentials. In some implementations, each of the stored network credentials corresponds to a respective local network that the second electronic device has been communicatively connected to.

In some implementations, after receiving the selection of the first player identification (see step 1310), the interface device 106 obtains (1314) an identification of the user using one or more of: a mobile phone associated with the user, wherein the mobile phone is proximate to the interface device 106; a voice input of the user; and a password input. In some implementations, the obtaining the identification of the user is in response to an activation of a security feature (e.g., the security module 368 of the game controller 102) on the second electronic device. In some implementations, the interface 106 uses the proximity/detection unit 410 to obtain the identification of the user using the mobile phone.

In some implementations, the interface device 106 identifies (1316) a match between the obtained user identification and the plurality of stored user login credentials (e.g., as described with respect to FIG. 8B).

In some implementations, the interface device 106 selects (1318) the first player identification based on the match.

The interface device 106 logs (1320) on to the gaming service using the selected first player identification.

The interface device 106 launches (1322) in conjunction with the gaming server the cloud gaming session and initiates gameplay.

The interface device 106 obtains (1324) gaming media streams of the game from the gaming server (e.g., from the server system 114).

The interface device 106 decodes (1326) the gaming media streams.

The interface device 106 outputs (1328) to the display device 108 the decoded gaming media streams, wherein the gaming media streams are generated by the gaming server in response to gaming inputs transmitted directly to the gaming server from the second electronic device.

In some implementations, during the gaming session, the interface device 106 receives (1330) indication that a third electronic device is communicatively coupled to the interface device 106 via the common network.

In some implementations, the interface device 106 displays (1332), on the display device 108, a second login screen including a request to link the third electronic device with the second electronic device. Referring to the example of FIG. 9, Julia launches the gaming portal UI using her game controller 102-1 and Jack sends a request to link his controller 102-2 to Julia's game session. Julia receives, on her login screen 960, a message 928 requesting to link to her game controller 102-1 and her game session.

In some implementations, the interface device 106 is (1334) a casting device (or a media streaming device), the second electronic device is a first game controller (e.g., the game controller 102-1 of FIG. 9), and the third electronic device is a second game controller (e.g., the game controller 102-2 of FIG. 9).

In some implementations, the second electronic device is (1336) a host of the gaming session and the third electronic device is a guest of the gaming session.

In some implementations, the interface device 106 receives (1337) from the third electronic device, a response to the request. Referring back to the example of FIG. 9, the interface device receives a response from the third controller (i.e., Jack's game controller 102-2) in response to the request to link the third electronic device with the second electronic device.

In some implementations, in accordance with a determination that the response indicates an approval (i.e., Jack chooses option 935 ("Yes")), the interface device 106 links (1338) the third electronic device with the second electronic device, thereby causing the second electronic device and the third electronic device to play together the selected game. In some implementations, in accordance with the linking, the second electronic device and the third electronic device transmit directly and independently, respective gaming inputs to the gaming server (i.e., the server system 114). In some implementations, in accordance with the linking, the second electronic device and the third electronic device transmit directly and independently, a respective subset of commands to the interface device 106. In some implementations, the second electronic device continues with the gameplay during the linking process.

In some implementations, the interface device 106 is (1339) a first one of a plurality of interface devices (i.e., the environment includes more than one interface device), wherein each of the first electronic devices is communicatively coupled with each other via the common network, and each of the interface devices is coupled to a respective display device.

In some implementations, in accordance with a determination (1340) that the response indicates a denial (i.e., Jack chooses option 930 ("No") in FIG. 9C), the interface device 106 displays (1342), on the display device, the plurality of interface devices on the common network.

In some implementations, the interface device 106 receives (1344), from the third electronic device, a selection of a second one of the plurality of first electronic devices. Referring back to the example of FIG. 9C, if Jack chooses the option 930 ("No"), he can select from the display other interface devices to pair with. In accordance with the selection, Jack pairs his game controller with a second one of the interface devices (e.g., an interface device 106-2), which streams the selected game on the display device coupled with the interface device 106-2. Jack's gaming inputs are transmitted directly to the server system 114 using the interface device 106-2.

In some implementations, during the gameplay, the interface device 106 receives (1346), from the third electronic device, a request to exit the gaming session.

In some implementations, in accordance with receiving the request, the interface device 106 causes (1348) the third electronic device to exit the gaming session, wherein during the exit, the gaming media streams continue to be generated by the gaming server in response to the gaming inputs transmitted directly to the gaming server from the second electronic device in response to the gaming inputs transmitted directly to the gaming server from the second electronic device. In some implementations, the second electronic device continues with the gameplay during the exit. In some implementations, in response to the exit request, the display device 108 displays a message requesting confirmation of the exit request (e.g., as shown in FIG. 9D), and causes the third electronic device to exit upon the confirmation of the request.

In some implementations, the interface device 106 receives (1350), from the second electronic device, a second request to exit the session.

In some implementations, in accordance with the received second request, the interface device 106 receives (1352) an indication from the game server that the session is saved.

In some implementations, the interface device 106 terminates (1354) the gaming service.

In some implementations, the second electronic device is the host device. Accordingly, in response to the second request, the server system 114 saves the game state and terminates the gaming service.

In some implementations, the interface device 106 determines (1356) that the first player account associated with the host device has exited the gaming session and/or the host device has powered down, and the interface device 106 terminates the gaming service in accordance with the determination.

In some implementations, the interface device 106 displays (1358), on the display device, a default screen display. In some implementations, after the server system 114 has terminated the gaming service, the display device 108 displays a default backdrop screen (e.g., the screen 980 of FIG. 9E).

In accordance with some implementations, a computing system (e.g., the interface device 106) includes: one or more processors (e.g., the processor(s) 402); and memory (e.g., the memory 406) coupled to the one or more processors, the memory storing one or more programs configured to be executed by the one or more processors, the one or more programs including instructions for performing any of the above methods and/or operations.

In accordance with some implementations, a non-transitory computer-readable storage medium (e.g., within the memory 406) stores one or more programs, the one or more programs comprising instructions, which when executed by a computing system, cause the system to perform any of the above methods and/or operations.

Figure 14A:
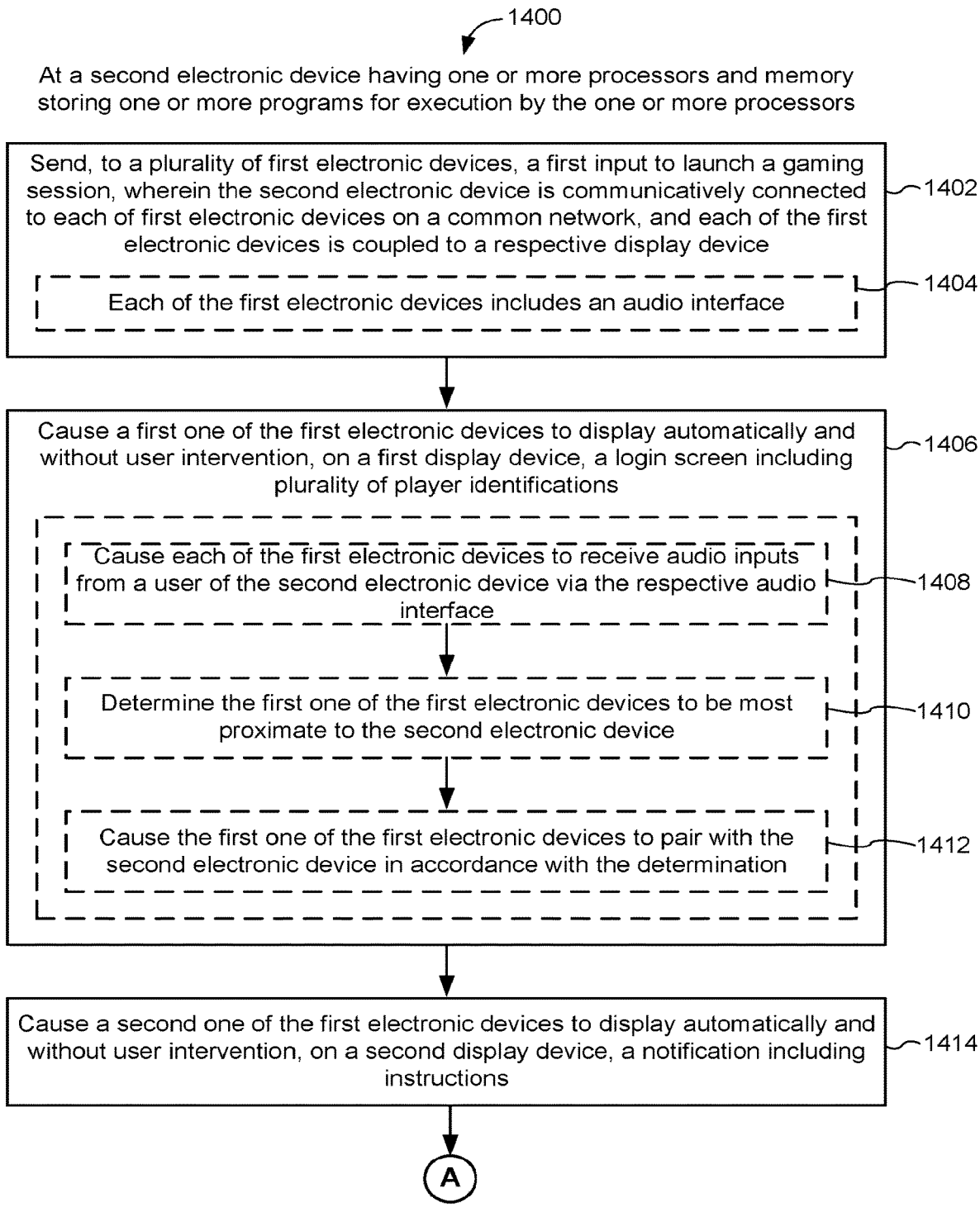
FIGS. 14A to 14B are yet another flowchart representations of a method for cloud gaming, in accordance with some implementations.
Figure 14B:
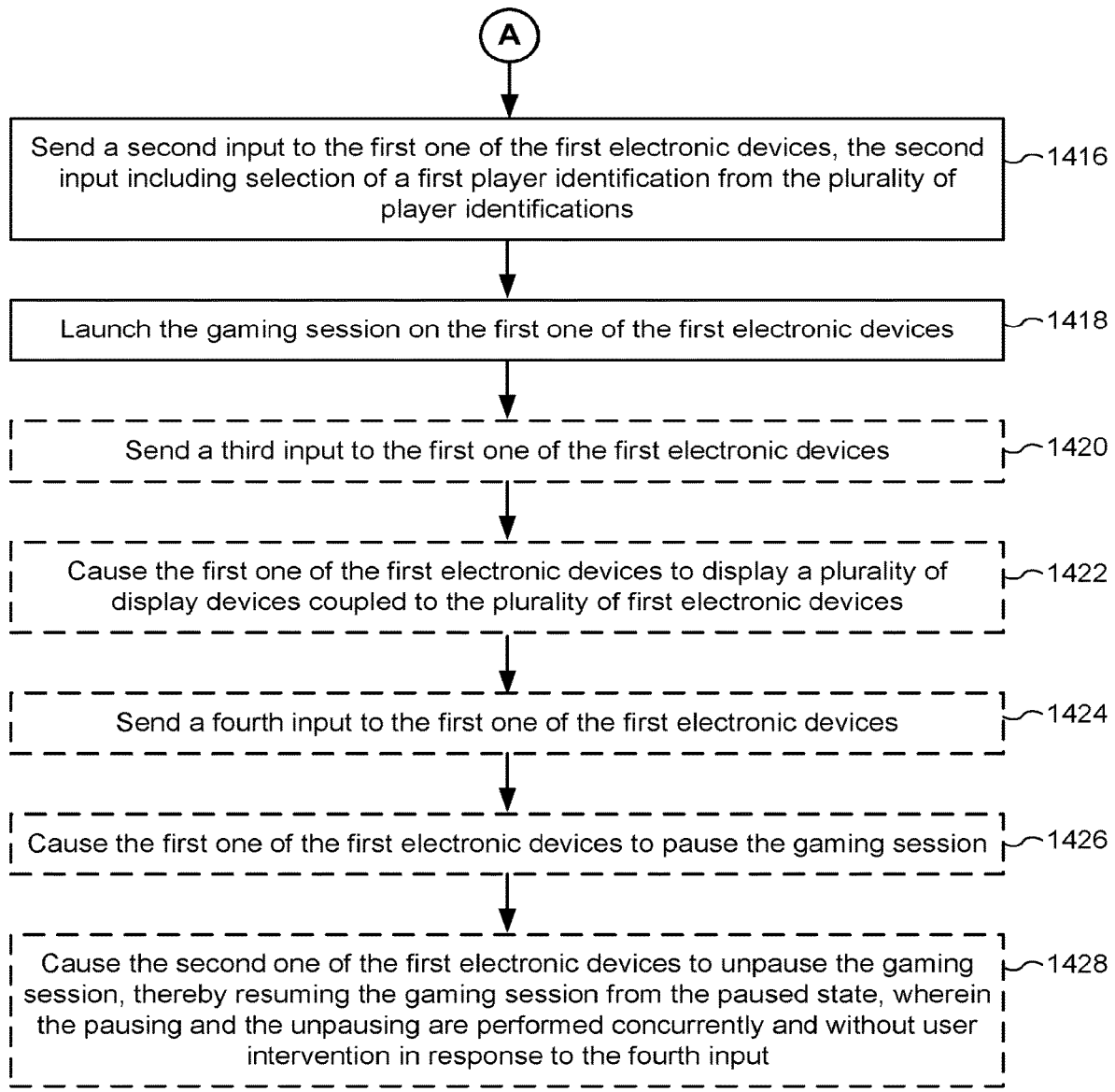

FIGS. 14A to 14B are flowchart representations of a method 1400 for cloud gaming, in accordance with some implementations. The method 1400 is implemented at a second electronic device (e.g., the game controller 102 of FIG. 3) having one or more processors and memory storing one or more programs for execution by the one or more processors. In some implementations, the method 1200 is performed by: (1) one or more game controllers 102; (2) one or more interface devices 106; (3) one or more electronic devices 104; (4) one or more server systems, such as server system 114; or (5) a combination thereof. In some implementations, the method 1400 is governed by instructions that are stored in a non-transitory computer readable storage medium and that are executed by one or more processors of a device/computing system, such as the one or more processors 302 of the game controller 102, and/or the one or more processors 402 of the interface device 106, and/or the one or more processors 502 of the server system 114. For convenience, specific operations detailed below are described as being performed by the game controller 102.

The game controller 102 sends (1402), to a plurality of first electronic devices (e.g., the interface devices 106), a first input to launch a gaming session, wherein the second electronic device is communicatively connected to each of first electronic devices on a common network, and each of the first electronic devices is coupled to a respective display device.

The game controller 102 causes (1406) a first one (e.g., the interface device 106-1 of FIG. 10) of the first electronic devices to display automatically and without user intervention, on a first display device, a login screen including plurality of player identifications in response to the first input.

The game controller 102 causes (1414) a second one of the first electronic devices to display automatically and without user intervention, on a second display device, a notification including instructions.

The game controller 102 sends (1416) a second input to the first one of the first electronic devices, the second input including selection of a first player identification from the plurality of player identifications.

The game controller 102 launches (1418) the gaming session on the first one of the first electronic devices in response to the second input.

In some implementations, such as the example of FIG. 10A, the first one of the first electronic devices (e.g., the interface device 106-1) is a default pairing device of the game controller 102. In accordance with this example, the default living room display 108-1 displays a gaming portal UI and the non-default display (i.e., the bedroom TV 108-2) displays a message (e.g., the message 1006) with instructions on how to link to the display device 108-2.

In some implementations, the first one of the first electronic devices is the device that was used in the most recent gaming session.

In some implementations, each of the first electronic devices includes (1404) an audio interface (e.g., the microphones 414 of the interface device 106). The game controller 102 causes (1408) each of the first electronic devices to receive audio inputs from a user of the second electronic device via the respective audio interface. The game controller 102 determines (1410) the first one of the first electronic devices to be most proximate to the game controller 102 in accordance with the received audio inputs. In accordance with the determination, the game controller 102 causes (1412) the first one of the first electronic devices to pair with the second electronic device in accordance with the determination.

In some implementations, the game controller 102 determines the first one of the first electronic devices to be most proximate to the game controller 102 using the communication interface(s) 304 and/or the proximity detection unit 334. In some implementations, the game controller 102 finds the most proximate interface device using Whispernet, Bluetooth Low Energy (BLE) or Wifi, and pairs with the most proximate interface device.

In some implementations, the game controller 102 stores a default pairing interface device, and overrides the default paring device to pair with an interface device that it is most proximate to. In some implementations, in accordance with the pairing, the most proximate interface device switches on the display device that it is coupled to.

In some implementations, the game controller 102 sends (1420) a third input to the first one of the first electronic devices. In some implementation, the third input is a command (e.g., a request) to pause the game. In some implementation, the third input is a command to access a menu on the gaming portal UI.

In some implementations, the game controller 102 causes (1422) the first one of the first electronic devices to display a plurality of display devices coupled to the plurality of first electronic devices in response to the third input. In some implementation, the third input includes a request to pause the game.

In some implementations, the game controller 102 sends (1424) a fourth input to the first one of the first electronic devices. In some implementations, the fourth input is a command that selects a second one of the first electronic devices.

In some implementations, the game controller 102 causes (1426) the first one of the first electronic devices to pause the gaming session in response to the fourth input.

In some implementations, the game controller 102 causes (1428) the second one of the first electronic devices to unpause the gaming session, thereby resuming the gaming session from the paused state, wherein the pausing and the unpausing are performed concurrently and without user intervention in response to the fourth input. In some implementations, the first one and the second one of the first electronic devices are located in different areas of a local environment (e.g., different rooms of a home environment) and the unpausing is in response to a proximity detection of the game controller 102 and/or the user.

In accordance with some implementations, a computing system (e.g., the game controller 102) includes: one or more processors; and memory coupled to the one or more processors, the memory storing one or more programs configured to be executed by the one or more processors, the one or more programs including instructions for performing any of the above methods and/or operations.

In accordance with some implementations, a non-transitory computer-readable storage medium (e.g., within the memory 306) stores one or more programs, the one or more programs comprising instructions, which when executed by a computing system, cause the system to perform any of the above methods and/or operations.

In some implementations, the server system 206 includes a notification module (not shown) for generating alerts and/or notifications for users of the electronic device(s). For example, in some implementations the correction database is stored locally on the electronic device of the user, the server system 206 may generate notifications to alert the user to download the latest version(s) or update(s) to the correction database.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first interface device could be termed a second interface device, and, similarly, a second interface device could be termed a first interface device, without departing from the scope of the various described implementations. The first interface device and the second interface device are both interface devices, but they are not the same type of interface device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An interface device for cloud gaming, comprising:
one or more processors;
memory storing one or more programs for execution by the one or more processors, the one or more programs including an application;
a communication device for receiving and/or transmitting messages and media streams between:
the interface device and a game controller; and
the interface device and a gaming server that is remote from the interface device;
an output device configured to provide output of the application to an input of a display device coupled to or integrated with the interface device;
the application being configured to:
implement a first mode in which the interface device processes and displays outputs associated with substantially all messages transmitted by the game controller; and
implement a second mode in which the interface device processes and displays a predefined subset of messages from the game controller and displays gaming media streams transmitted by the gaming server.

2. The interface device of claim 1, wherein the application is further configured to decode and output to the display device the gaming media streams transmitted by the gaming server.

3. The interface device of claim 1, wherein the output device comprises an output port configured to transmit output of the application to an input port of the display device coupled to the interface device.

4. The interface device of claim 1, wherein the interface device identifies the messages transmitted by the game controller using a unique identifier assigned to the game controller.

5. The interface device of claim 1, wherein the first mode further comprises:
receiving, from the game controller, a first request to establish a session;
receiving, from the game controller, credentials of a user associated with the gaming controller;
retrieving, from a server, an authorization corresponding to the credentials of the user; and
in accordance with the authorization, retrieving content specific to the user.

6. The interface device of claim 5, wherein the content specific to the user includes an avatar of that represents the user during a game.

7. The interface device of claim 1, wherein the interface device and the game controller are communicatively connected on a common network.

8. The interface device of claim 1, wherein the gaming media streams comprise audio streams, and the audio streams are transmitted by the game server to an audio input of the game controller for display on a display device associated with the game controller.

9. A game controller, comprising:
one or more processors;
memory storing one or more programs for execution by the one or more processors, the one or more programs including an application;
a communication device for receiving and/or transmitting messages and media streams between:
the game controller and an interface device; and
the game controller and a gaming server that is remote from the game controller; and
the application being configured to implement:
a first mode in which the game controller transmits gaming setup commands to the interface device; and
a second mode in which the game controller transmits gameplay commands to the gaming server and a predefined subset of the gaming setup commands to the interface device.

10. The game controller of claim 9, wherein the game controller inputs the setup commands and the gameplay commands using buttons and/or joysticks on the game controller.

11. The game controller of claim 9, wherein the game controller stores a plurality of user login credentials, each credential corresponding to a respective player identification.

12. The game controller of claim 9, wherein the game controller stores a plurality of network credentials, each network credential corresponding to a respective network that the game controller is used for a respective gaming session.

13. The game controller of claim 9, wherein the gaming media streams comprise audio streams, and the game controller further includes an audio device for receiving and displaying the audio streams.

14. A method performed at a gaming system, comprising:
an interface device;
a game controller; and
a gaming server remote from the interface device and the game controller;
wherein each of the interface device, the game controller, and the gaming server includes one or more processors and memory storing one or more programs for execution by the one or more processors;
the method comprising:
at the interface device:
receiving, from the game controller, a selection of a game;
processing and displaying automatically and without user intervention, in a first mode, outputs associated with substantially all messages transmitted by the gaming controller; and
processing and displaying automatically and without user intervention, in a second mode, a predefined subset of messages from the game controller and displaying in real time gaming media streams of the game transmitted by the gaming server;
wherein the displaying comprises displaying on a display device coupled to or integrated with the interface device;
at the game controller:
transmitting, in the first mode, controller commands to the interface device; and
transmitting, in the second mode, gameplay commands to the game server and a predefined subset of the controller commands to the interface device;
at the gaming server, for a respective game:
receiving the gameplay commands from the game controller;
rendering a respective frame of content of the game in accordance with a respective subset of one or more of the received gameplay commands; and
transmitting, in real time to the interface device, the gaming media streams of the game including the respective rendered frame.

15. The method of claim 14, wherein the gaming server uses distinct ports for receiving the gameplay commands and transmitting the gaming media streams.

16. The method of claim 14, wherein the game controller stores a plurality of user login credentials, each credential corresponding to a respective player identification.

17. The method of claim 14, wherein the game controller is assigned a unique identifier, and the gaming server associates the received gameplay commands with the game controller based on the unique identifier.

18. The method of claim 14, wherein the game controller is assigned a unique identifier, and the interface device identifies the messages transmitted by the game controller based on the unique identifier.

19. The method of claim 14, wherein the interface device and the game controller are communicatively connected on a common network.

* * * * *